US012688588B2

(12) United States Patent
Usami et al.

(10) Patent No.: US 12,688,588 B2
(45) Date of Patent: Jul. 21, 2026

(54) IMAGE PROCESSING APPARATUS AND CONTROL METHOD THEREOF

(71) Applicant: CANON KABUSHIKI KAISHA, Tokyo (JP)

(72) Inventors: Takahiro Usami, Tokyo (JP); Yasushi Ohwa, Tokyo (JP); Hiroyasu Katagawa, Kanagawa (JP); Tomotaka Uekusa, Kanagawa (JP); Toru Aida, Tokyo (JP); Yukihiro Kogai, Kanagawa (JP); Hiroyuki Yaguchi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 442 days.

(21) Appl. No.: 18/062,064

(22) Filed: Dec. 6, 2022

(65) Prior Publication Data

US 2023/0116274 A1 Apr. 13, 2023

Related U.S. Application Data

(63) Continuation of application No. PCT/JP2021/021400, filed on Jun. 4, 2021.

(30) Foreign Application Priority Data

Jun. 12, 2020 (JP) ................................ 2020-102517
Mar. 1, 2021 (JP) ................................ 2021-032036

(51) Int. Cl.
*G06T 7/246* (2017.01)
*G06T 7/73* (2017.01)

(52) U.S. Cl.
CPC ................ *G06T 7/246* (2017.01); *G06T 7/73* (2017.01); *G06T 2207/20084* (2013.01); *G06T 2207/30201* (2013.01)

(58) Field of Classification Search
CPC . G06T 7/246; G06T 7/73; G06T 2207/20084; G06T 2207/30201;
(Continued)

(56) References Cited

U.S. PATENT DOCUMENTS

2009/0060274 A1* 3/2009 Kita ........................ H04N 23/61
382/103
2010/0046798 A1* 2/2010 Miyazaki ............. H04N 23/635
382/103
(Continued)

FOREIGN PATENT DOCUMENTS

CN 101377815 A 3/2009
CN 109993775 A 7/2019
(Continued)

OTHER PUBLICATIONS

The International Search Report dated Jul. 6, 2021 of International Application No. PCT/JP2021/021400.
(Continued)

*Primary Examiner* — Andrew W Bee
*Assistant Examiner* — D J Dhooge
(74) *Attorney, Agent, or Firm* — Cowan, Liebowitz & Latman, P.C.

(57) ABSTRACT

An image processing apparatus having appropriate capability while reducing power consumption is disclosed. The image processing apparatus comprises a first tracking unit and a second tracking unit having a higher processing accuracy and a greater operational load than the first tracking unit. The image processing apparatus computes an evaluation value pertaining to difficulty of tracking for a subject region as a tracking target determined in a target frame to which tracking processing is to be applied. The image processing apparatus, based on the evaluation value, activates both the first tracking unit and the second tracking
(Continued)

unit, or deactivates at least one of the first tracking unit and the second tracking unit for a subsequent frame to the target frame.

30 Claims, 41 Drawing Sheets

(58) Field of Classification Search
CPC . G06T 2207/30241; G06T 7/248; G02B 7/28; G03B 7/091; G03B 13/36; G03B 15/00; H04N 23/60
See application file for complete search history.

(56) References Cited

U.S. PATENT DOCUMENTS

| | | | | |
|---|---|---|---|---|
| 2012/0242853 | A1 | 9/2012 | Jasinski | |
| 2015/0055821 | A1* | 2/2015 | Fotland | G06V 10/255 382/103 |
| 2017/0061241 | A1* | 3/2017 | Rastgar | G06V 20/48 |
| 2017/0345162 | A1* | 11/2017 | Bamba | G06T 7/248 |
| 2022/0329740 | A1* | 10/2022 | Sakato | G06T 7/248 |
| 2023/0111580 | A1* | 4/2023 | Takatsuka | H04N 23/61 348/222.1 |

FOREIGN PATENT DOCUMENTS

| | | | |
|---|---|---|---|
| CN | 110738149 | A | 1/2020 |
| CN | 110852310 | A | 2/2020 |
| EP | 3531370 | A | 8/2019 |
| JP | 2009-060379 | A | 3/2009 |
| JP | 2017-156886 | A | 9/2017 |
| JP | 2021-072592 | A | 5/2021 |

OTHER PUBLICATIONS

A Chinese Office Action that issued on Nov. 7, 2024, with a translation, that issued in the corresponding Chinese Patent Application No. 202180041816.7.

Dai Fengzhi, et al,. Survey of Research Progress of Video Tracking Based on Deep Learning, Computer Engineering and Applications; 2019, 55(10): 16-29; School of Electronic Information and Automation, Tianjin University of Science and Technology; Chinese Library Classification No. TP391.4 doi: 10.3778/j.issn.1002-8331.1810-0170.

The Jun. 25, 2025 Chinese Notice of Allowance, with an English Translation, that issued in Chinese Patent Application No. 202180041816.7.

* cited by examiner

F I G. 6
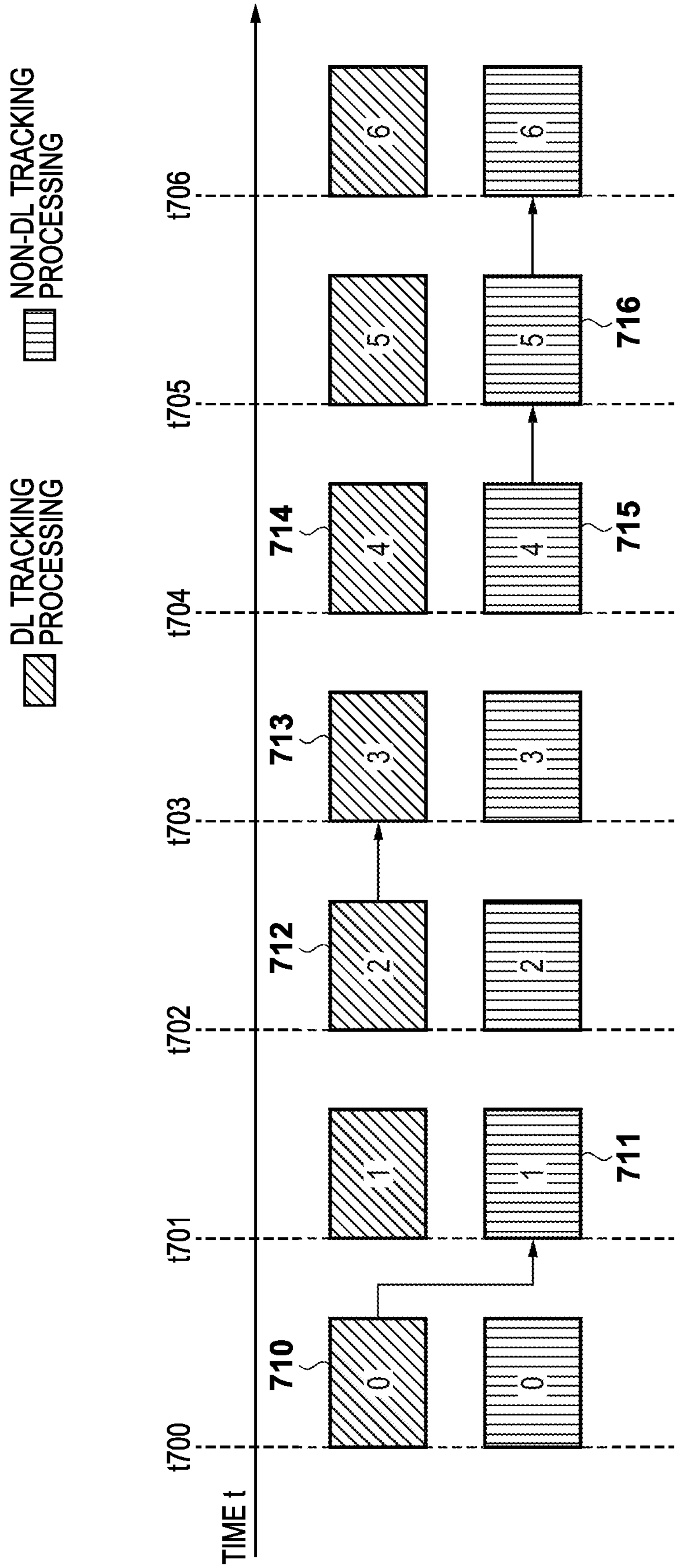

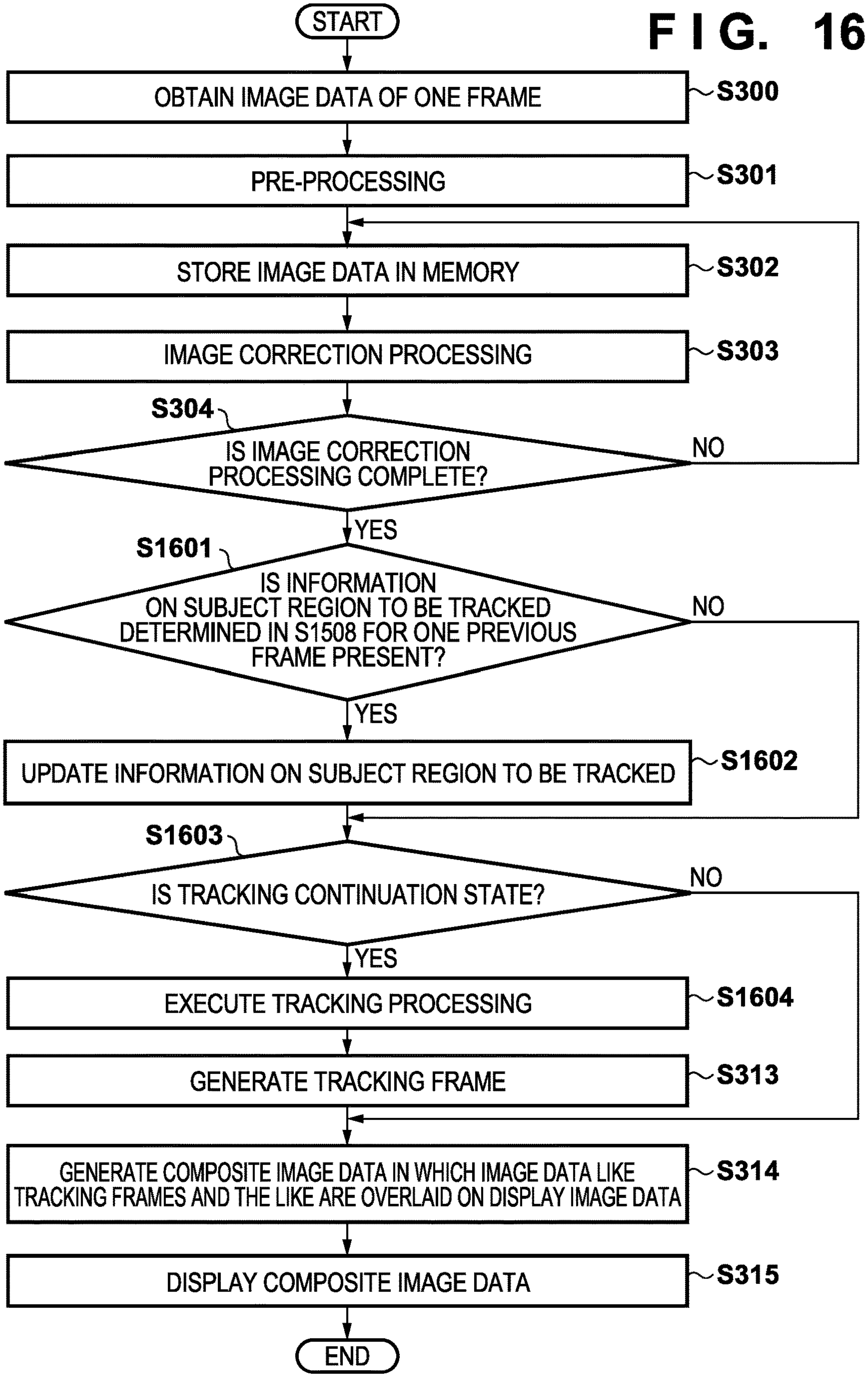

F I G. 16

START

OBTAIN IMAGE DATA OF ONE FRAME ~S300

PRE-PROCESSING ~S301

STORE IMAGE DATA IN MEMORY ~S302

IMAGE CORRECTION PROCESSING ~S303

S304 — IS IMAGE CORRECTION PROCESSING COMPLETE?    NO

YES

S1601 — IS INFORMATION ON SUBJECT REGION TO BE TRACKED DETERMINED IN S1508 FOR ONE PREVIOUS FRAME PRESENT?    NO

YES

UPDATE INFORMATION ON SUBJECT REGION TO BE TRACKED ~S1602

S1603 — IS TRACKING CONTINUATION STATE?    NO

YES

EXECUTE TRACKING PROCESSING ~S1604

GENERATE TRACKING FRAME ~S313

GENERATE COMPOSITE IMAGE DATA IN WHICH IMAGE DATA LIKE TRACKING FRAMES AND THE LIKE ARE OVERLAID ON DISPLAY IMAGE DATA ~S314

DISPLAY COMPOSITE IMAGE DATA ~S315

END

F I G. 18
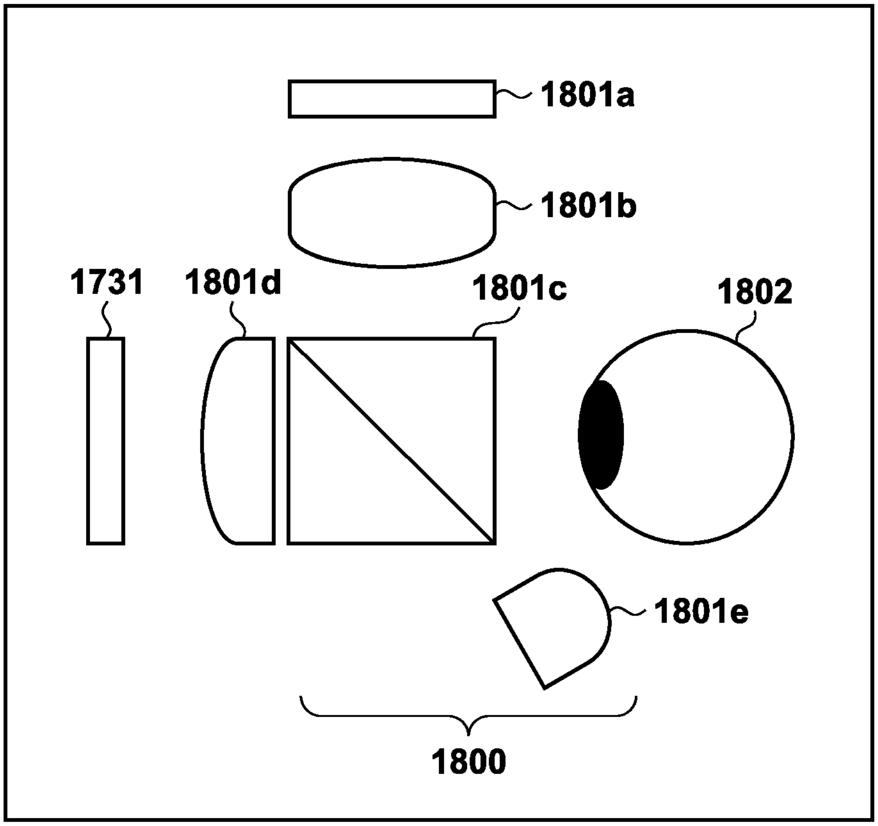

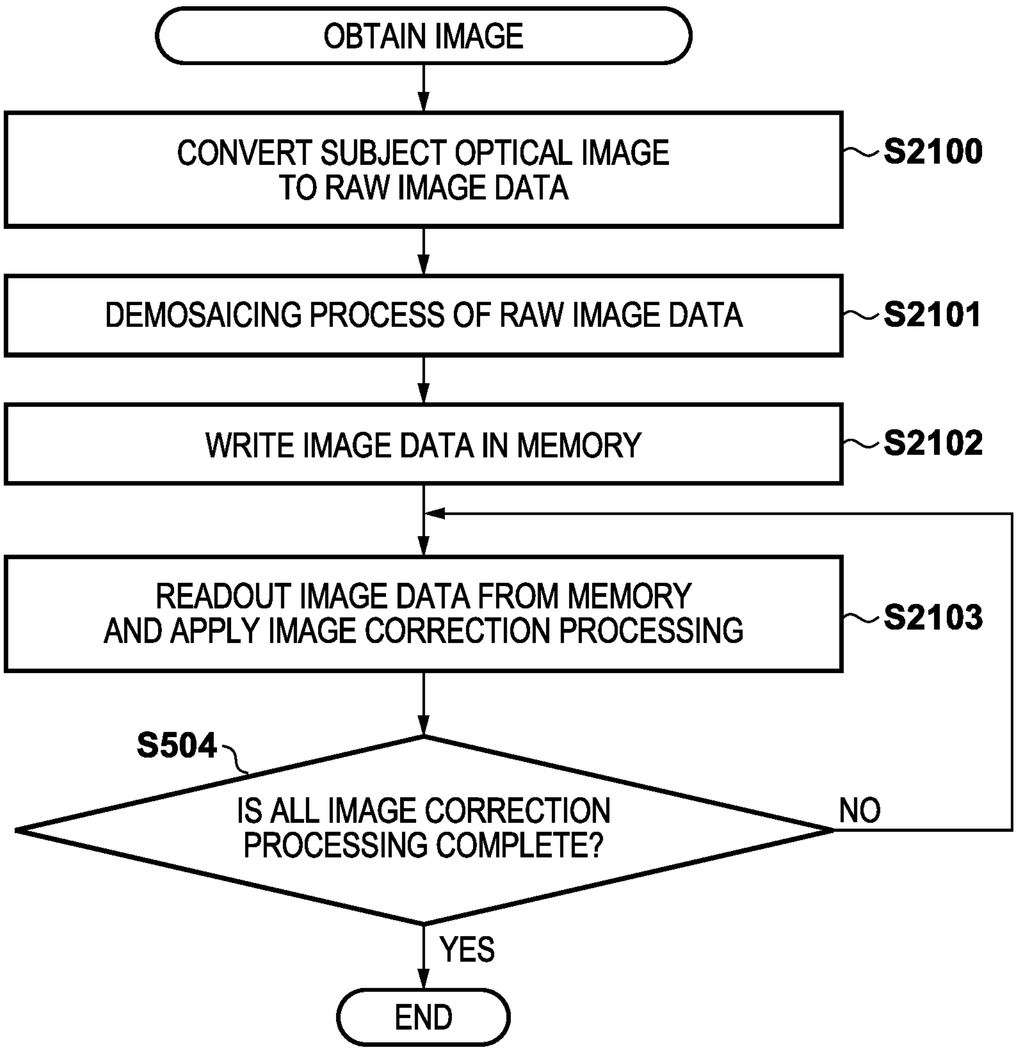

FIG. 21

OBTAIN IMAGE

CONVERT SUBJECT OPTICAL IMAGE
TO RAW IMAGE DATA ~S2100

DEMOSAICING PROCESS OF RAW IMAGE DATA ~S2101

WRITE IMAGE DATA IN MEMORY ~S2102

READOUT IMAGE DATA FROM MEMORY
AND APPLY IMAGE CORRECTION PROCESSING ~S2103

S504~ IS ALL IMAGE CORRECTION
PROCESSING COMPLETE?       NO

YES

END

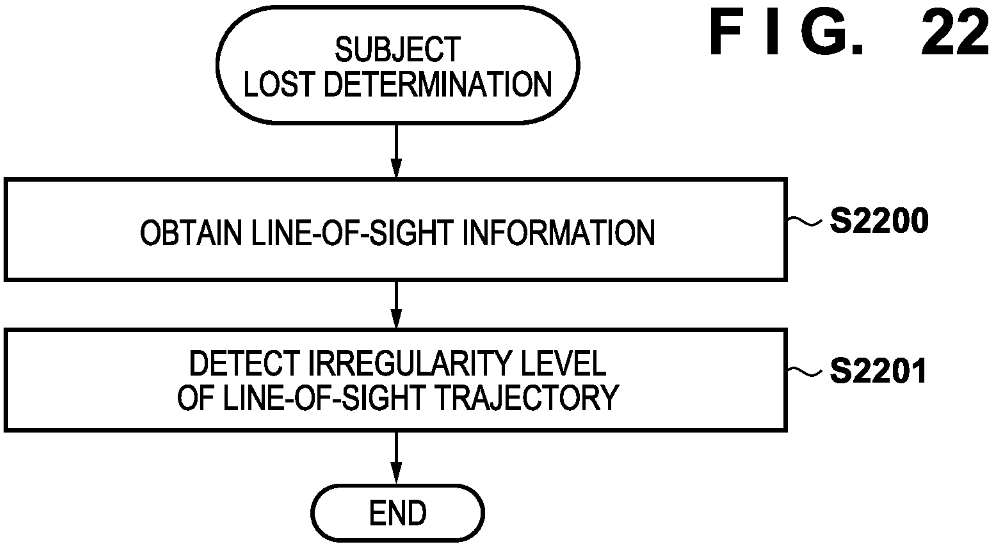

FIG. 22

SUBJECT
LOST DETERMINATION

OBTAIN LINE-OF-SIGHT INFORMATION ~S2200

DETECT IRREGULARITY LEVEL
OF LINE-OF-SIGHT TRAJECTORY ~S2201

END

F I G. 23
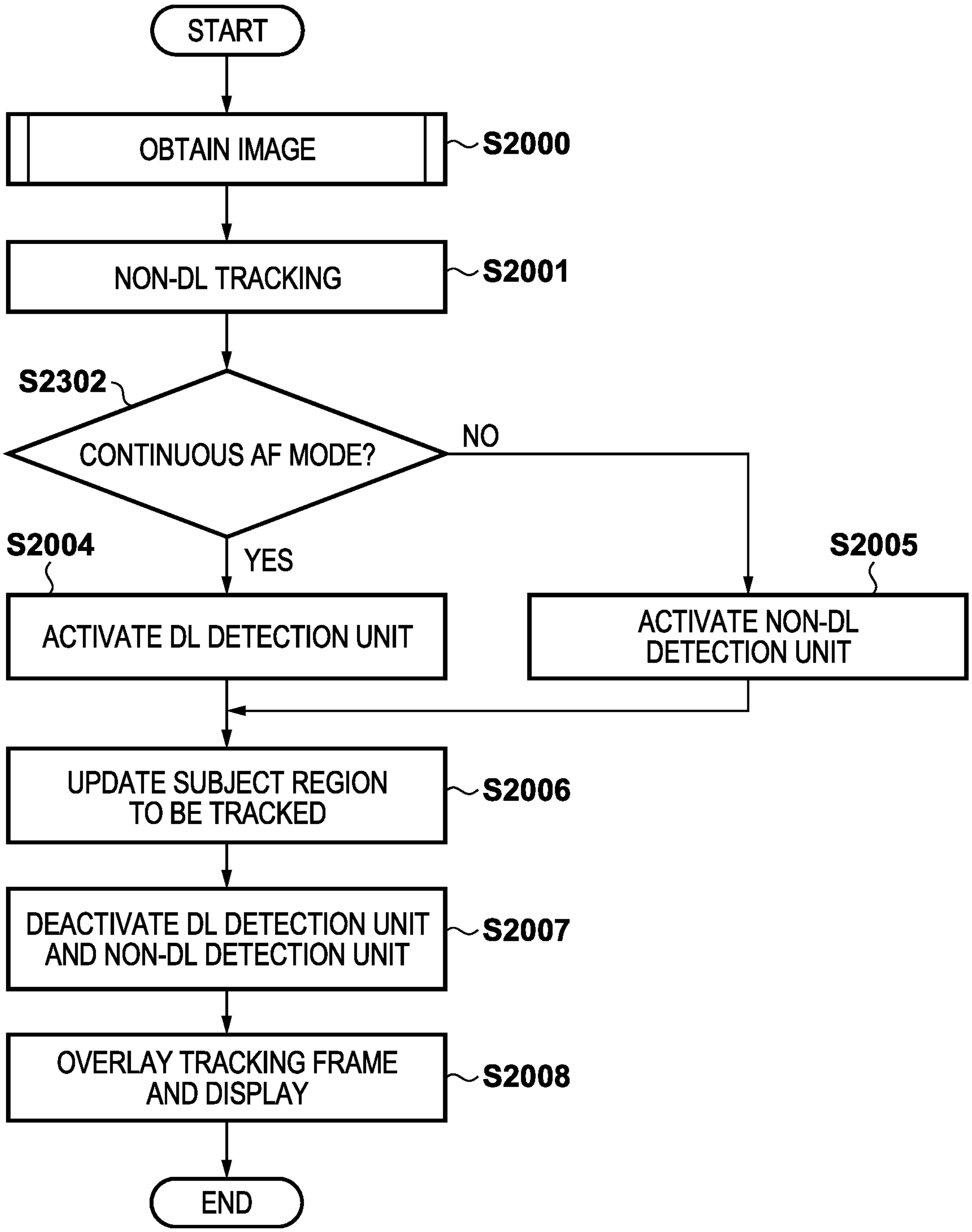

F I G. 24
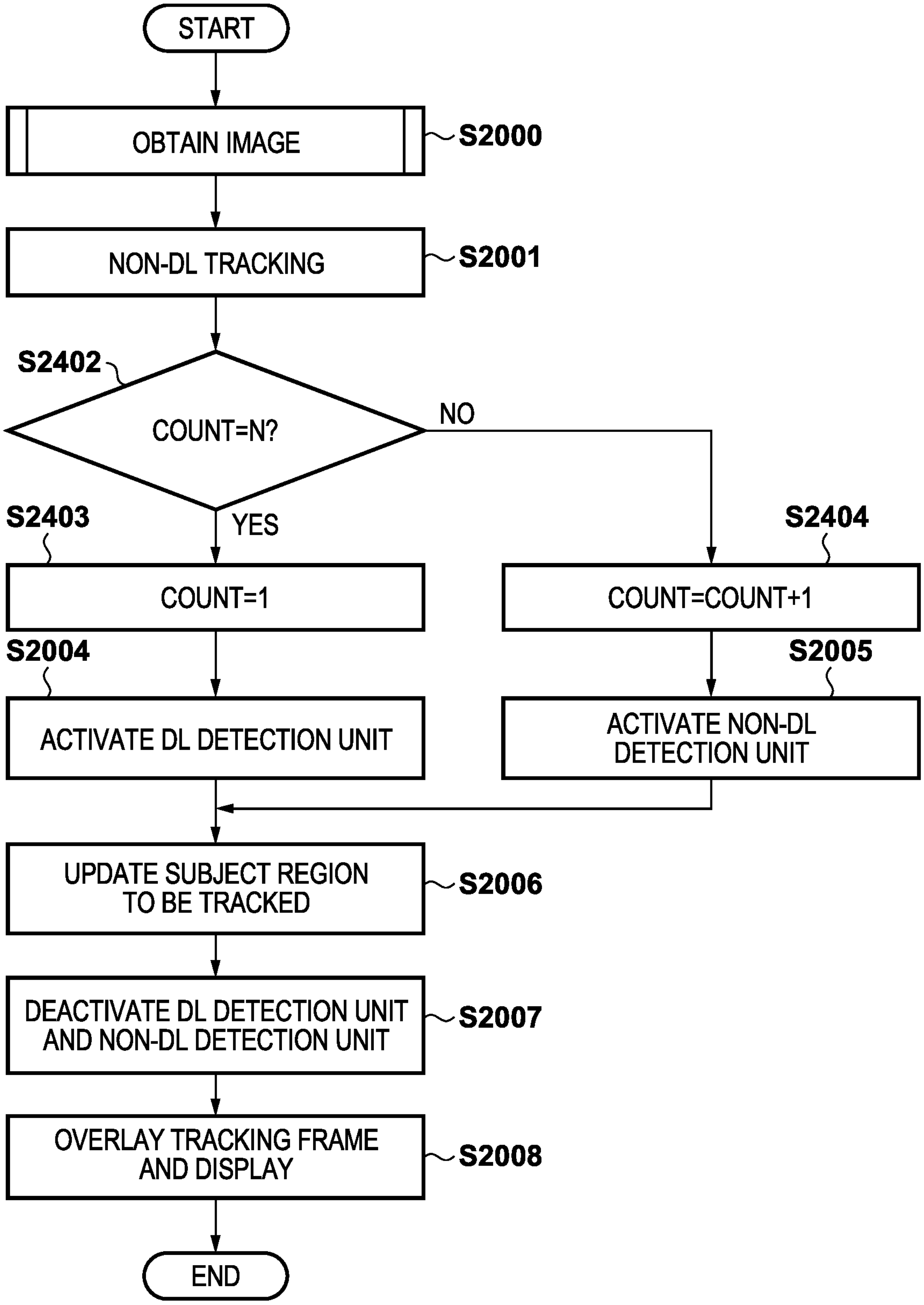

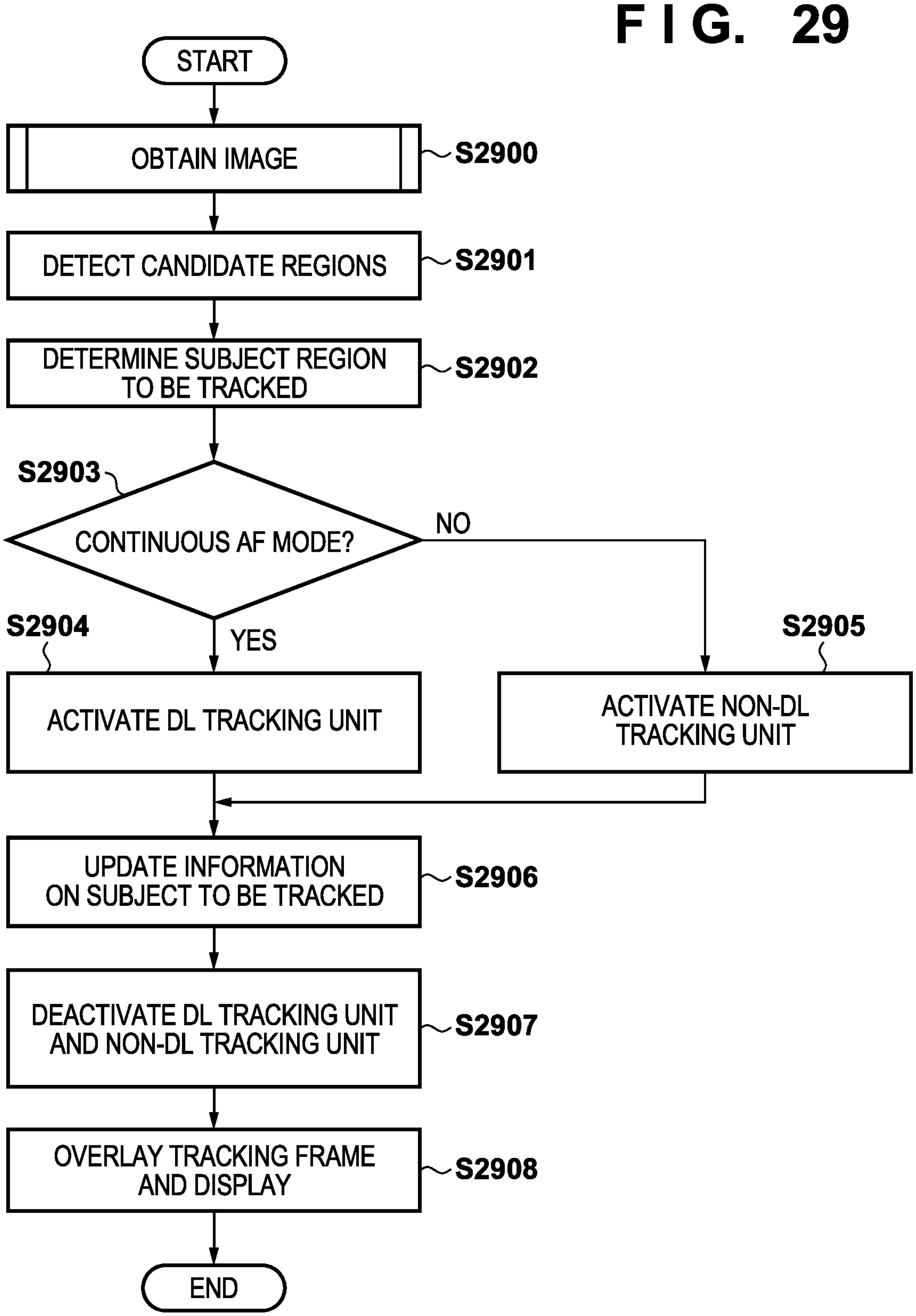
F I G.  29
START
OBTAIN IMAGE ~S2900
DETECT CANDIDATE REGIONS ~S2901
DETERMINE SUBJECT REGION TO BE TRACKED ~S2902
S2903~ CONTINUOUS AF MODE?
NO
YES
S2904 ACTIVATE DL TRACKING UNIT
S2905 ACTIVATE NON-DL TRACKING UNIT
UPDATE INFORMATION ON SUBJECT TO BE TRACKED ~S2906
DEACTIVATE DL TRACKING UNIT AND NON-DL TRACKING UNIT ~S2907
OVERLAY TRACKING FRAME AND DISPLAY ~S2908
END

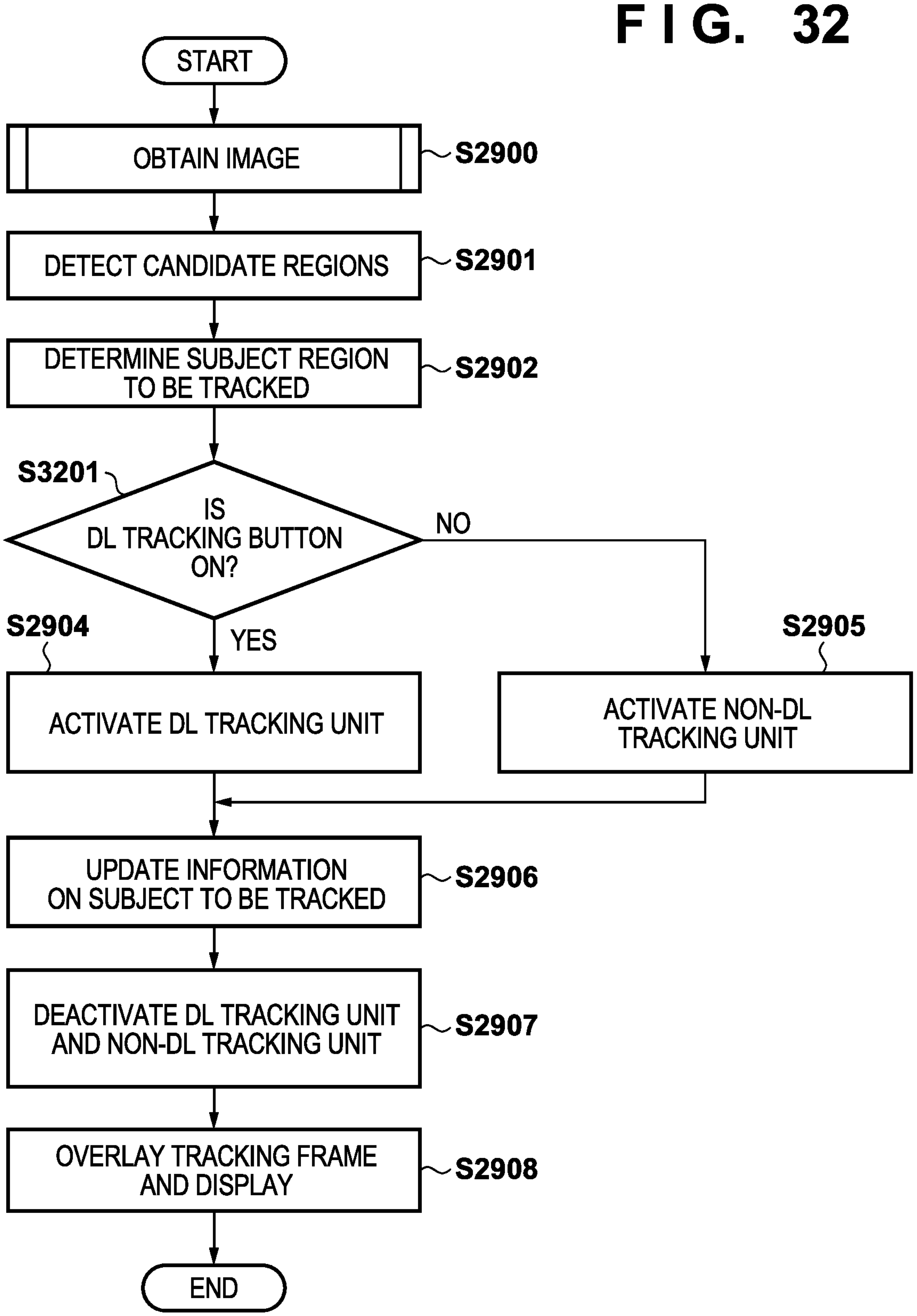
F I G.  32
START
OBTAIN IMAGE ~S2900
DETECT CANDIDATE REGIONS ~S2901
DETERMINE SUBJECT REGION
TO BE TRACKED ~S2902
S3201 — IS
DL TRACKING BUTTON
ON?
NO
YES
S2904
ACTIVATE DL TRACKING UNIT
S2905
ACTIVATE NON-DL
TRACKING UNIT
UPDATE INFORMATION
ON SUBJECT TO BE TRACKED ~S2906
DEACTIVATE DL TRACKING UNIT
AND NON-DL TRACKING UNIT ~S2907
OVERLAY TRACKING FRAME
AND DISPLAY ~S2908
END F I G. 33
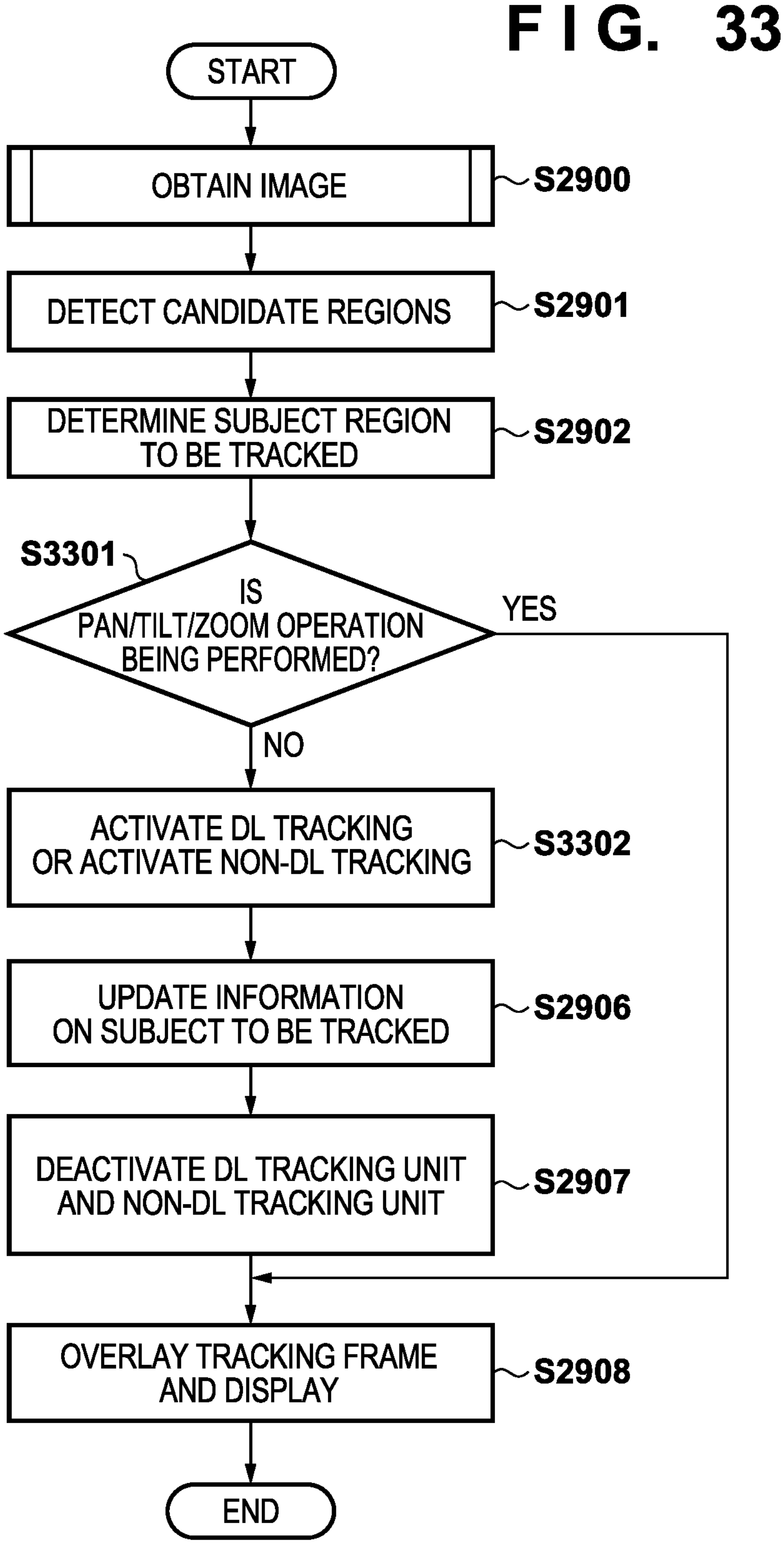

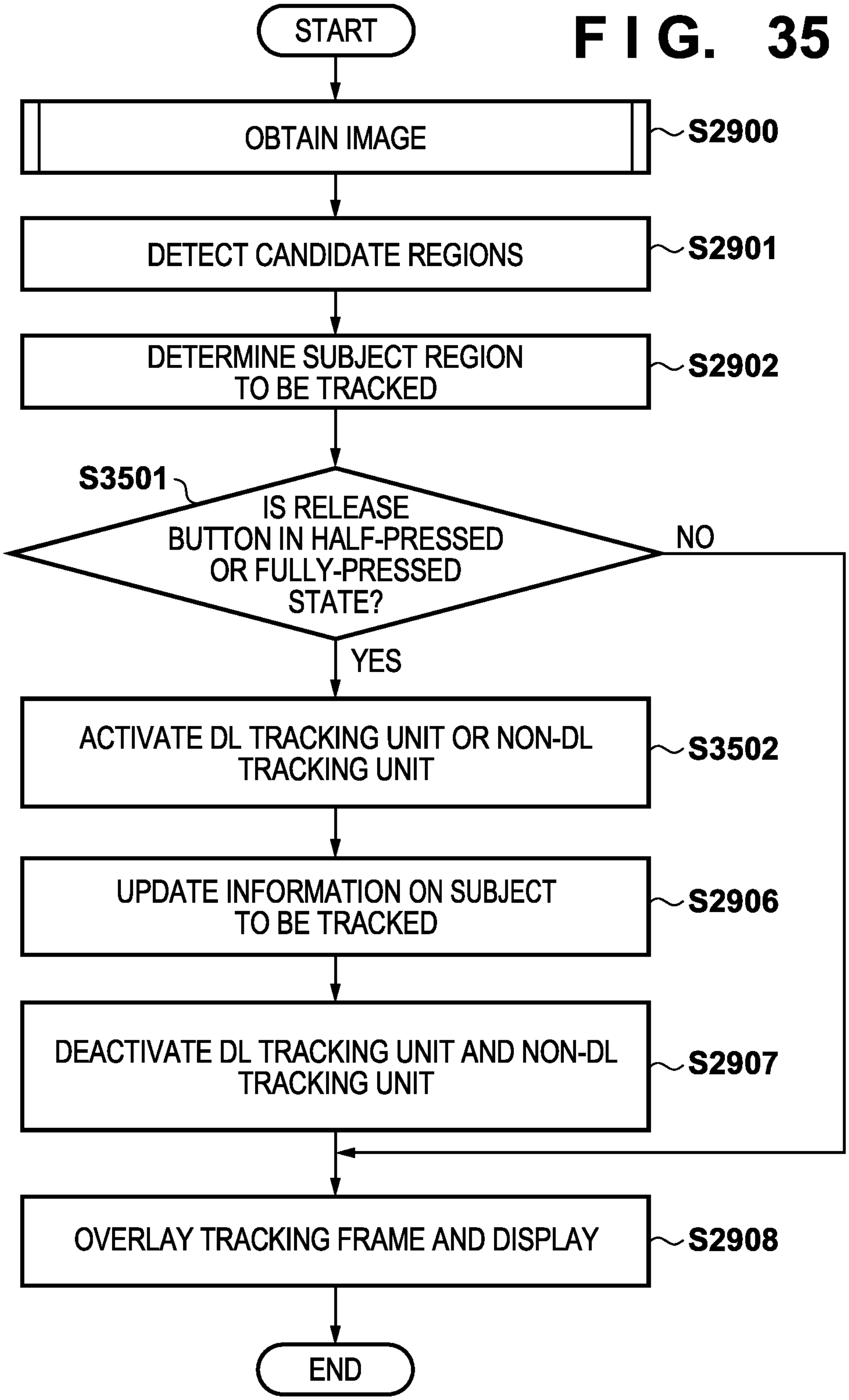
F I G.  35
START
OBTAIN IMAGE ~S2900
DETECT CANDIDATE REGIONS ~S2901
DETERMINE SUBJECT REGION TO BE TRACKED ~S2902
S3501~ IS RELEASE BUTTON IN HALF-PRESSED OR FULLY-PRESSED STATE?
NO
YES
ACTIVATE DL TRACKING UNIT OR NON-DL TRACKING UNIT ~S3502
UPDATE INFORMATION ON SUBJECT TO BE TRACKED ~S2906
DEACTIVATE DL TRACKING UNIT AND NON-DL TRACKING UNIT ~S2907
OVERLAY TRACKING FRAME AND DISPLAY ~S2908
END

IMAGE PROCESSING APPARATUS AND CONTROL METHOD THEREOF

CROSS-REFERENCE TO RELATED APPLICATIONS

This application is a Continuation of International Patent Application No. PCT/JP2021/021400, filed Jun. 4, 2021, which claims the benefit of Japanese Patent Applications No. 2020-102517, filed Jun. 12, 2020, and No. 2021-032036, filed Mar. 1, 2021, all of which are hereby incorporated by reference herein in their entirety.

BACKGROUND OF THE INVENTION

Field of the Invention

The present invention relates to an image processing apparatus and a control method thereof, and particularly relates to a subject tracking technique.

Background Art

Some image processing apparatuses, such as digital cameras, have a function for tracking a feature region (a subject tracking function) by applying detection of a feature region, such as a face region, over time. An apparatus that uses a pre-trained neural network to track a subject is also known (PTL 1).

CITATION LIST

Patent Literature

PTL 1: Japanese Patent Laid-Open No. 2017-156886

Using a neural network may make it possible to improve the accuracy of subject tracking compared to when using correlation, similarity, or the like between image regions. However, processing using neural networks involves high operational loads and requires high-speed processors and large-scale circuits, and there is thus a problem in that the power consumption is high. For example, if subject tracking using a neural network is applied to a moving image for live-view display, battery drain due to the live-view display becomes a problem.

SUMMARY OF THE INVENTION

The present invention has been conceived in light of these problems with conventional techniques. An object of the present invention is to provide an image processing apparatus having a subject tracking function that achieves good performance while suppressing power consumption, and a control method thereof.

According to an aspect of the present invention, there is provided an image processing apparatus comprising: one or more processors that execute a program stored in a memory and thereby function as: a detecting unit configured to detect, in a target frame, one or more regions of a predetermined subject as candidate region(s); a determining unit configured to determine a subject region to be tracked from the candidate region(s); a computing unit configured to compute an evaluation value pertaining to difficulty of tracking, based on the subject region determined by the determining unit; a tracking unit configured to execute tracking processing for estimating a position, in the target frame, of a region corresponding to the subject region to be tracked in a frame previous to the target frame, the tracking unit including a first tracking unit and a second tracking unit; and a control unit configured to determine, based on the evaluation value, operation of the first tracking unit and operation of the second tracking unit, on a subsequent frame to the target frame, wherein the second tracking unit has a higher processing accuracy and a greater operational load than the first tracking unit, and based on the evaluation value, the control unit activates both the first tracking unit and the second tracking unit, or deactivates at least one of the first tracking unit and the second tracking unit.

According to another aspect of the present invention, there is provided an image processing apparatus comprising: one or more processors that execute a program stored in a memory and thereby function as: a detecting unit configured to detect, in a target frame, one or more regions of a predetermined subject as candidate region(s); a determining unit configured to determine a subject region to be tracked from the candidate region(s); a tracking unit configured to execute tracking processing for estimating a position, in the target frame, of a region corresponding to the subject region to be tracked in a frame previous to the target frame, the tracking unit including first tracking unit and second tracking unit; and a control unit configured to determine, based on a type of the subject detected by the detecting unit, operation of the first tracking unit and operation of the second tracking unit on a subsequent frame to the target frame, wherein the second tracking unit has a higher processing accuracy and a greater operational load than the first tracking unit, and based on the type of the subject detected by the detecting unit, the control unit activates both the first tracking unit and the second tracking unit, or deactivates at least one of the first tracking unit and the second tracking unit.

According to a further aspect of the present invention, there is provided a control method for an image processing apparatus, wherein the image processing apparatus includes a tracking unit for executing tracking processing for estimating a position, in a target frame, of a region corresponding to a subject region to be tracked in a frame previous to the target frame, the tracking unit includes first tracking unit, and second tracking unit having a higher processing accuracy and a greater operational load than the first tracking unit, and the control method comprises: detecting, in a target frame, one or more regions of a predetermined subject as candidate region(s); determining a subject region to be tracked from the candidate region(s); computing an evaluation value pertaining to difficulty of tracking, based on the subject region determined in the determining; and controlling, based on the evaluation value, operation of the first tracking unit and operation of the second tracking unit on a subsequent frame to the target frame, wherein the controlling, based on the evaluation value, activates both the first tracking unit and the second tracking unit, or deactivates at least one of the first tracking unit and the second tracking unit.

According to another aspect of the present invention, there is provided a control method for an image processing apparatus, wherein the image processing apparatus includes a tracking unit for executing tracking processing for estimating a position, in a target frame, of a region corresponding to a subject region to be tracked in a frame previous to the target frame, the tracking unit includes a first tracking unit, and a second tracking unit having a higher processing accuracy and a greater operational load than the first tracking unit, and the control method comprises: detecting, in a target frame, one or more regions of a predetermined subject as candidate region(s); determining a subject region to be tracked from the candidate region(s); and controlling, based on a type of the subject detected in the detecting, operation of the first tracking unit and operation of the second tracking unit on a subsequent frame to the target frame, wherein the controlling, based on the type of the subject detected in the detecting step, activates both the first tracking unit and the second tracking unit, or deactivates at least one of the first tracking unit and the second tracking unit.

According to a further aspect of the present invention, there is provided an image processing apparatus comprising: one or more processors that execute a program stored in a memory and thereby function as: a detecting unit configured to detect, in a target frame, one or more regions of a predetermined subject as candidate region(s); a computing unit configured to, based on a detection result for the candidate region(s), compute an evaluation value pertaining to difficulty of determination processing for determining a region to be subject to tracking processing from the candidate region(s); a target determining unit, including a first determining unit and a second determining unit, configured to perform the determination processing on the candidate region(s) detected by the detecting unit; and a control unit configured to control, based on the evaluation value, operation of the first determining unit and operation of the second determining unit, wherein the second determining unit has a higher processing accuracy and a greater operational load than the first determining unit, and based on the evaluation value, the control unit activates both, deactivates one, or deactivates both of the first determining unit and the second determining unit.

According to another aspect of the present invention, there is provided an image processing apparatus comprising: one or more processors that execute a program stored in a memory and thereby function as: a detecting unit configured to detect, in a target frame, one or more regions of a predetermined subject as candidate region(s); a target determining unit configured to perform determination processing for determining a region to be subject to tracking processing from the candidate region(s) detected by the detecting unit, the target determining unit including a first determining unit and a second determining unit having a higher accuracy and a greater operational load than the first determining unit; and a control unit configured to control, based on a detection result for the candidate region(s), operation of the first determining unit and operation of the second determining unit, wherein based on a type and number of the detected candidate region(s), the control unit activates both, deactivates one, or deactivates both of the first determining unit and the second determining unit.

According to a further aspect of the present invention, there is provided a control method for an image processing apparatus comprising: detecting, in a target frame, one or more regions of a predetermined subject as candidate region(s); computing, based on a detection result for the candidate region(s), an evaluation value pertaining to difficulty of determination processing for determining a region to be subject to tracking processing from the candidate region(s); and controlling, based on the evaluation value, operation of target determining unit, included in the image processing apparatus, that performs the determination processing, wherein the target determining unit includes a first determining unit and a second determining unit having a higher accuracy and a greater operational load than the first determining unit, and the controlling, based on the evaluation value, activates both, deactivates one, or deactivates both of the first determining unit and the second determining unit.

According to another aspect of the present invention, there is provided a control method for an image processing apparatus comprising: detecting, in a target frame, one or more regions of a predetermined subject as candidate region(s); and controlling, based on a detection result for the candidate region(s), operation of target determining unit, included in the image processing apparatus, that performs determination processing for determining a region to be subject to tracking processing from the candidate region(s), wherein the target determining unit includes a first determining unit and a second determining unit having a higher accuracy and a greater operational load than the first determining unit, and the controlling, based on a type and number of the detected candidate region(s), activates both, deactivates one, or deactivates both of the first determining unit and the second determining unit.

According to a further aspect of the present invention, there is provided a non-transitory machine-readable medium that stores a program for causing, when executed by a computer, the computer to function as an image processing apparatus according to the present invention.

Further features of the present invention will become apparent from the following description of exemplary embodiments with reference to the attached drawings.

BRIEF DESCRIPTION OF THE DRAWINGS

FIG. 6 is a timing chart pertaining to the use of a tracking processing result in the first embodiment.

FIG. 16 is a flowchart pertaining to live-view display operation during subject tracking in the second embodiment.

FIG. 18 is a diagram illustrating the configuration of a line-of-sight information obtainment apparatus according to embodiments.

FIG. 21 is a flowchart pertaining to operation by the system control unit according to the third embodiment.

FIG. 22 is a flowchart pertaining to operation by the system control unit according to the third embodiment.

FIG. 23 is a flowchart pertaining to operation by a system control unit according to the fourth embodiment.

FIG. 24 is a flowchart pertaining to operation by a system control unit according to the fifth embodiment.

FIG. 29 is a flowchart pertaining to operation by a system control unit according to the ninth embodiment.

FIG. 32 is a flowchart pertaining to operation by a system control unit according to the twelfth embodiment.

FIG. 33 is a flowchart pertaining to operation by a system control unit according to the thirteenth embodiment.

FIG. 35 is a flowchart pertaining to operation by a system control unit according to the fifteenth embodiment.

DESCRIPTION OF THE EMBODIMENTS

Figure 1:
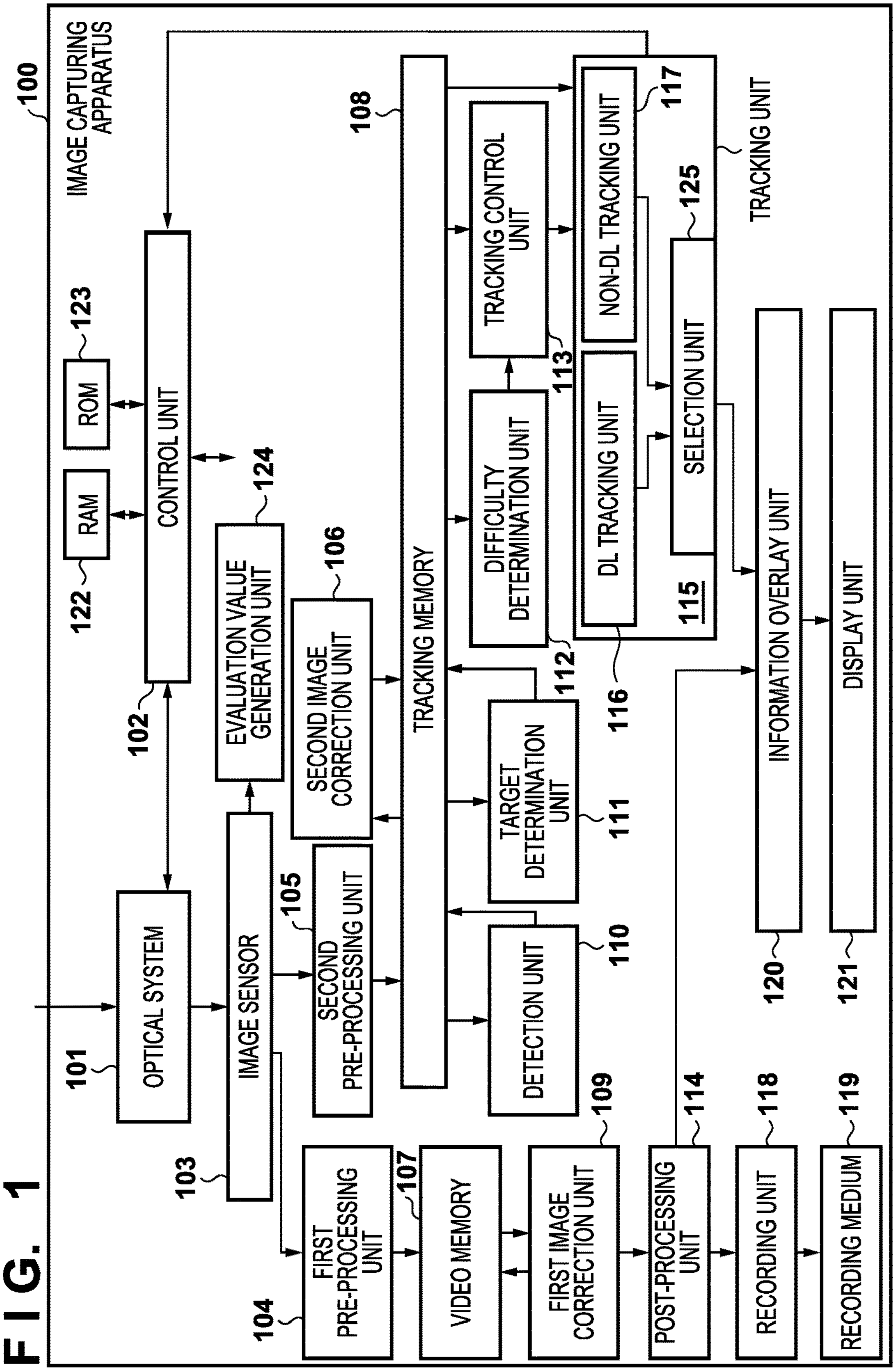
FIG. 1 is a block diagram illustrating an example of the functional configuration of an image capturing apparatus according to a first embodiment.

Hereinafter, the present invention will be described in detail based on example embodiments thereof, with reference to the accompanying drawings. Note that the following embodiments do not limit the invention as set forth in the scope of patent claims. Additionally, although several features are described in the embodiments, all of these features are not necessarily required for the invention, and multiple features may be combined as desired. Furthermore, in the accompanying drawings, the same or similar configurations are given the same reference numerals, and redundant descriptions thereof will be omitted.

Note that the following embodiments will describe a case where the present invention is applied in an image capturing apparatus such as a digital camera. However, an image capturing apparatus is merely one example of an image processing apparatus in which the present invention can be applied, and the present invention can be implemented in any electronic device capable of image processing. Examples of such an electronic device include computer devices (personal computers, tablet computers, media players, PDAs, and the like), mobile phones, smartphones, game consoles, robots, drones, and dashboard cameras. These are merely examples, however, and the present invention can be applied in other electronic devices as well.

First Embodiment

FIG. 1 is a block diagram illustrating an example of the functional configuration of an image capturing apparatus 100 serving as an example of an image processing apparatus according to a first embodiment.

An optical system 101 has a plurality of lenses, including movable lenses such as a focus lens, and forms an optical image of an image capturing range on the image forming surface of an image sensor 103.

A control unit 102 includes a CPU, and for example, loads programs stored in ROM 123 into RAM 122 and executes the programs. The control unit 102 implements the functions of the image capturing apparatus 100 by controlling the operation of the respective function blocks. The ROM 123 is, for example, rewritable non-volatile memory, and stores programs which can be executed by the CPU of the control unit 102, setting values, GUI data, and the like. The RAM 122 is system memory which is used to load programs executed by the CPU of the control unit 102, store values required while programs are being executed, and so on. Although not illustrated in FIG. 1, the control unit 102 is communicably connected to the respective function blocks.

The image sensor 103 may be a CMOS image sensor having, for example, a primary color Bayer array color filter. A plurality of pixels, each having a photoelectric conversion region, are arranged two-dimensionally in the image sensor 103. The image sensor 103 uses the plurality of pixels to convert an optical image formed by the optical system 101 into an electrical signal group (an analog image signal). The analog image signal is converted into a digital image signal (image data) by an A/D converter in the image sensor 103. The A/D converter may be provided outside the image sensor 103.

An evaluation value generation unit 124 generates signals, evaluation values, and the like used in automatic focus detection (AF), computes evaluation values used in automatic exposure control (AE), and the like from image data obtained from the image sensor 103. The evaluation value generation unit 124 outputs the generated signals and evaluation values to the control unit 102. Based on the signals, evaluation values, and the like obtained from the evaluation value generation unit 124, the control unit 102 controls the focus lens position of the optical system 101, determines shooting conditions (exposure time, aperture value, ISO sensitivity, and the like), and so on. The evaluation value generation unit 124 may generate signals, evaluation values, and the like from display image data generated by a post-processing unit 114, which will be described later.

A first pre-processing unit 104 applies color interpolation processing to the image data obtained from the image sensor 103. The color interpolation processing is also called "demosaicing", and is processing of giving R component, G component, and B component values to each instance of pixel data constituting the image data. The first pre-processing unit 104 may also apply reduction processing for reducing the number of pixels as necessary. The first pre-processing unit 104 stores the image data to which the processing has been applied in video memory 107.

A first image correction unit 109 applies correction processing such as white balance correction processing and shading correction processing, conversion processing for converting from RGB format to YUV format, and the like to the image data stored in the video memory 107. Note that when applying the correction processing, the first image correction unit 109 may use image data from at least one frame different from the frame to be processed, among the image data stored in the video memory 107. The first image correction unit 109 can, for example, use the image data of the frames before and/or after the target frame, in chronological order, in the correction processing. The first image correction unit 109 outputs the image data to which the processing has been applied to the post-processing unit 114.

The post-processing unit 114 generates recording image data, display image data, and the like from the image data supplied from the first image correction unit 109. For example, the post-processing unit 114 applies encoding processing to the image data, and generates a data file storing the encoded image data as the recording image data. The post-processing unit 114 supplies the recording image data to a recording unit 118.

The post-processing unit 114 also generates the display image data, for display in a display unit 121, from the image data supplied from the first image correction unit 109. The display image data has a size which is based on the display size of the display unit 121. The post-processing unit 114 supplies the display image data to an information overlay unit 120.

The recording unit 118 records the recording image data, converted by the post-processing unit 114, into a recording medium 119. The recording medium 119 may be, for example, a semiconductor memory card, built-in non-volatile memory, or the like.

A second pre-processing unit 105 applies color interpolation processing to the image data output from the image sensor 103. The second pre-processing unit 105 stores the image data to which the processing has been applied in tracking memory 108. The tracking memory 108 and the video memory 107 may be implemented as separate address spaces within the same memory space. The second pre-processing unit 105 may also apply reduction processing for reducing the number of pixels as necessary, in order to lighten the processing load. Although the first pre-processing unit 104 and the second pre-processing unit 105 are described as separate function blocks here, these units may be configured using a common pre-processing unit.

A second image correction unit 106 applies correction processing such as white balance correction processing and shading correction processing, conversion processing for converting from RGB format to YUV format, and the like to the image data stored in the tracking memory 108. The second image correction unit 106 may also apply image processing suited to subject detection processing to the image data. For example, if a representative luminance of the image data (e.g., an average luminance of all the pixels) is less than a predetermined threshold, the second image correction unit 106 may multiply the entirety of the image data by a set coefficient (gain) such that the representative luminance becomes at least the threshold.

Note that when applying the correction processing, the second image correction unit 106 may use image data from at least one frame different from the frame to be processed, among the image data stored in the tracking memory 108. The second image correction unit 106 can, for example, use the image data of the frames before and/or after the target frame, in chronological order, in the correction processing. The second image correction unit 106 stores the image data to which the processing has been applied in tracking memory 108.

Note that the function blocks pertaining to the subject tracking function, such as the second pre-processing unit 105, the second image correction unit 106, and the like, need not operate when the subject tracking function is not used. Additionally, the image data to which the subject tracking function is applied is moving image data shot for the purpose of live-view display or recording. The moving image data has a predetermined framerate of 30 fps, 60 fps, 120 fps, or the like, for example.

A detection unit 110 detects at least one region of a predetermined candidate subject (a candidate region) from one frame's worth of image data. Additionally, for each detected region, the detection unit 110 associates an object class, which indicates the position within the frame, the size, and the type of the candidate subject (automobile, aircraft, bird, insect, human body, head, pupil, cat, dog, or the like), with a confidence level thereof. The number of regions detected is also counted for each object class.

The detection unit 110 can detect the candidate regions using a publicly-known technique for detecting feature regions such as face regions of humans or animals. For example, the detection unit 110 may be configured as a class discriminator pre-trained using training data. The discrimination (classification) algorithm is not particularly limited. The detection unit 110 can be realized by training a discriminator implementing multiclassed logistic regression, support vector machines, random forests, neural networks, and the like. The detection unit 110 stores a detection result in the tracking memory 108.

A target determination unit 111 determines the subject region to be tracked (a main subject region) from the candidate regions detected by the detection unit 110. The subject region to be tracked can be determined based on a priority order assigned in advance for each of items included in the detection result, such as, for example, the object class, the size of the region, and the like. Specifically, a total of the priority orders may be computed for each candidate region, and the candidate region having the lowest total may be determined as the subject region to be tracked. Alternatively, a candidate region closest to the center of the image or a focus detection region, the largest candidate region, or the like among the candidate regions belonging to a specific object class may be determined as the subject region to be tracked. The target determination unit 111 stores information identifying the determined subject region in the tracking memory 108.

A difficulty determination unit 112 computes a difficulty score, which is an evaluation value indicating the difficulty of tracking, for the subject region to be tracked, determined by the target determination unit 111. For example, the difficulty determination unit 112 can compute the difficulty score taking into account at least one factor that affects the difficulty of tracking. The size of the subject region, the object class (type) of the subject, the total number of regions belonging to the same object class, the position within the image, and the like can be given as examples of factors that affect the difficulty of tracking. A specific example of a method for computing the difficulty score will be given later. The difficulty determination unit 112 outputs the computed difficulty score to a tracking control unit 113.

The tracking control unit 113 determines whether to activate or deactivate each of a plurality of tracking units included in a tracking unit 115 based on the difficulty score computed by the difficulty determination unit 112. In the present embodiment, the tracking unit 115 includes a plurality of tracking units having different operational loads and tracking accuracies. Specifically, the tracking unit 115 includes a DL tracking unit 116 that performs subject tracking using deep learning (DL), and a non-DL tracking unit 117 that performs subject tracking without using DL. The DL tracking unit 116 is assumed to have a higher processing accuracy than the non-DL tracking unit 117, but also a greater operational load than the non-DL tracking unit 117.

In this case, the tracking control unit 113 determines whether to activate or deactivate each of the DL tracking unit 116 and the non-DL tracking unit 117. The tracking control unit 113 also determines the operational frequency of the tracking unit to be activated. The "operational frequency" is the frequency (in fps) at which the tracking processing is applied.

The tracking unit 115 estimates the subject region to be tracked from the image data of the target frame (the current frame) stored in the tracking memory 108, and obtains the position and size of the estimated subject region within the frame as a tracking result. The tracking unit 115 estimates the subject region to be tracked within the current frame using the image data of the current frame and the image data of a past frame shot before the current frame (e.g., one frame previous), for example. The tracking unit 115 outputs the tracking result to the information overlay unit 120.

Here, the tracking unit 115 estimates a region, within the target frame, that corresponds to the subject region to be tracked in the past frame. In other words, the subject region to be tracked, determined by the target determination unit 111 for the target frame, is not the subject region to be tracked in the tracking processing performed on the target frame. The subject region to be tracked in the tracking processing performed on the target frame is the subject region to be tracked in the past frame. The subject region to be tracked, determined by the target determination unit 111 for the target frame, is used in the tracking processing for the next frame, when the subject to be tracked switches to another subject.

The tracking unit 115 includes the DL tracking unit 116, which performs subject tracking using deep learning (DL), and the non-DL tracking unit 117, which performs subject tracking without using DL. The tracking unit activated by the tracking control unit 113 outputs the tracking result at the operational frequency set by the tracking control unit 113.

The DL tracking unit 116 estimates the position and size of the subject region to be tracked, using a pre-trained multilayer neural network including convolutional layers. More specifically, the DL tracking unit 116 has a function for extracting feature points, and feature amounts contained in the feature points, for the subject region of each object class that can be a target, and a function for associating the extracted feature points between frames. Accordingly, the DL tracking unit 116 can estimate the position and size of the subject region to be tracked in the current frame from feature points in the current frame that are associated with feature points for the subject region to be tracked in the past frame.

The DL tracking unit 116 outputs the position, size, and a confidence level score for the subject region to be tracked estimated for the current frame. The confidence level score indicates a confidence level of the feature point associations between frames, i.e., a confidence level of the estimation result for the subject region to be tracked. The confidence level score indicating a low confidence level of the feature point associations between frames means that the subject region estimated in the current frame may be a region related to a subject different from the subject region to be tracked in the past frame.

On the other hand, the non-DL tracking unit 117 estimates the subject region to be tracked in the current frame through a method that does not use deep learning. Here, the non-DL tracking unit 117 is assumed to estimate the subject region to be tracked based on a similarity of color compositions. However, another method may be used, such as pattern matching which takes the subject region to be tracked in the past frame as a template. The non-DL tracking unit 117 outputs the position, size, and a confidence level score for the subject region to be tracked estimated for the current frame.

The similarity of color compositions will be described here. To facilitate the descriptions and understanding, it is assumed here that the shape and size of the subject region to be tracked is the same between the past frame and the current frame. It is further assumed that the image data has a depth of eight bits (values of 0 to 255) for each RGB color component.

The non-DL tracking unit 117 divides the range of possible values (0 to 255) for a given color component (e.g., the R component) into a plurality of regions. Then, the non-DL tracking unit 117 takes a result of classifying the pixels included in the subject region to be tracked by the region to which the R component values belongs (a frequency for each range of values) as the color composition of the subject region to be tracked.

As the simplest example, assume that the range of possible values for the R component (0 to 255) is divided into Red1, corresponding to 0 to 127, and Red2, corresponding to 128 to 255. Furthermore, assume that the color composition of the subject region to be tracked in the past frame is 50 pixels of Red1 and 70 pixels of Red2. Additionally, assume that the color composition of the subject region to be tracked in the current frame is 45 pixels of Red1 and 75 pixels of Red2.

In this case, the non-DL tracking unit 117 can compute a score indicating the similarity of the color compositions (a similarity score) as follows based on a difference between the numbers of pixels classified into the same range of values.

$$\text{similarity score} = |50-45| + |70-75| = 10$$

Assuming that the color composition of the subject region to be tracked in the current frame is 10 pixels of Red1 and 110 pixels of Red2, the similarity score will be:

$$\text{similarity score} = |50 - 10| + |70 - 110| = 80$$

In this manner, the similarity score increases as the similarity of the color compositions decreases. Alternatively, a lower similarity score indicates a higher similarity of the color compositions.

A selection unit 125 adopts the tracking result from the DL tracking unit 116 or the non-DL tracking unit 117 based on the confidence level score output by the DL tracking unit 116 and the similarity score output by the non-DL tracking unit 117. For example, the selection unit 125 adopts the tracking result from the non-DL tracking unit 117 if the confidence level score is no greater than a predetermined confidence level score threshold and the similarity score is no greater than a predetermined similarity score threshold, and adopts the tracking result from the DL tracking unit 116 if not. The selection unit 125 outputs the tracking result adopted to the information overlay unit 120 and the control unit 102.

Here, which of the tracking result from the DL tracking unit 116 and the tracking result from the non-DL tracking unit 117 to adopt is determined based on the confidence level score and the similarity score. However, this determination may be made through another method. For example, using the fact that the accuracy of the DL tracking unit 116 tends to be higher than the accuracy of the non-DL tracking unit 117, the tracking result from the DL tracking unit 116 may be adopted preferentially. Specifically, if a tracking result from the DL tracking unit 116 is obtained, the tracking result from the DL tracking unit 116 may be adopted, and if not, the tracking result from the non-DL tracking unit 117 may be adopted.

The information overlay unit 120 generates an image of a tracking frame based on the size of the subject region included in the tracking result output by the tracking unit 115. For example, the image of the tracking frame may be a frame-shaped image expressing a rectangular outline bounding the subject region. The information overlay unit 120 then generates composite image data by overlaying the image of the tracking frame on the display image data output by the post-processing unit 114 such that the tracking frame is displayed at the position of the subject region included in the tracking result. The information overlay unit 120 may also generate images expressing the current setting values, status, and the like of the image capturing apparatus 100 and overlay those images on the display image data output by the post-processing unit 114 so as to be displayed in predetermined positions. The information overlay unit 120 outputs the composite image data to the display unit 121.

The display unit 121 may be, for example, a liquid crystal display or an organic EL display. The display unit 121 displays an image based on the composite image data output by the information overlay unit 120. One frame's worth of live-view display is performed in this manner.

Figure 2A:
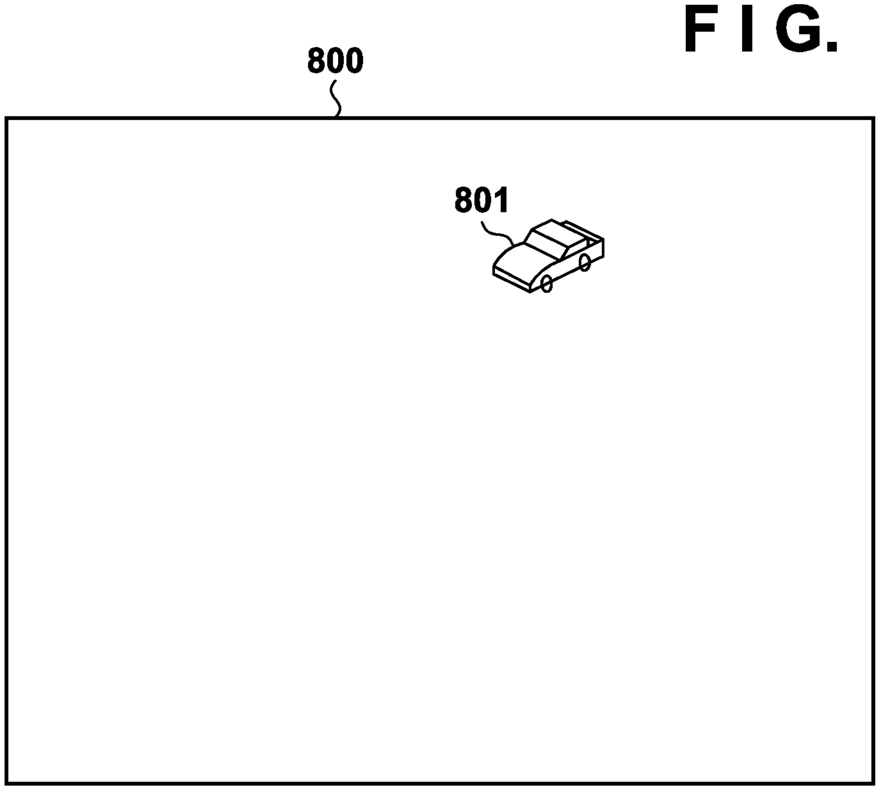
FIG. 2A is a diagram illustrating an example of the display of a subject tracking result in an image capturing apparatus according to the first embodiment.
Figure 2B:
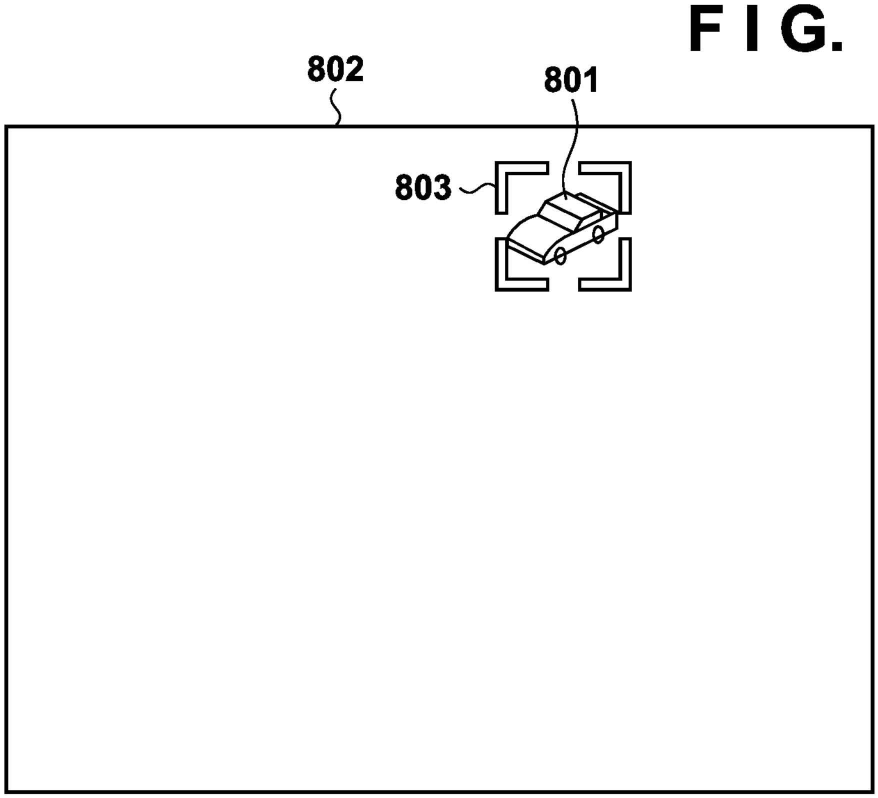
FIG. 2B is a diagram illustrating an example of the display of a subject tracking result in the image capturing apparatus according to the first embodiment.

FIGS. 2A and 2B are diagrams illustrating an example of the live-view display. FIG. 2A illustrates an image 800 expressed by the display image data output by the post-processing unit 114. FIG. 2B illustrates an image 802 expressed by the composite image data in which an image of a tracking frame 803 is overlaid on the display image data. Here, only one candidate subject 801 is present in the image capturing range, and thus the candidate subject 801 is selected as the subject to be tracked. The tracking frame 803 is overlaid so as to surround the candidate subject 801. In the example in FIG. 2B, the tracking frame 803 is constituted by a combination of four hollow bracket shapes, but the tracking frame 803 may be a combination of non-hollow bracket shapes, an unbroken frame, a combination of rectangular shapes, a combination of triangular shapes, or another form. The form of the tracking frame 803 may also be selectable by the user.

Figure 3:
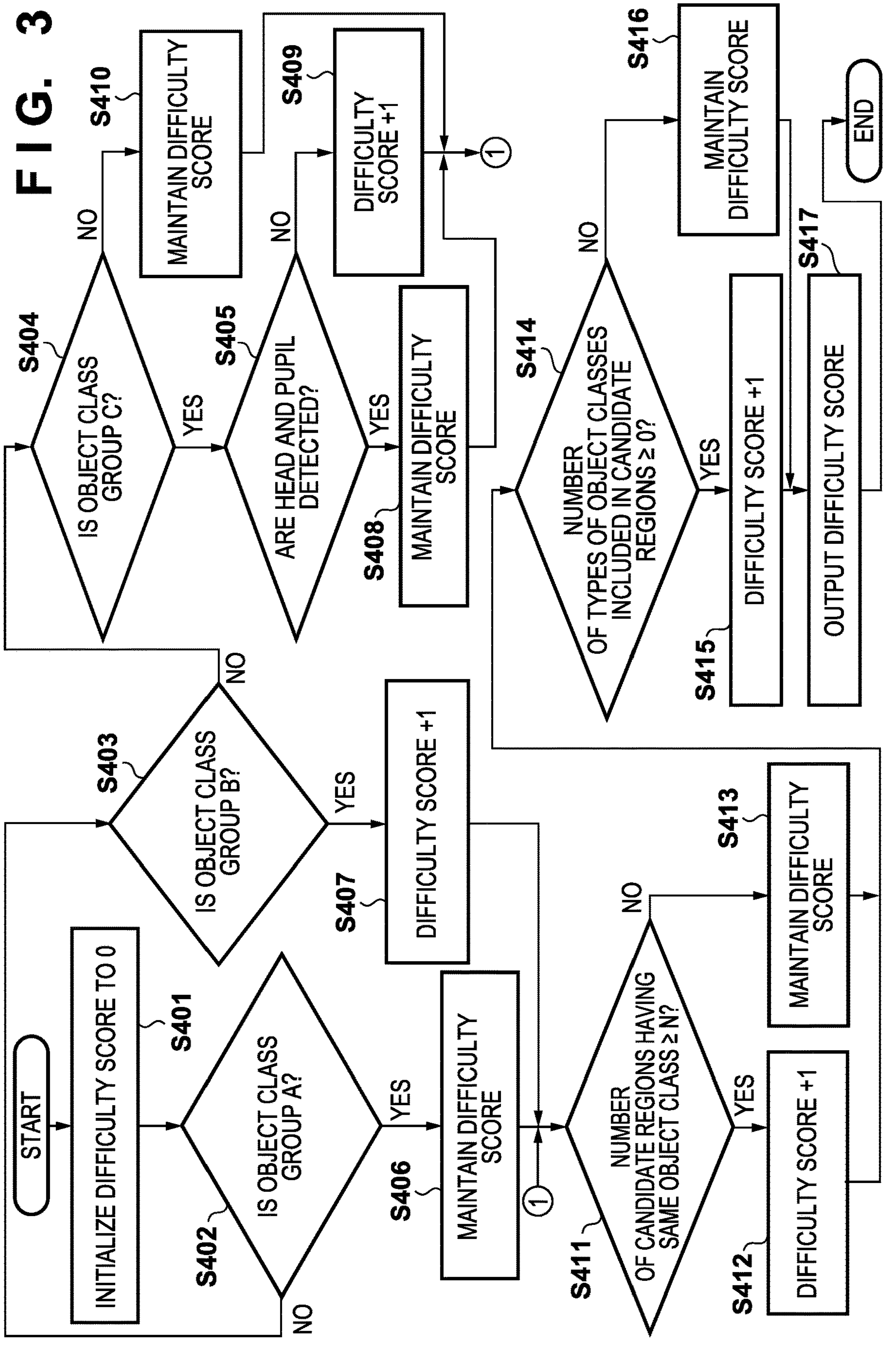
FIG. 3 is a flowchart pertaining to difficulty score computation processing in the first embodiment.

Operation for computing the difficulty score pertaining to the subject region to be tracked, executed by the difficulty determination unit 112, will be described further next with reference to the flowchart in FIG. 3. Here, the object classes are assumed to be classified into the following groups A to D. Groups A to C are defined such that object classes having characteristics that are similar with respect to the tracking difficulty belong to the same group. Object classes that are less important than the object classes belonging to groups A to C are classified into group D.

Group A mainly includes object classes of rigid subjects, such as a car object class, a train object class, a jet plane object class, a bicycle object class, a motorcycle object class, a helicopter object class, and the like. Group B mainly includes object classes of subjects that move quickly and for which the shape of the subject region changes significantly, such as a bird object class, an insect object class, and the like. Group C (animal/human) mainly includes object classes of subjects including faces and bodies, such as dog object class, a cat object class, a human body object class, and the like. Group D includes other object classes, and the object classes belonging to group D are assumed to have lower importance. Note that the classifications of groups A to D is merely an example, and the classifications with respect to the tracking difficulty may be made from other perspectives as well.

In S401, the difficulty determination unit 112 initializes the difficulty score to 0.

In S402, the difficulty determination unit 112 determines whether the object class of the subject region to be tracked belongs to group A, executes S406 if it is determined that the object class belongs to group A, and executes S403 if it is not determined that the object class belongs to group A.

In S406, the difficulty determination unit 112 maintains the difficulty score. Object classes belonging to group A are object classes of subjects that are relatively easy to track. Accordingly, the difficulty determination unit 112 determines that the subject region to be tracked is easy to track and does not add points to the difficulty score (does not increase the difficulty).

In S403, the difficulty determination unit 112 determines whether the object class of the subject region to be tracked belongs to group B, executes S407 if it is determined that the object class belongs to group B, and executes S404 if it is not determined that object class belongs to group B.

In S407, the difficulty determination unit 112 adds one point (+1) to the difficulty score. Object classes for subjects that move quickly and for which the shape changes significantly are classified into group B. Accordingly, if the object class of the subject region to be tracked belongs to group B, the difficulty determination unit 112 determines that the subject region to be tracked is difficult to track and adds points to the difficulty score (increases the difficulty).

In S404, the difficulty determination unit 112 determines whether the object class of the subject region to be tracked belongs to group C, executes S405 if it is determined that the object class belongs to group C, and executes S410 if it is not determined that the object class belongs to group C.

In S405, the difficulty determination unit 112 determines whether a subject region having a head object class and a subject region having a pupil object class are detected within the subject region to be tracked. The difficulty determination unit 112 executes S408 if it is determined that a subject region having a head object class and a subject region having a pupil object class are detected within the subject region to be tracked, and executes S409 if not.

In S408, the difficulty determination unit 112 maintains the difficulty score. Group C is mainly an object class for subjects having faces, such as dogs, cats, and human bodies. Because it is determined that both the head and the pupil, which are in a hierarchical relationship, are detected, the difficulty determination unit 112 determines that the subject region to be tracked is easy to track and does not add points to the difficulty score.

In S409, the difficulty determination unit 112 adds one point to the difficulty score. Group C is mainly an object class for subjects having faces, such as dogs, cats, and human bodies. Because it is determined that at least one of the head or the pupil, which are in a hierarchical relationship, is not detected, the difficulty determination unit 112 determines that the subject region to be tracked is difficult to track and adds a point to the difficulty score.

In S410, the difficulty determination unit 112 maintains the difficulty score. Because the subject region to be tracked belongs to group D and is not an object class in group A, group B, or group C, the difficulty determination unit 112 determines that the subject region to be tracked is not a region related to the main subject, and does not add points to the difficulty score.

In S411, the difficulty determination unit 112 determines whether the number of candidate regions having the same object class as the object class of the subject region to be tracked is at least a predetermined threshold N (N≥2). The difficulty determination unit 112 executes S412 if it is determined that the number of candidate regions having the same object class as the object class of the subject region to be tracked is at least the predetermined threshold N, and executes S413 if not.

In S412, the difficulty determination unit 112 adds one point to the difficulty score. If the number of candidate regions having the same object class as the subject region to be tracked is at least the threshold N, the difficulty determination unit 112 determines that the subject region to be tracked is difficult to track and adds points to the difficulty score.

In S413, the difficulty determination unit 112 maintains the difficulty score. If the number of candidate regions having the same object class as the subject region to be tracked is less than the threshold N, the difficulty determination unit 112 determines that the subject region to be tracked is easy to track and maintains the difficulty score.

In S414, the difficulty determination unit 112 determines whether the number of types of object classes included in the candidate regions detected by the detection unit 110 is at least a predetermined threshold O (O≥2). The difficulty determination unit 112 executes S415 if it is determined that the number of types of object classes included in the candidate regions detected by the detection unit 110 is at least the threshold O, and executes S416 if not.

In S415, the difficulty determination unit 112 adds one point to the difficulty score. If the number of types of object classes in the candidate regions is at least the threshold O, candidate regions of a variety of object classes are intermixed within the image capturing range, and thus the subject region to be tracked is determined to be difficult to track and points are added to the difficulty score.

In S416, the difficulty determination unit 112 maintains the difficulty score. If the number of types of object classes in the subject region to be tracked is less than the threshold O, the difficulty determination unit 112 determines that the subject region to be tracked can be tracked easily by the tracking unit 115, and maintains the difficulty score.

In S417, the difficulty determination unit 112 outputs the computed difficulty score to the tracking control unit 113.

The difficulty score computed through the operation described here can take on a value of 0, 1, 2, or 3. However, the values may actually have finer steps. In reality, more object classes than those described as examples here can be classified, and into many more groups. Additionally, all of the factors in S402 to S404, S411, and S414 need not be determined, and the difficulty score may be computed based on at least one of these factors. Furthermore, the difficulty score may be binary (0 or 1), with the DL tracking unit 116 being controlled to be activated (the non-DL tracking unit 117 being activated or deactivated) at a difficulty score of 1 and the DL tracking unit 116 being deactivated (the non-DL tracking unit 117 being activated) at a difficulty score of 0.

The difficulty determination unit 112 can compute a more accurate difficulty score by performing grouping in advance and broadening the range which the difficulty scores can take. Additionally, by associating speed information with the object classes, a movement speed in the image may be estimated from the size and the speed information and reflected in the difficulty score, in addition to the object class of the subject region to be tracked. For example, points are added to the difficulty score if the estimated movement speed is at least a threshold. Additionally, the confidence level score and similarity score computed in a past frame (e.g., one frame previous) may be included in the difficulty score computation processing.

Figure 4:
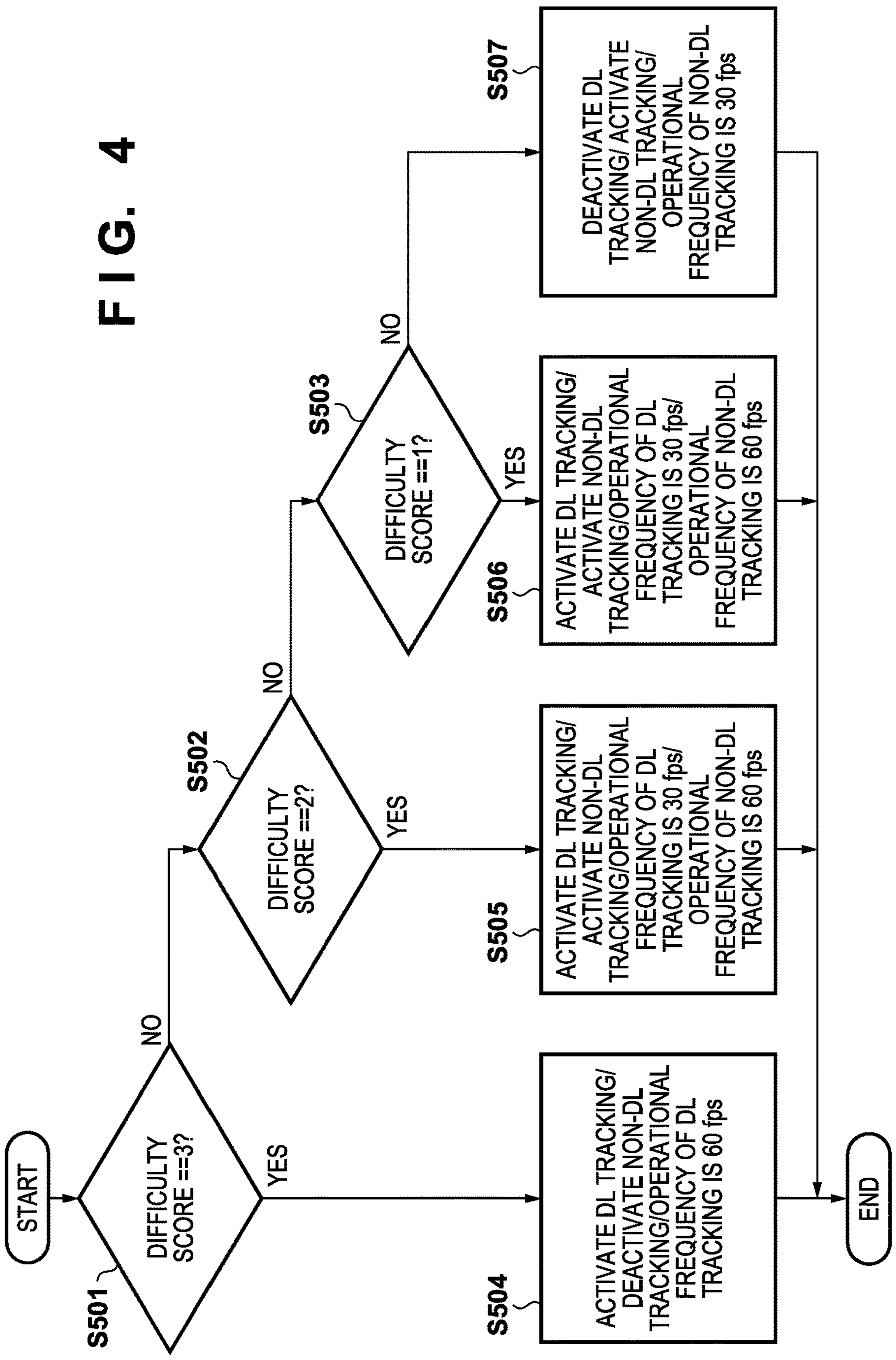
FIG. 4 is a flowchart pertaining to control operation based on a difficulty score in the first embodiment.

Next, operation of the tracking control unit 113 will be described further with reference to the flowchart in FIG. 4. Here, the difficulty determination unit 112 is assumed to compute the difficulty score through the operation described with reference to FIG. 3. Accordingly, the difficulty score has a value of 0 to 3.

In S501, the tracking control unit 113 determines whether the difficulty score is 3, executes S504 if the difficulty score is determined to be 3, and executes S502 if not.

In S502, the tracking control unit 113 determines whether the difficulty score is 2, executes S505 if the difficulty score is determined to be 2, and executes S503 if not.

In S503, the tracking control unit 113 determines whether the difficulty score is 1, executes S506 if the difficulty score is determined to be 1, and executes S507 if not.

In S504, the tracking control unit 113 determines to activate the DL tracking unit 116 and deactivate the non-DL tracking unit 117. The tracking control unit 113 also sets the operational frequency of the DL tracking unit 116 to 60 fps (every frame). A difficulty score of 3 is a state in which the difficulty of tracking is the highest among the computed difficulty scores. Accordingly, the tracking control unit 113 determines to use the DL tracking unit 116, which has better performance than the non-DL tracking unit 117. Meanwhile, the tracking control unit 113 determines that good results are unlikely to be obtained even when using the non-DL tracking unit 117, and determines to not use the non-DL tracking unit 117.

In S505, the tracking control unit 113 determines to activate both the DL tracking unit 116 and the non-DL tracking unit 117. The tracking control unit 113 also sets the operational frequency of the DL tracking unit 116 to 30 fps (every other frame) and the operational frequency of the non-DL tracking unit 117 to 60 fps. A difficulty score of 2 is a state in which the difficulty of tracking is somewhat high.

Accordingly, the tracking control unit 113 determines to use both the DL tracking unit 116 and the non-DL tracking unit 117. However, the tracking control unit 113 reduces the power consumption by setting the operational frequency of the DL tracking unit 116 to be lower than that of the non-DL tracking unit 117. The tracking control unit 113 also maintains the tracking performance of the tracking by setting the operational frequency of the non-DL tracking unit 117 to every frame.

In S506, the tracking control unit 113 determines to activate both the DL tracking unit 116 and the non-DL tracking unit 117. The tracking control unit 113 also sets the operational frequency of the DL tracking unit 116 to 15 fps (every third frame) and the operational frequency of the non-DL tracking unit 117 to 60 fps. A difficulty score of 1 is a state in which the difficulty of tracking is somewhat low. Accordingly, the tracking control unit 113 determines to use both the DL tracking unit 116 and the non-DL tracking unit 117. However, the tracking control unit 113 reduces the power consumption further by setting the operational frequency of the DL tracking unit 116 to be even lower than when the difficulty score is 2. Meanwhile, the tracking control unit 113 also maintains the tracking performance of the tracking by setting the operational frequency of the non-DL tracking unit 117 to every frame.

In S507, the tracking control unit 113 determines to deactivate the DL tracking unit 116 and activate the non-DL tracking unit 117. The tracking control unit 113 also sets the operational frequency of the non-DL tracking unit 117 to 30 fps (every other frame). S507 is executed when the difficulty score is 0, which is a state where the difficulty of tracking is the lowest. Accordingly, the tracking control unit 113 determines that sufficiently accurate results are likely to be obtained using the non-DL tracking unit 117, and determines to use only the non-DL tracking unit 117. Furthermore, the tracking control unit 113 further reduces the power consumption by setting the operational frequency of the non-DL tracking unit 117 to every other frame.

The control operation described here are merely one example, and can change according to the range of values which the difficulty score can take, the steps of the values, and the like. Additionally, although the framerate of the moving image is described as being 60 fps here, the framerate may be 120 fps. In this case, when the operational frequency of the non-DL tracking unit 117 is set to 120 fps, the operational frequency of the DL tracking unit 116 may be set to less than 15 fps, e.g., 5 fps.

Furthermore, it is not absolutely necessary to vary the control for each difficulty score. For example, the DL tracking unit 116 may be activated and the non-DL tracking unit 117 deactivated when the difficulty score is at least a first threshold, the DL tracking unit 116 may be deactivated and the non-DL tracking unit 117 activated when the difficulty score is less than a second threshold, and so on.

Figure 5:
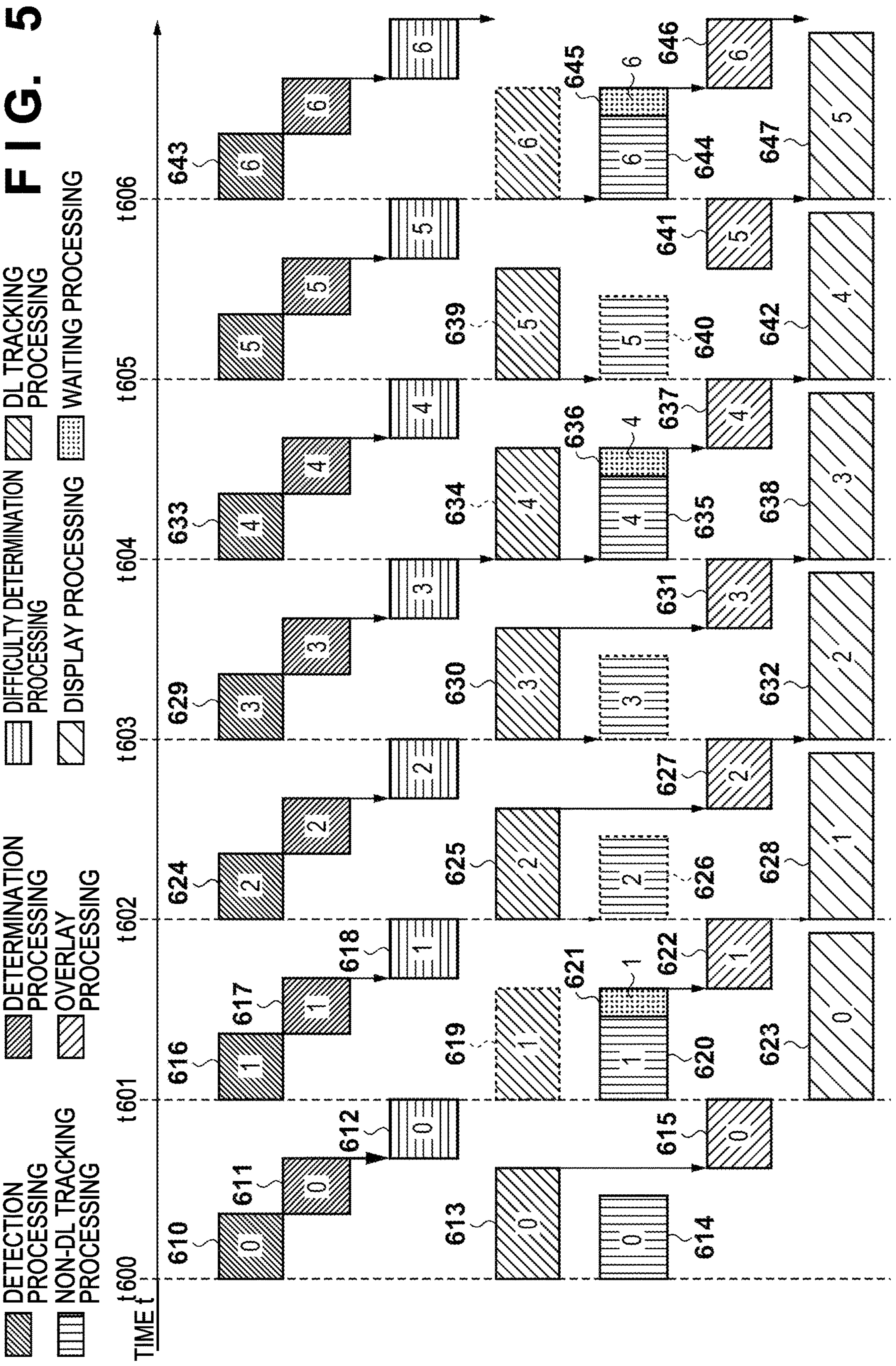
FIG. 5 is an example timing chart pertaining to processing by the image capturing apparatus according to the first embodiment.

FIG. 5 is a timing chart illustrating an example of the operational timing of each of the above-described units when implementing the subject tracking function in the image capturing apparatus 100. t600, t601, t602, t603, t604, t605, and t606 are times when the detection unit 110 starts detection processing in each frame. At t600, the detection unit 110 starts detection processing 610 for the first frame (a 0th frame).

When, through the detection processing 610, the detection unit 110 detects at least one candidate region and the object class thereof in the image data of the 0th frame, the target determination unit 111 starts determination processing 611 for determining the subject region to be tracked. When, through the determination processing 611, the subject region to be tracked is determined in the image data of the 0th frame, the difficulty determination unit 112 starts difficulty determination processing 612 for the subject region to be tracked.

When the difficulty score is computed through the difficulty determination processing 612 and the subject region determined through the determination processing 611 is a region related to a subject different from the subject region determined most recently, the tracking control unit 113 revises the control of the DL tracking unit 116 and the non-DL tracking unit 117. Specifically, the activation or deactivation and the operational frequency of the DL tracking unit 116 and the non-DL tracking unit 117 are updated according to the difficulty score of the subject region to be tracked determined for the image data in the 0th frame. Additionally, the tracking unit 115 updates the subject region which is to be tracked to the subject region to be tracked determined for the image data in the 0th frame. Accordingly, the updated subject region is tracked for the image data of the first frame.

On the other hand, when the subject region determined through the determination processing 611 and the subject region determined most recently are regions related to the same subject, the tracking control unit 113 does not revise the control of the DL tracking unit 116 and the non-DL tracking unit 117. The tracking unit 115 also does not update the subject region which is to be tracked.

In FIG. 5, the 0th frame, the second frame when detection processing 624 starts at t602, the fourth frame when detection processing 633 starts at t604, and the sixth frame when detection processing 643 starts at t606, are cases where the subject to be tracked does not change.

On the other hand, the image data of the first frame, where detection processing 616 starts at t601, indicates an example in which the subject region to be tracked determined through determination processing 617 and the subject region determined most recently are regions related to different subjects.

In this case, the subject which is to be tracked in the next frame changes, and thus the tracking control unit 113 revises the activation/deactivation control of the DL tracking unit 116 and the non-DL tracking unit 117 using a result of difficulty determination processing 618. Here, for the next frame, the non-DL tracking unit 117 is deactivated, the DL tracking unit 116 is activated, and the operational frequency of the DL tracking unit 116 is switched to double the operational frequency in the 0th frame and the first frame.

The subject to be tracked changes similarly in the third frame, where detection processing 629 starts at t603, and the tracking control unit 113 revises the activation/deactivation control of the DL tracking unit 116 and the non-DL tracking unit 117. Here, for the fourth frame, where the detection processing 633 starts at t604, the DL tracking unit 116 is deactivated and the non-DL tracking unit 117 is activated. Additionally, the operational frequency of the non-DL tracking unit 117 is set to a frequency half the operational frequency setting of the 0th frame and the first frame.

At t600, the tracking unit 115 starts DL tracking processing 613 and non-DL tracking processing 614 for the 0th frame. Here, it is assumed that at the point in time of the 0th frame, the tracking control unit 113 has activated both the DL tracking unit 116 and the non-DL tracking unit 117, and has set the operational frequency of the non-DL tracking unit 117 to be double the operational frequency of the DL tracking unit 116.

In FIG. 5, the DL tracking processing and non-DL tracking processing indicated by the broken line rectangles are not executed due to the operational frequency of the DL tracking unit 116 and the non-DL tracking unit 117 being set to lower than every frame.

In the 0th frame, the DL tracking unit 116 performs the DL tracking processing 613 and the non-DL tracking unit 117 performs the non-DL tracking processing 614, and both output the tracking processing results. Here, the DL tracking processing 613 can output a tracking result having a higher accuracy than that of the non-DL tracking processing 614. Accordingly, the tracking unit 115 adopts the tracking result from the DL tracking processing 613, selected by the selection unit 125. Then, in overlay processing 615, the information overlay unit 120 generates the composite image data in which the tracking frame based on the tracking result from the DL tracking processing 613 is overlaid. At t601, the display unit 121 executes display processing 623 for the composite image data of the 0th frame.

At t601, the non-DL tracking unit 117 starts non-DL tracking processing 620 of the first frame. In accordance with the operational frequency setting, the DL tracking unit 116 does not perform tracking processing for the first frame. Only the tracking result from the non-DL tracking unit 117 is obtained in the first frame, and thus in overlay processing 622, the information overlay unit 120 generates the composite image data in which the tracking frame based on the tracking result from the non-DL tracking unit 117 is overlaid.

Note that the non-DL tracking processing has a lower processing load than the DL tracking processing and therefore ends earlier than the DL tracking processing. The tracking result is output at a similar timing as when the DL tracking processing is performed, and thus the tracking unit 115 performs waiting processing 621 after the non-DL tracking processing. At t602, the display unit 121 executes display processing 628 for the composite image data of the first frame.

At t602, the DL tracking unit 116 starts DL tracking processing 625 of the second frame. For the second frame, the non-DL tracking unit 117 is deactivated, and thus the non-DL tracking processing is not executed. Only the tracking result from the DL tracking unit 116 is obtained in the second frame, and thus in overlay processing 627, the information overlay unit 120 generates the composite image data in which the tracking frame based on the tracking result from the DL tracking unit 116 is overlaid. At t603, the display unit 121 executes display processing 632 for the composite image data of the first frame.

At t603, the DL tracking unit 116 starts DL tracking processing 630 of the third frame. Before the start of the DL tracking processing 625 of the second frame, the operational frequency of the DL tracking unit 116 has been changed to double the operational frequency in the 0th frame, and thus the DL tracking processing is also executed in the third frame following the second frame. Overlay processing 631 and display processing 638 are similar to those performed in the second frame.

At t604, the non-DL tracking unit 117 starts non-DL tracking processing 635 of the fourth frame. For the fourth frame, the DL tracking unit 116 is deactivated, and thus the DL tracking processing is not executed. The operational frequency of the non-DL tracking unit 117 is set to half the operational frequency of the 0th frame and the first frame, and thus the non-DL tracking processing 635 of the fourth frame is performed, non-DL tracking processing 640 of the fifth frame is not performed. Wait processing 636, overlay processing 637, and display processing 642 are similar to those performed in the first frame.

At t605, the tracking unit 115 executes neither DL tracking processing 639 nor the non-DL tracking processing 640. Accordingly, in overlay processing 641 performed for the fifth frame, the information overlay unit 120 generates the composite image data in which the tracking frame based on the tracking result from the non-DL tracking processing 635, obtained in the fourth frame, is overlaid. Note that the information overlay unit 120 may generated the composite image data in which the tracking frame is not overlaid in the overlay processing for frames for which neither the DL tracking processing nor the non-DL tracking processing are executed, such as the fifth frame.

At t606, the non-DL tracking unit 117 starts non-DL tracking processing 644 of the sixth frame. The DL tracking unit 116 is deactivated, and thus the DL tracking processing is not executed. The non-DL tracking processing 644, wait processing 645, overlay processing 646, and display processing 647 of the sixth frame are similar to those performed in the fourth frame.

In this manner, when the subject to be tracked is switched to another subject, whether to execute the DL tracking processing and the non-DL tracking processing, and the operational frequency thereof, are revised based on the difficulty score computed for the new subject region to be tracked used in the next frame. This makes it possible to execute appropriate tracking processing dynamically according to the difficulty score, which in turn makes it possible to suppress power consumption.

The tracking processing in the present embodiment can use the tracking result for a frame previous to the target frame. Tracking processing using a past tracking result will be described with reference to the timing chart illustrated in FIG. 6.

t700 indicates the start timing of the tracking processing for the 0th frame. Thereafter, t70*n* (where n=1, 2, and so on) indicates the start timing of the tracking processing for the nth frame. At t702 and t704 respectively, the subject to be tracked is switched, and the control of the DL tracking unit 116 and the non-DL tracking unit 117 by the tracking control unit 113 is revised.

The DL tracking unit 116 and the non-DL tracking unit 117 execute the tracking processing on the frame according to the operational frequency when set to active. Additionally, the DL tracking unit 116 and the non-DL tracking unit 117 use the tracking result obtained one frame previous for the tracking processing on the frame to be processed.

The processing accuracy of the DL tracking unit 116 tends to be higher than the processing accuracy of the non-DL tracking unit 117, which is based on similarity or the like. Accordingly, the tracking result from the DL tracking processing on the frame one previous to the frame to be processed is, if usable, used in the DL tracking processing and/or the non-DL tracking processing for the frame to be processed. Note that the tracking result for one frame previous is not used when the subject to be tracked differs between the frame to be processed and one frame previous.

Accordingly, non-DL tracking processing 711 of the first frame uses the tracking result from DL tracking processing 710 of the 0th frame. The subject to be tracked differs between the first frame and the second frame, and thus the tracking result from the first frame is not used in DL tracking processing 712 of the second frame. DL tracking processing 713 of the third frame uses the tracking result from the DL tracking processing 712 of the second frame. The subject to be tracked differs between the third frame and the fourth frame, and thus the tracking result from the third frame is not used in non-DL tracking processing 715 of the fourth frame.

DL tracking processing 714 is not executed in the fourth frame, and thus non-DL tracking processing 716 of the fifth frame uses the tracking result from the non-DL tracking processing 715 of the fourth frame.

Figure 7:
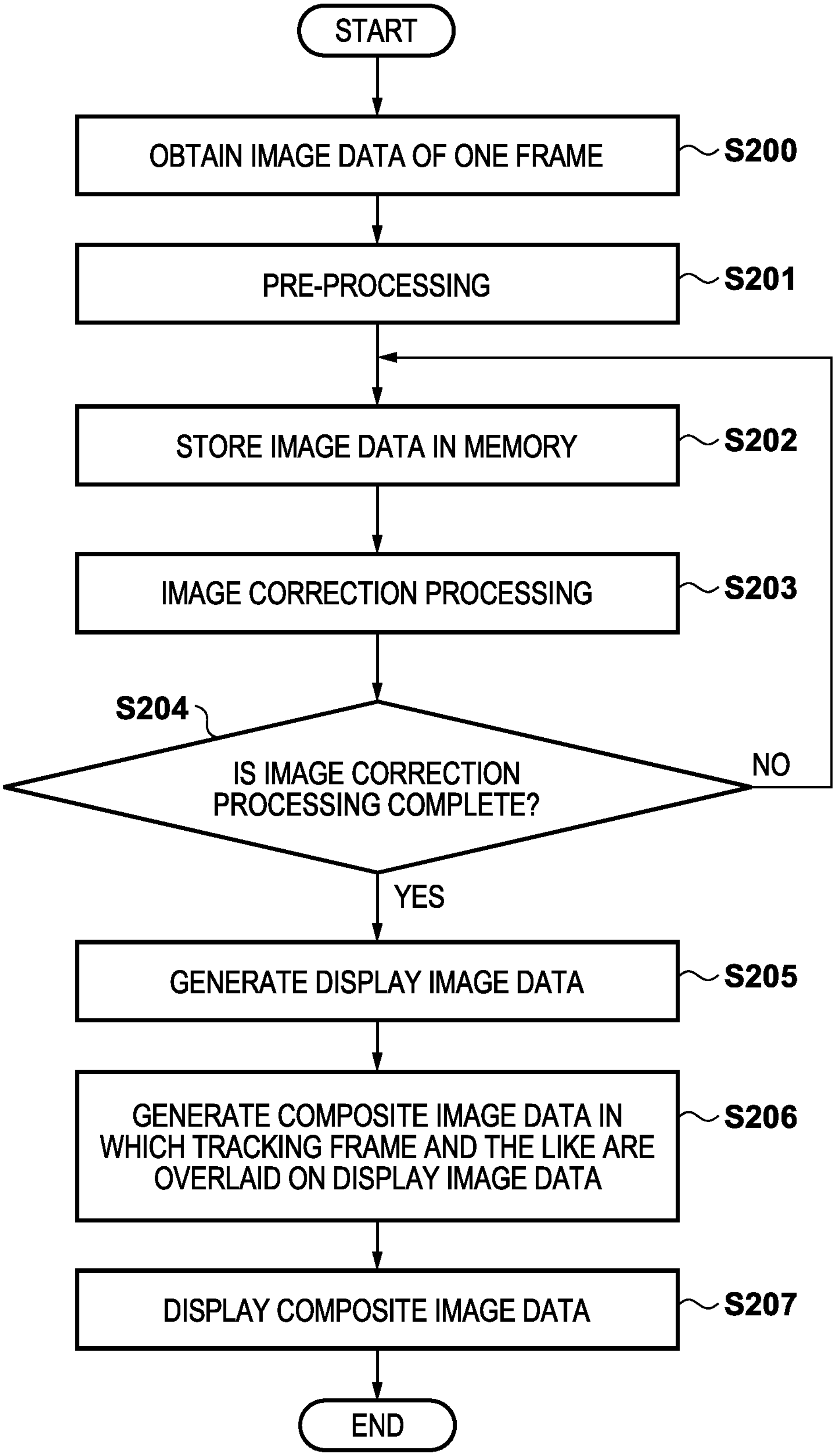
FIG. 7 is a flowchart pertaining to basic live-view display operation in the first embodiment.

FIG. 7 is a flowchart pertaining to live-view display operation performed when the subject tracking function of the image capturing apparatus 100 is active.

In S200, the control unit 102 controls the image sensor 103 to shoot one frame, and reads out the image data.

In S201, the first pre-processing unit 104 applies pre-processing to the image data read out from the image sensor 103.

In S202, the first pre-processing unit 104 stores the image data to which the pre-processing has been applied in the video memory 107.

In S203, the first image correction unit 109 starts applying predetermined image correction processing to the image data read out from the video memory 107. In S204, the first image correction unit 109 determines whether all the image correction processing to be applied is complete, and if all is determined to be complete, outputs the image data to which the image correction processing has been applied to the post-processing unit 114. If it is determined that all the image correction processing is not complete, the first image correction unit 109 continues the image correction processing.

In S205, the post-processing unit 114 generates image data for display from the image data to which the image correction processing has been applied by the first image correction unit 109, and outputs the image data for display to the information overlay unit 120.

In S206, using the image data for display generated by the post-processing unit 114, the image data of the tracking frame, and image data indicating other information, the information overlay unit 120 generates data of a composite image, in which images of the tracking frame, the other information, and the like are overlaid on the shot image. The information overlay unit 120 outputs the composite image data to the display unit 121.

In S207, the display unit 121 displays the composite image data generated by the information overlay unit 120. This completes one frame's worth of the live-view display.

Figure 8A:
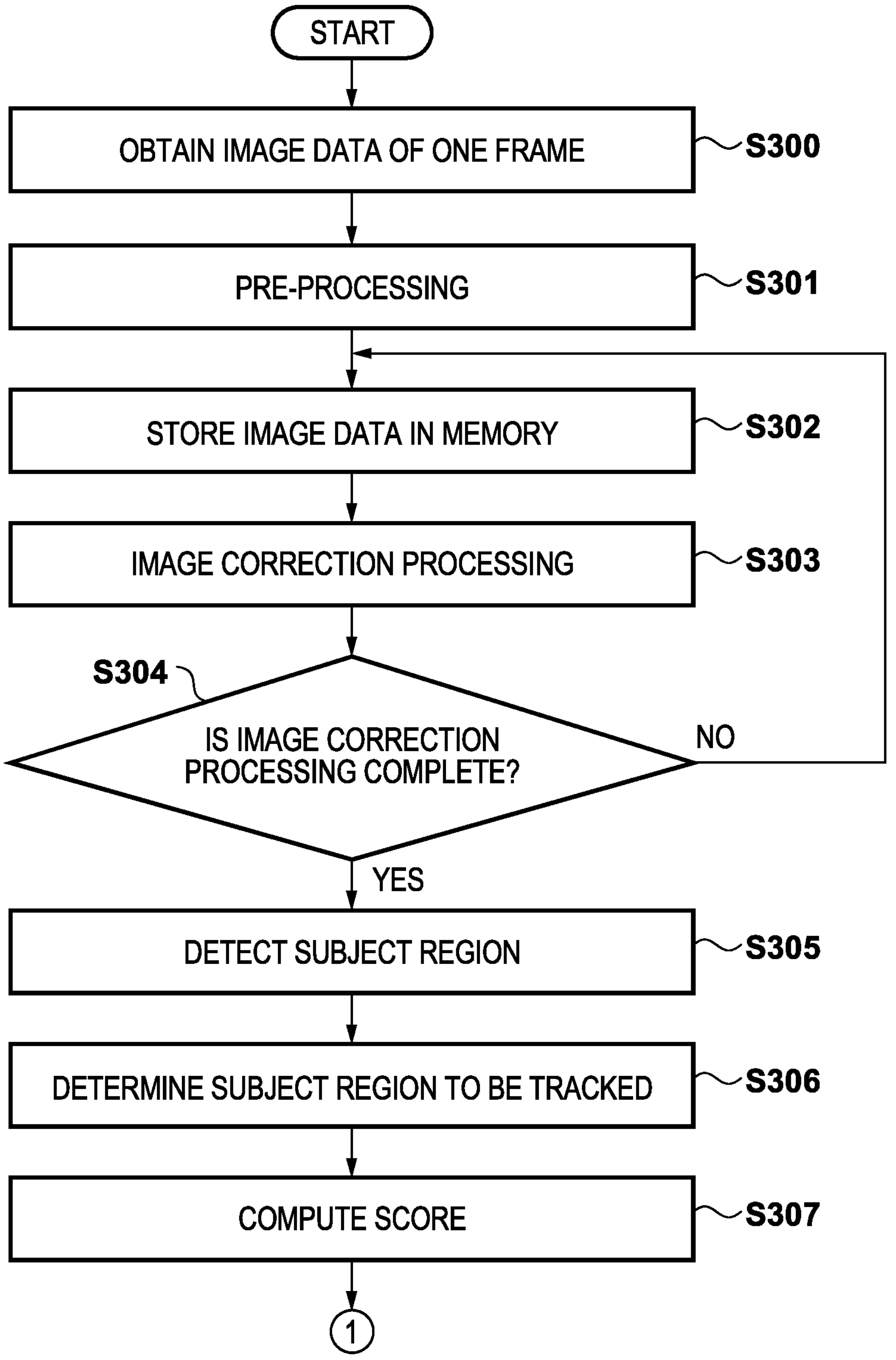
FIG. 8A is a flowchart pertaining to live-view display operation during subject tracking in the first embodiment.
Figure 8B:
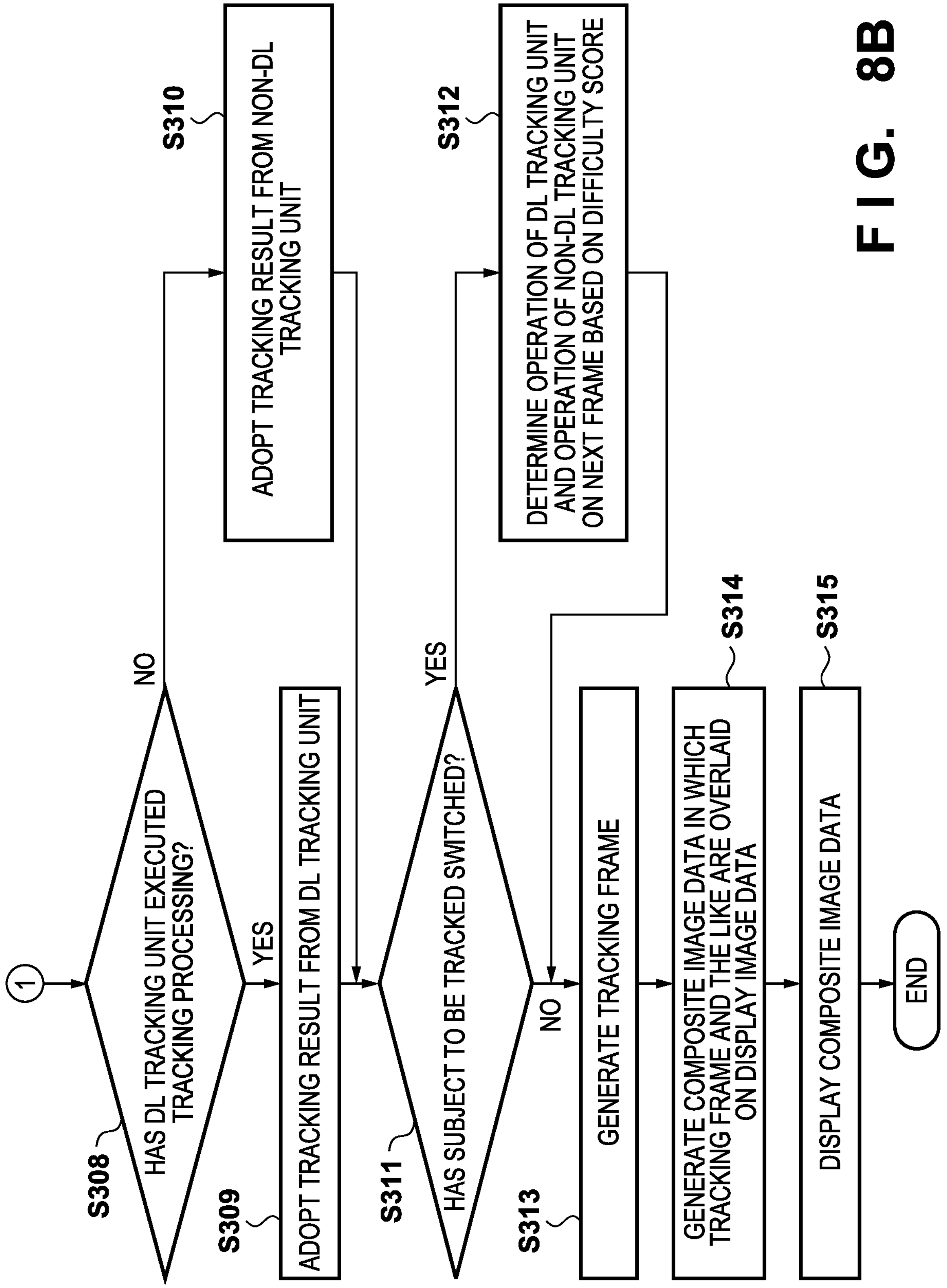
FIG. 8B is a flowchart pertaining to live-view display operation during subject tracking in the first embodiment.

FIGS. 8A and 8B are flowcharts pertaining to operation of the subject tracking function in the image capturing apparatus 100.

The processing of S300 to S304 is similar to the processing of S200 to S204 in FIG. 7, except that the tracking memory 108 is used instead of the video memory 107 and the image correction processing is image correction processing for tracking.

In S305, the detection unit 110 executes the subject region detection processing on the image data for which all the image correction processing is complete. For each of the detected subject regions (candidate regions), the detection unit 110 stores the position and size, the object class, the number of subject regions belonging to the same object class, the confidence level score, and the like in the tracking memory 108 as the detection result.

In S306, the target determination unit 111 determines one subject region to be tracked from information on the candidate regions stored in the tracking memory 108. The target determination unit 111 stores information on the determined subject region to be tracked in the tracking memory 108.

In S307, the difficulty determination unit 112 computes the difficulty score based on information on the subject region to be tracked and information on the candidate regions, and based on tracking candidate subject information read out from the tracking memory 108. The tracking control unit 113 also determines whether to activate or deactivate the DL tracking unit 116 and the non-DL tracking unit 117, and determines the operational frequency of the active tracking units, based on the difficulty score.

In S308, the tracking unit 115 determines whether the DL tracking unit 116 has executed tracking processing for the frame to be processed, executes S309 if it is determined that the tracking processing has been executed, and executes S310 if not.

In S309, the tracking unit 115 adopts the tracking result from the DL tracking unit 116, selected by the selection unit 125, and outputs that tracking result to the information overlay unit 120.

In S310, the tracking unit 115 adopts the tracking result from the non-DL tracking unit 117, selected by the selection unit 125, and outputs that tracking result to the information overlay unit 120. Note that when the non-DL tracking unit 117 also has not executed the tracking processing, the tracking result is not output, or the tracking result for one frame previous is output.

In S311, the tracking control unit 113 determines whether the subject region used in the tracking processing for the frame to be processed is a region related to the same subject as the subject region to be tracked determined in S306. This determination can also be said to be a determination as to whether the subject to be tracked has switched. The tracking control unit 113 can determine that the subject to be tracked has switched when, for example, the confidence level score included in the tracking result for the target frame is no greater than a threshold. Note that this is merely an example, and the determination may be made using another method.

The tracking control unit 113 executes S312 if the subject to be tracked is determined to have switched, and executes S313 if the subject to be tracked is not determined to have switched.

In S312, the tracking control unit 113 determines whether to activate or deactivate the DL tracking unit 116 and the non-DL tracking unit 117, and determines the operational frequency, based on the difficulty score of the subject region to be tracked determined for the target frame in S306.

In S313, the information overlay unit 120 generates data of a composite image, in which an image of a tracking frame is overlaid, based on the display image data and the tracking result adopted in S309 or S310.

The processing of S314 and S315 is similar to the processing of S206 and S207.

As described thus far, according to the present embodiment, in an image capturing apparatus which uses a first tracking unit and a second tracking unit having a higher processing accuracy but a greater operational load than the first tracking unit, whether to activate or deactivate the first and/or second tracking unit is controlled based on the difficulty of tracking. Accordingly, power consumption can be suppressed while suppressing a drop in tracking accuracy by deactivating a tracking unit from which a good tracking result is unlikely to be obtained, deactivating the other tracking unit when a good tracking result is likely to be obtained from only one of the tracking units, and the like.

Because tracking processing is typically executed on moving images, the effect of suppressing power consumption is particularly great when using a tracking unit that uses machine learning having a high operational load, such as deep learning, as the second tracking unit.

Second Embodiment

A second embodiment of the present invention will be described next.

Figure 9:
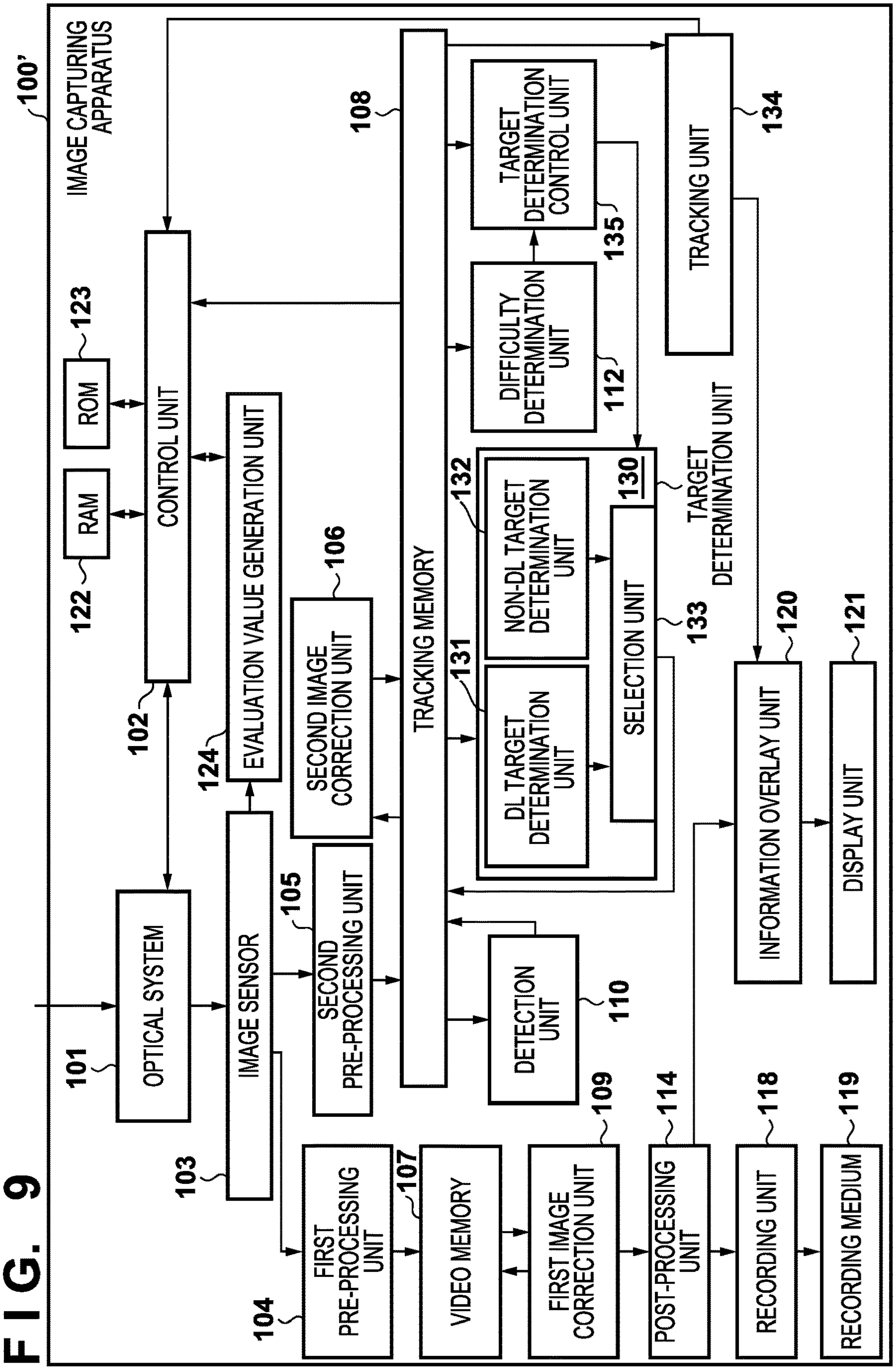
FIG. 9 is a block diagram illustrating an example of the functional configuration of an image capturing apparatus according to a second embodiment.

FIG. 9 is a block diagram illustrating an example of the functional configuration of an image capturing apparatus 100' serving as an example of an image processing apparatus according to the second embodiment, and configurations that are the same as those of the image capturing apparatus 100 described in the first embodiment will be given the same reference numerals. The present embodiment controls the operation of a target determination unit, instead of the tracking unit, using the difficulty score.

The following will describe areas that are different from the first embodiment.

The difficulty determination unit 112 of the present embodiment computes the difficulty score, which is an evaluation value indicating the difficulty of processing for determining the subject region to be tracked from among the detected candidate regions (target determination processing), based on the detection result from the detection unit 110, stored in the tracking memory 108.

For example, the difficulty determination unit 112 can compute the difficulty score taking into account at least one factor that affects the difficulty of the target determination processing. The sizes of the candidate regions, the object classes (types) of the candidate regions, the number of candidate regions belonging to the same object class, the positions of the candidate regions within the image, and the like can be given as examples of factors that affect the difficulty of the target determination processing. A specific example of a method for computing the difficulty score will be given later. The difficulty determination unit 112 outputs the computed difficulty score to a target determination control unit 135.

The target determination control unit 135 determines whether to activate or deactivate each of a plurality of target determination units included in a target determination unit 130 based on the difficulty score computed by the difficulty determination unit 112. In the present embodiment, the target determination unit 130 includes a plurality of target determination units having different operational loads and target determination accuracies. Specifically, the target determination unit 130 includes a DL target determination unit 131 that performs target determination processing using deep learning (DL), and a non-DL target determination unit 132 that performs target determination processing without using DL. The DL target determination unit 131 is assumed to have a higher processing accuracy than the non-DL target determination unit 132, but also a greater operational load than the non-DL target determination unit 132.

In this case, the target determination control unit 135 determines whether to activate or deactivate each of the DL target determination unit 131 and the non-DL target determination unit 132. Note that the target determination control unit 135 deactivates both the DL target determination unit 131 and the non-DL target determination unit 132 when only one candidate region is detected and when no candidate region is detected.

The target determination unit 130 determines the subject region to be tracked (a main subject region) from the candidate regions detected by the detection unit 110. The target determination unit 130 stores information identifying the determined subject region in the tracking memory 108.

The target determination unit 130 includes the DL target determination unit 131, which performs target determination processing using deep learning (DL), and the non-DL target determination unit 132, which performs target determination processing without using DL. Of the DL target determination unit 131 and the non-DL target determination unit 132, the target determination unit activated by the target determination control unit 135 outputs information identifying the determined subject region.

The DL target determination unit 131 determines the subject region to be tracked from a plurality of candidate regions using a pre-trained multilayer neural network. The multilayer neural network may be a convolutional neural network (CNN), for example. The training of the multilayer neural network can be performed, for example, by using training data which takes size information, position information within the screen, object class information, and a confidence level for each of the candidate regions as input data, and a main subject region that is a correct answer as supervisory data. Note that the supervisory data can be prepared, for example, by a human viewing the target frame and determining the main subject region that is the correct answer.

The training of the multilayer neural network may be performed by a separate apparatus, or by the image capturing apparatus 100'. When performed by the image capturing apparatus 100, the multilayer neural network can be trained by putting the DL target determination unit 131 into learning mode and supplying the training data (the set of the input data and the supervisory data) to the DL target determination unit 131 from the recording medium 119, for example. Note that the learning may be performed using a publicly-known optimization algorithm until the value of the loss function becomes less than a predetermined value.

When the multilayer neural network is trained by a separate apparatus, for example, the parameters of a multilayer neural network which has been trained to completion by the separate apparatus may be supplied to the DL target determination unit 131 through the recording medium 119, for example. The multilayer neural network trained by the separate apparatus has a similar configuration as the multilayer neural network implemented in the DL target determination unit 131. The training method may also be the same as that used when training using the image capturing apparatus 100'.

The DL target determination unit 131 provides the size information, the position information within the screen, the object class information, and the confidence level for each of the candidate regions detected by the detection unit 110 to the trained multilayer neural network as test data. The trained multilayer neural network outputs a probability that each of the candidate regions is, for example, the main subject region.

Of the plurality of candidate regions detected by the detection unit 110, the DL target determination unit 131 determines the candidate region having the highest output from the multilayer neural network as the subject region to be tracked (the main subject region). The DL target determination unit 131 then outputs the size information, the position information within the screen, and the object class information of the determined main subject region.

On the other hand, the non-DL target determination unit 132 determines the subject region to be tracked from among the plurality of candidate regions through a method that does not use deep learning. The non-DL target determination unit can determine the subject region to be tracked in a similar manner as the target determination unit 111 of the first embodiment. The non-DL target determination unit 132 stores information identifying the determined subject region in the tracking memory 108.

A selection unit 133 adopts one of the information of the main subject region output by the DL target determination unit 131 or the information of the main subject region output by the non-DL target determination unit 132. The selection unit 133 determines which main subject region information to adopt based on, for example, the position information of the main subject region output by the DL target determination unit 131 and the non-DL target determination unit 132. The selection unit 133 can adopt the information of the main subject region which is closer in distance to a focus detection region (closer to the focus detection region) currently set in the image capturing apparatus 100', for example. The information of the main subject region adopted by the selection unit 133 is stored in the tracking memory 108.

When both the DL target determination unit 131 and the non-DL target determination unit 132 are deactivated by the target determination control unit 135, the target determination unit 130 determines that only one or no candidate regions have been detected. If there is one candidate region, the target determination unit 130 determines that candidate region to be the main subject region. If not even one candidate region has been detected, the target determination unit 130 notifies a tracking unit 134 that no main subject is present and causes the tracking processing to stop.

The tracking unit 134 estimates the subject region to be tracked from the image data of the target frame (the current frame) stored in the tracking memory 108, and obtains the position and size of the estimated subject region within the frame as a tracking result. Similar to, for example, the non-DL tracking unit 117 in the first embodiment, the tracking unit 134 can estimate the subject region to be tracked based on the similarity of color compositions. Note that color composition information of the subject region to be tracked may be updated according to the subject region to be tracked in a past frame, and the tracking processing for the next frame may be performed.

Note that the tracking unit 134 may estimate the subject region to be tracked in the current frame using pattern matching which takes the subject region to be tracked in the past frame as a template. In this case, the template used for the pattern matching may be updated every frame using the subject region to be tracked determined by the target determination unit 130. The tracking unit 134 may also estimate the position and size of the subject region to be tracked in the current frame using a pre-trained multilayer neural network. The tracking unit 134 outputs the position, size, and a confidence level score for the subject region to be tracked estimated for the current frame.

The information overlay unit 120 generates an image of a tracking frame based on the size of the main subject region included in the tracking result output by the tracking unit 134. The information overlay unit 120 outputs, to the display unit 121, composite image data generated in a similar manner to the first embodiment.

Figure 10:
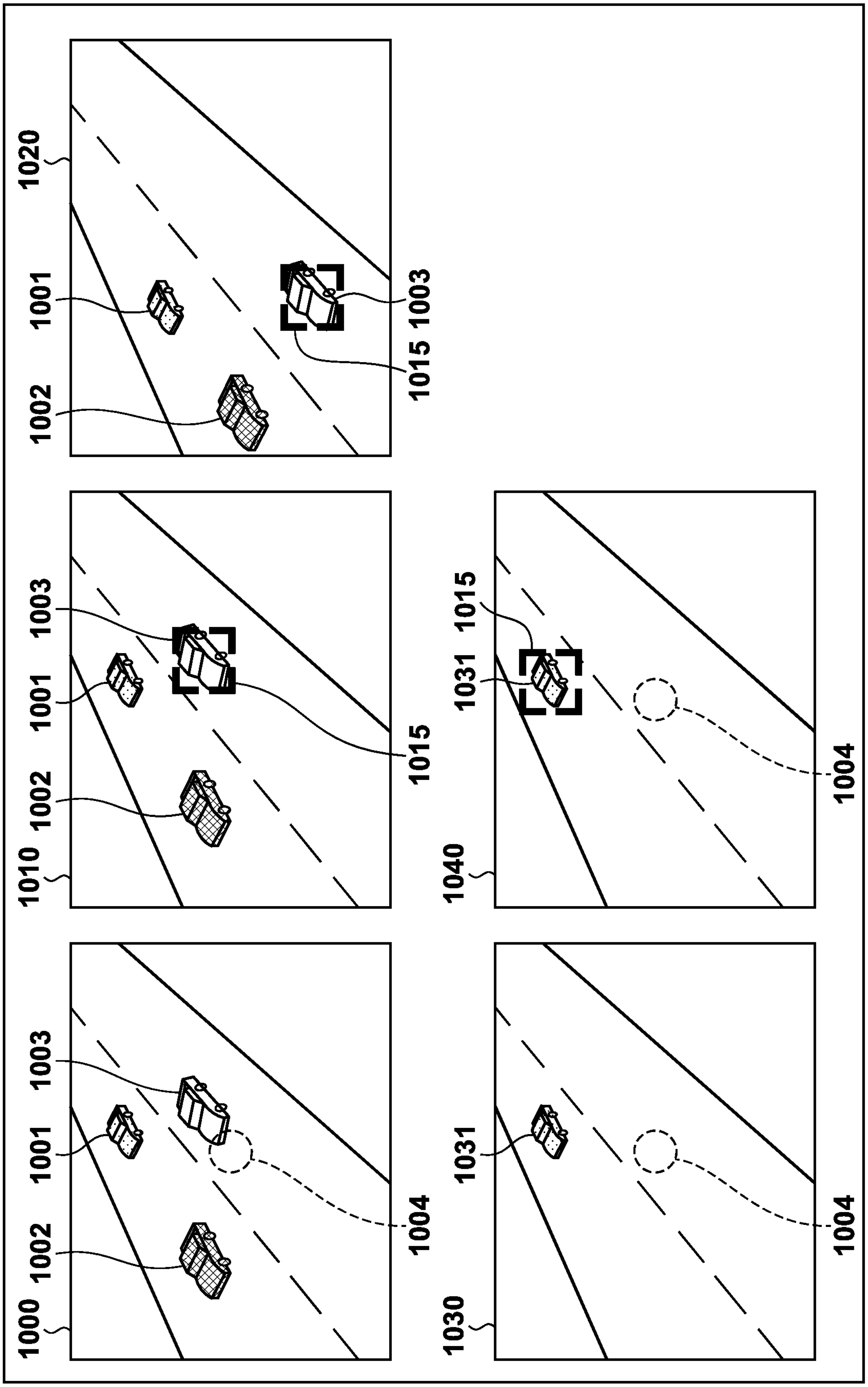
FIG. 10 is a diagram illustrating an example of a live-view display during subject tracking in the second embodiment.

FIG. 10 is a diagram illustrating an example of a live-view display in the display unit 121 using the display image data output by the post-processing unit 114. In FIG. 10, the broken line 1004 indicates a central region of the image, and is not included in the actual display image data. Images 1010 and 1020 indicate display examples of the composite image data in which an image of a tracking frame 1015 is overlaid on the display image data. The image 1010 is an image one frame after an image 1000, and the image 1020 is an image several frames after the image 1010.

In the image 1000, when automobiles 1001, 1002, and 1003 are detected as candidate regions, the target determination unit 130 determines the region of the automobile 1003, which is closest to the central region indicated by the broken line 1004, as the subject region to be tracked. As a result, in the image 1010 one frame after, the region of the automobile 1003 is subjected to tracking processing, and the tracking frame 1015 is displayed overlaid so as to surround the region of the automobile 1003. The tracking frame 1015 is displayed overlaid on the region of the automobile 1003 in the image 1020 several frames after as well.

Images 1030 and 1040 indicate examples of the live-view display when there is only one candidate region. The image 1040 is an image one frame after the image 1030. In the image 1030, an automobile 1031 is detected as the sole candidate region. In this case, the target determination control unit 135 deactivates both the DL target determination unit 131 and the non-DL target determination unit 132 of the target determination unit 130. The target determination unit 130 then determines the region of the automobile 1031 as the subject region to be tracked. As a result, in the image 1040 one frame after, the tracking frame 1015 is displayed overlaid so as to surround the region of the automobile 1031 to be tracked. Similar to the first embodiment, the shape of the tracking frame 1015 is not limited to a combination of four hollow bracket shapes in the present embodiment.

Figure 11A:
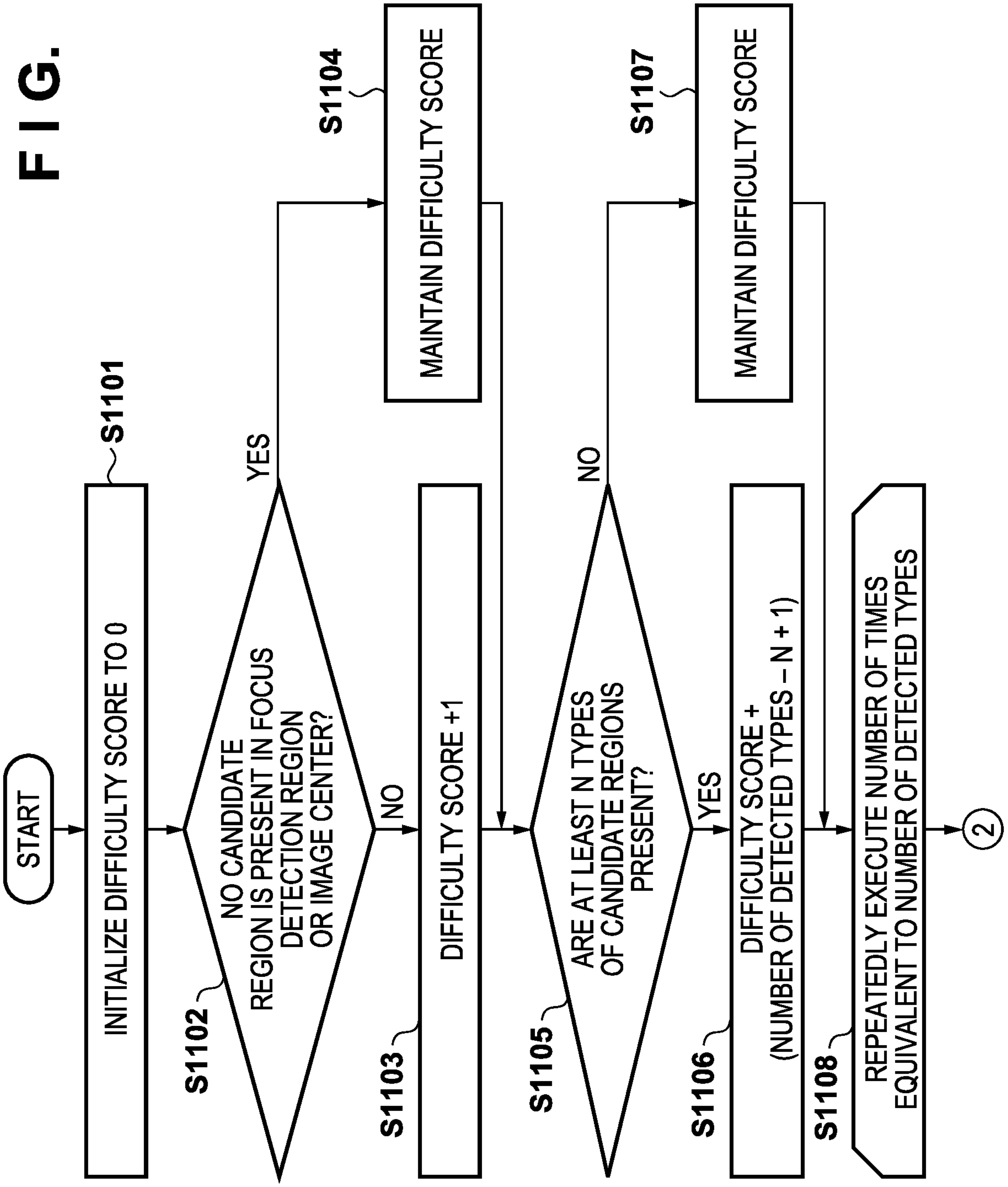
FIG. 11A is a flowchart pertaining to difficulty score computation processing in the second embodiment.
Figure 11B:
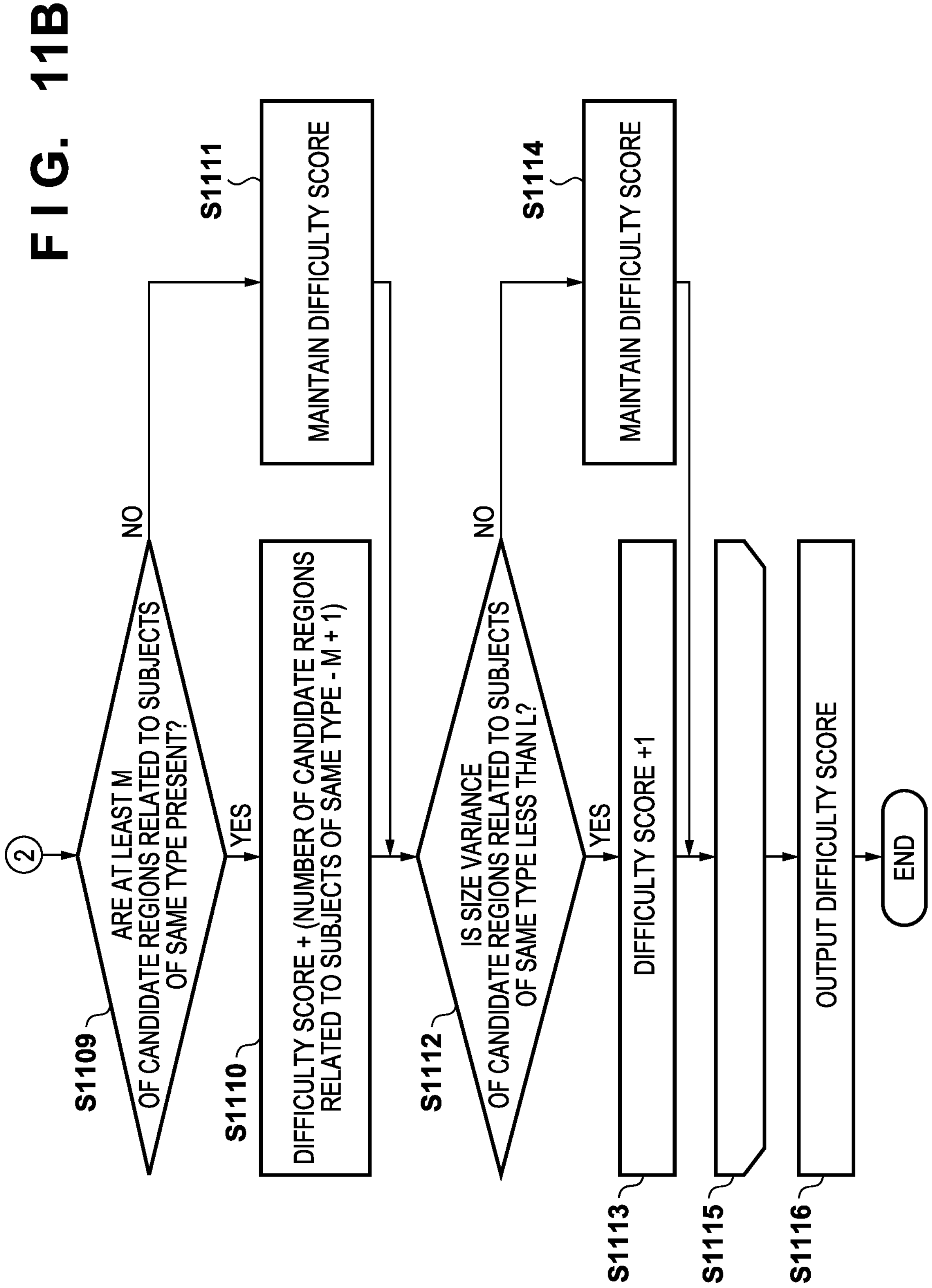
FIG. 11B is a flowchart pertaining to difficulty score computation processing in the second embodiment.

Operation for computing the difficulty score pertaining to the subject region to be tracked, executed by the difficulty determination unit 112 in the present embodiment, will be described further next with reference to the flowcharts in FIGS. 11A and 11B.

In S1101, the difficulty determination unit 112 initializes the difficulty score to 0.

In S1102, the difficulty determination unit 112 determines whether a candidate region is present in the image center. For example, the difficulty determination unit 112 determines that a candidate region is present in the image center if a candidate region which includes some or all of the region in the center of the screen, indicated by the broken line 1004 in FIG. 10, is present. Additionally, for example, the difficulty determination unit 112 determines that a candidate region is not present in the image center if a candidate region which includes some or all of the region in the center of the screen, indicated by the broken line 1004, is not present. The difficulty determination unit 112 then executes S1103 if a candidate region is not determined to be present in the image center, and executes S1104 if a candidate region is determined to be present in the image center.

Note that if the focus detection region is set in advance, the difficulty determination unit 112 makes a similar determination for the focus detection region instead of the region in the center of the screen. The difficulty determination unit 112 then executes S1103 if a candidate region is not determined to be present in the focus detection region, and executes S1104 if a candidate region is determined to be present in the focus detection region.

In S1103, the difficulty determination unit 112 adds one point (+1) to the difficulty score. When no candidate region is present in the focus detection region or the image center, the difficulty determination unit 112 determines that it is difficult to determine the subject region to be tracked, and adds points to the difficulty score (increases the difficulty). The difficulty determination unit 112 then executes S1105.

In S1104, the difficulty determination unit 112 maintains the difficulty score. When a candidate region is present in the focus detection region or the image center, the difficulty determination unit 112 determines that it is easy to determine the subject region to be tracked, and does not add points to the difficulty score (does not increase the difficulty). The difficulty determination unit 112 then executes S1105.

In S1105, the difficulty determination unit 112 determines whether the number of types of candidate regions (types of object classes) is at least a pre-set threshold N (whether at least N types of candidate regions are detected). For example, if candidate regions associated with a person object class, the dog object class, the cat object class, and an automobile object class are detected, there are four types of candidate regions. If the threshold Nis 3, the difficulty determination unit 112 determines that the types of candidate regions exceed the threshold N, and executes S1106. On the other hand, if candidate regions associated with the dog object class and the cat object class are detected, there are two types of candidate regions. If the threshold N is 3, the difficulty determination unit 112 determines that the types of candidate regions do not exceed the threshold N, and executes S1107.

In S1106, the difficulty determination unit 112 adds (number of types of candidate regions—N+1) points to the difficulty score. When at least N types of candidate regions are detected, the difficulty determination unit 112 determines that it is difficult to determine the subject region to be tracked, and adds more points to the difficulty score as the number of types increases (increases the difficulty). The difficulty determination unit 112 then executes S1108.

In S1107, the difficulty determination unit 112 maintains the difficulty score. When the number of types of candidate regions is less than N, the difficulty determination unit 112 determines that it is easy to determine the subject region to be tracked, and does not add points to the difficulty score (does not increase the difficulty). The difficulty determination unit 112 then executes S1108.

S1108 and S1115 indicate the processing therebetween is executed repeatedly. Specifically, the processing from S1109 to S1114 is repeatedly executed a number of times equivalent to the number of types of candidate regions detected. For example, if four types of candidate regions are detected, the processing from S1109 to S1114 is repeated four times, once for each type of candidate region.

In S1109, the difficulty determination unit 112 determines whether the number of candidate regions associated with the same type (object class) is at least a pre-set threshold M. For example, assume that four candidate regions associated with the dog object class and two candidate regions associated with the cat object class are detected by the detection unit 110, and that the threshold Mis 3. In this case, the processing from S1109 to S1114 is executed once for the dog object class and once for the cat object class.

In the processing for the dog object class, in S1109, the number of candidate regions of the dog object class is 4, and thus the difficulty determination unit 112 determines that the threshold M is exceeded, and executes S1110. On the other hand, in the processing for the cat object class, in S1109, the number of candidate regions of the cat object class is 2, and thus the difficulty determination unit 112 determines that the threshold M is not exceeded, and executes S1111.

In S1110, the difficulty determination unit 112 adds (number of candidate regions of object class being processed—M+1) to the difficulty score. When the number of candidate regions of the same object class is at least the threshold M, the subject region to be tracked is determined to be difficult to determine, and points are added to the difficulty score (the difficulty is increased). The difficulty determination unit 112 then executes S1112.

In S1111, the difficulty determination unit 112 maintains the difficulty score. When the number of candidate regions of the same object class is less than the threshold M, the subject region to be tracked is determined to be easy to determine, and points are not added to the difficulty score (the difficulty is not increased). The difficulty determination unit 112 then executes S1112.

In S1112, the difficulty determination unit 112 determines whether a size variance of candidate regions associated with the same object class is less than a pre-set threshold L. Here, the size of the candidate region may be, for example, the product of the number of horizontal pixels and the number of vertical pixels in the candidate region. The size of the candidate region is a value normalized by the size of the largest candidate region among the candidate regions of the same object class (≤1). Using the normalized size, the variance can be computed as the average value of the square of the difference between the sizes of the individual candidate regions and the average value of the sizes.

For example, assume that four candidate regions of the dog object class and two candidate regions of the cat object class are detected, and that the pre-set threshold L is 0.1. If, when S1112 is executed for the dog object class, the size variance of the candidate region is 0.2, the difficulty determination unit 112 determines that the size variance of candidate regions of the same object class is not less than L, and executes S1114. On the other hand, if, when S1112 is executed for the cat object class, the size variance of the candidate region is 0.0025, the difficulty determination unit 112 determines that the size variance of candidate regions of the same object class is less than L, and executes S1113.

In S1113, the difficulty determination unit 112 adds one point to the difficulty score. When the size variance of candidate regions of the same object class is less than L, it is conceivable that the candidate regions related to subjects of the same type have similar sizes. Accordingly, the difficulty determination unit 112 determines that it is difficult to determine the subject region to be tracked for the object class being processed, and adds points to the difficulty score (increases the difficulty). The difficulty determination unit 112 then executes S1115.

In S1114, the difficulty determination unit 112 maintains the difficulty score. When the size variance of candidate regions of the same object class is not less than L, it is conceivable that the candidate regions related to subjects of the same type have varying sizes. Accordingly, the difficulty determination unit 112 determines that it is easy to determine the subject region to be tracked for the object class being processed, and does not add points to the difficulty score (does not increase the difficulty). The difficulty determination unit 112 then executes S1115.

Once the processing from S1109 to S1114 has been executed for all of the detected types (object classes), the difficulty determination unit 112 executes S1116.

In S1116, the difficulty determination unit 112 outputs the computed difficulty score to the target determination control unit 135.

Note that the method of computing the difficulty score described here is merely one example, and the difficulty score can be computed through various other methods. For example, rather than adding one point to the difficulty score in S1103, a value multiplied by a pre-set gain coefficient may be added. Additionally, the difficulty score may be computed using only the number of types of candidate regions and the number of candidate regions related to subjects of the same type (belonging to the same object class). Alternatively, the difficulty score may be computed based only on one item. Additionally, the difficulty score may be binary (0 or 1), with control being performed to activate the DL target determination unit 131 when the difficulty score is 1 and deactivate the DL target determination unit 131 when the difficulty score is 0.

Figure 12:
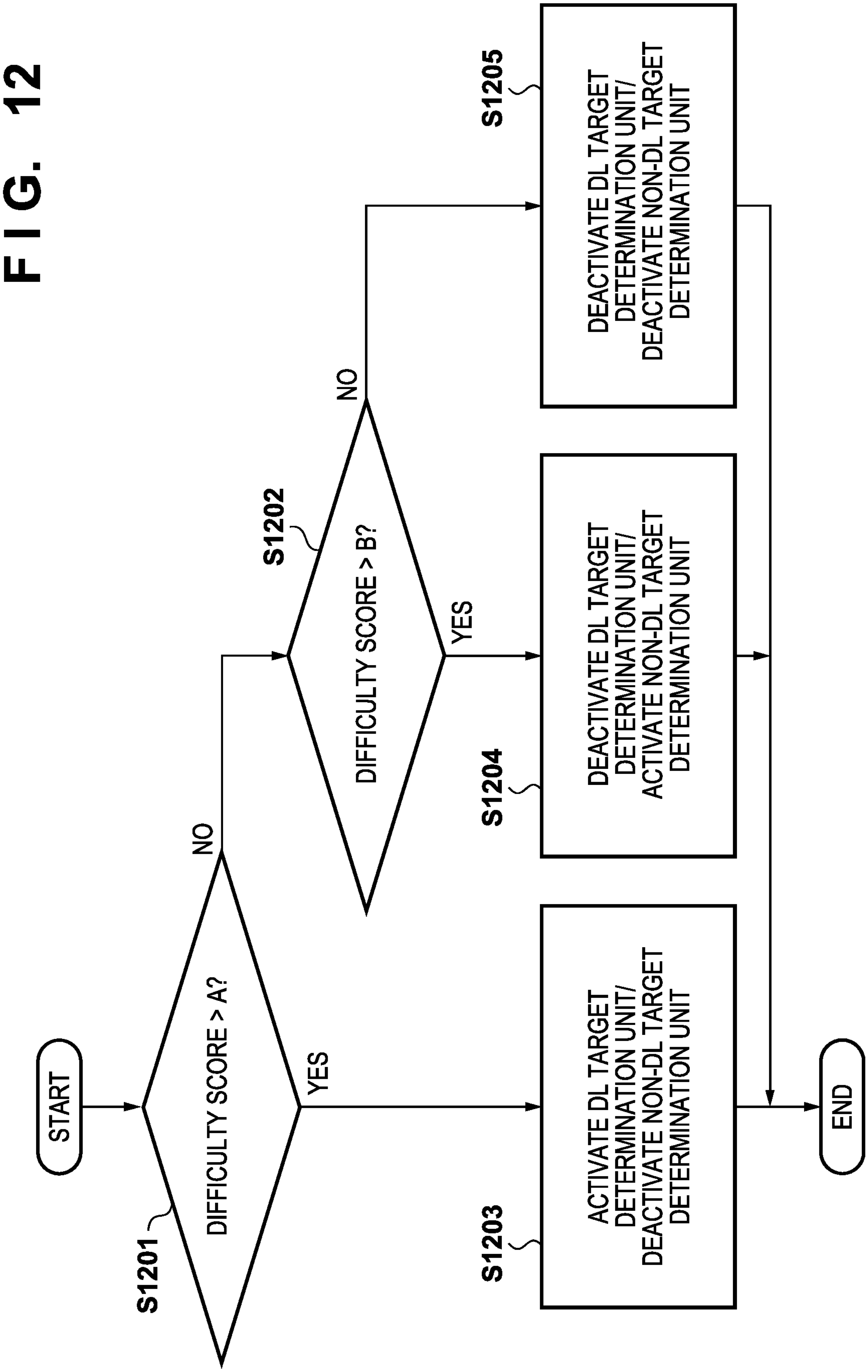
FIG. 12 is a flowchart pertaining to control operation based on a difficulty score in the second embodiment.

Next, operation of the target determination control unit 135 will be described further with reference to the flowchart in FIG. 12. Here, the difficulty determination unit 112 is assumed to compute the difficulty score through the operation described with reference to FIGS. 11A and 11B.

In S1201, the target determination control unit 135 determines whether the difficulty score is greater than a pre-set threshold A, executes S1203 if the difficulty score is determined to be greater, and executes S1202 if not.

In S1202, the target determination control unit 135 determines whether the difficulty score is greater than a pre-set threshold B (<A), executes S1204 if the difficulty score is determined to be greater, and executes S1205 if not.

In S1203, the target determination control unit 135 determines to activate the DL target determination unit 131 and deactivate the non-DL target determination unit 132. When the difficulty score is greater than A, the difficulty in determining the target is high. As such, the target determination control unit 135 determines to use the DL target determination unit 131, which has better performance than the non-DL target determination unit 132. Additionally, the target determination control unit 135 determines that good results are unlikely to be obtained even when using the non-DL target determination unit 132, and determines to not use the non-DL target determination unit 132.

In S1204, the target determination control unit 135 determines to deactivate the DL target determination unit 131 and activate the non-DL target determination unit 132. When the difficulty score is no greater than A but greater than B, it is moderately difficult to determine the target. Accordingly, the target determination control unit 135 determines that sufficiently accurate results are likely to be obtained using the non-DL target determination unit 132, and determines to use only the non-DL target determination unit 132. The power consumption can be reduced by deactivating the DL target determination unit 131, which consumes more power than the non-DL target determination unit 132.

In S1205, the target determination control unit 135 determines to deactivate the DL target determination unit 131 and deactivate the non-DL target determination unit 132. In a state where the difficulty score is no greater than B, determining the target is of low difficulty. Accordingly, the target determination control unit 135 determines that the target can be determined without using the DL target determination unit 131 and the non-DL target determination unit 132, and deactivates both the DL target determination unit 131 and the non-DL target determination unit 132. This makes it possible to further reduce the power consumption.

Note that the subject region to be tracked can be determined without using the DL target determination unit 131 and the non-DL target determination unit 132 when, for example, only one or no candidate regions have been detected. The same applies when one of the plurality of detected candidate regions is extremely large and is present in the center of the screen or in the focus detection region.

The operation of the target determination control unit 135 described here are merely one example. For example, the control need not be varied for each difficulty score. For example, the non-DL target determination unit may be activated in S1205, similar to S1204. Alternatively, S1204 may be executed immediately when the difficulty score is determined to be greater than A in S1201.

Figure 13:
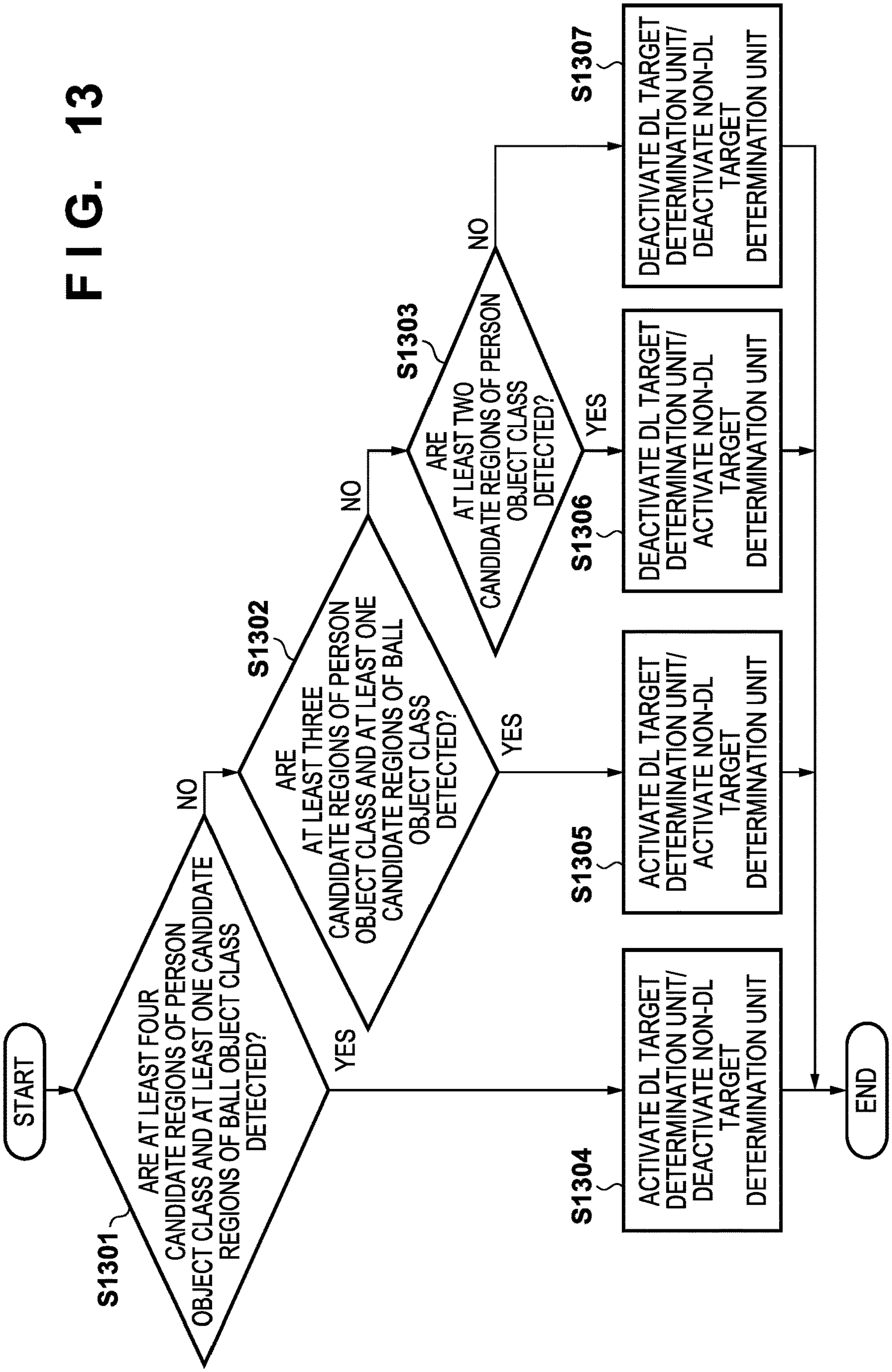
FIG. 13 is a flowchart pertaining to control operation which do not use a difficulty score in the second embodiment.

An example of a method by which the target determination control unit 135 determines to activate and deactivate the DL target determination unit 131 and the non-DL target determination unit 132 without using the difficulty score will be described next with reference to the flowchart in FIG. 13. It is assumed here that the target determination control unit 135 determines to activate and deactivate the DL target determination unit 131 and the non-DL target determination unit 132 using the detected object classes and the number of candidate regions belonging to the same object class.

It is assumed here that the DL target determination unit 131 has a multilayer neural network pre-trained using training data related to specific scenes, e.g., scenes of sports that use balls. The training data is sets of input data and corresponding supervisory data. Here, size information, position information within the screen, object class information, and the confidence level for each of a plurality of candidate regions extracted from image data of sports that use balls can be used as the input data. Supervisory data that takes a candidate region belonging to the person object class, among the candidate regions included in the image data, as a correct answer can be used.

The DL target determination unit 131 having a multilayer neural network trained in this manner can perform highly-accurate target determination processing when the image capturing apparatus 100 captures a scene of a sport that uses a ball. Furthermore, the image data used to generate the input data can be restricted to image data in which the number of candidate regions for the person object class is at least 4. Through this, the DL target determination unit 131 can perform more accurate target determination processing on images of scenes including at least four "people" in a sport that uses a ball.

Operation of the target determination control unit 135 in a case where the DL target determination unit 131 can perform more accurate target determination processing on images of scenes including at least four "people" in a sport that uses a ball will be described hereinafter.

In S1301, the target determination control unit 135 determines whether at least four candidate regions of the person object class and at least one candidate region of a ball object class are detected by the detection unit 110. If at least four candidate regions of the person object class and at least one candidate region of the ball object class are determined to be detected, the target determination control unit 135 executes S1304, and if not, executes S1302.

In S1302, the target determination control unit 135 determines whether three candidate regions of the person object class and at least one candidate region of a ball object class are detected by the detection unit 110. If at least three candidate regions of the person object class and at least one candidate region of the ball object class are determined to be detected, the target determination control unit 135 executes S1305, and if not, executes S1303.

In S1301, the target determination control unit 135 determines whether two candidate regions of the person object class are detected by the detection unit 110. If at least two candidate regions of the person object class are determined to be detected, the target determination control unit 135 executes S1306, and if not, executes S1307.

In S1304, the target determination control unit 135 determines to activate the DL target determination unit 131 and deactivate the non-DL target determination unit 132. When at least four candidate regions of the person object class and at least one candidate region of the ball object class are detected, the scene is the same as the scenes used to train the multilayer neural network of the DL target determination unit 131. As such, the target determination control unit 135 determines to use only the DL target determination unit 131, under the assumption that the DL target determination unit 131 can optimally determine the target.

In S1305, the target determination control unit 135 determines to activate the DL target determination unit 131 and activate the non-DL target determination unit 132. When at least three candidate regions of the person object class and at least one candidate region of the ball object class are detected, the scene is similar to, but is not the same as, the scenes used to train the multilayer neural network of the DL target determination unit 131. On the other hand, it is necessary to perform the target determination processing for the three candidate regions of the person object class, and it is therefore likely that the accuracy will be insufficient if only the non-DL target determination unit is activated. Accordingly, the achieve highly-accurate target determination processing, the target determination control unit 135 determines to use both the DL target determination unit 131 and the non-DL target determination unit 132.

In S1306, the target determination control unit 135 determines to deactivate the DL target determination unit 131 and activate the non-DL target determination unit 132. When two candidate regions of the person object class are detected, one may be selected as the subject region to be tracked, and determining the target is of low difficulty. Accordingly, the target determination control unit 135 determines that sufficiently accurate results are likely to be obtained using the non-DL target determination unit 132, and determines to use only the non-DL target determination unit 132. The power consumption can be reduced by deactivating the DL target determination unit 131, which consumes more power than the non-DL target determination unit 132.

In S1307, the target determination control unit 135 determines to deactivate both the DL target determination unit 131 and the non-DL target determination unit 132. Determining the target is the least difficult when one or no candidate regions of the person object class are detected. Accordingly, the target determination control unit 135 determines that the subject region to be tracked can be determined without using the DL target determination unit 131 and the non-DL target determination unit 132, and deactivates both the DL target determination unit 131 and the non-DL target determination unit 132. This makes it possible to further reduce the power consumption. In this case, the target determination unit 130 determines the sole detected candidate region as the subject region to be tracked without using the DL target determination unit 131 and the non-DL target determination unit 132, and outputs the information. When no candidate region is detected, the target determination unit 130 outputs the determination result from one frame previous again, for example.

The control operation described here are merely one example. The target determination control unit 135 can determine the target determination units to activate taking into account whether the target image is an image of a scene in which the target can be accurately determined by the DL target determination unit 131 and the non-DL target determination unit 132.

Note that the configuration may be such that the scene in which the target can be accurately determined by the DL target determination unit 131 can be switched by switching the parameters obtained when training the multilayer neural network using training data prepared for each of types of scenes. For example, pre-trained parameters corresponding to a scene shot by the image capturing apparatus 100' can be set and used in the multilayer neural network.

Additionally, if the image capturing apparatus 100' has a user line-of-sight detection function, the non-DL target determination unit 132 may determine the target based on the user's line of sight. For example, the non-DL target determination unit 132 can determine a candidate region containing image coordinates which the user focuses on as the subject region to be tracked.

When, in a state where the non-DL target determination unit 132 is set to determine the target based on the user's line of sight, the target determination control unit 135 determines to activate the DL target determination unit 131, the target determination control unit 135 can deactivate the non-DL target determination unit 132. This is because the user's line of sight is considered to be less likely to be fixed on the main subject region in scenes where it is highly difficult to determine the target, where the DL target determination unit 131 is activated.

Figure 14:
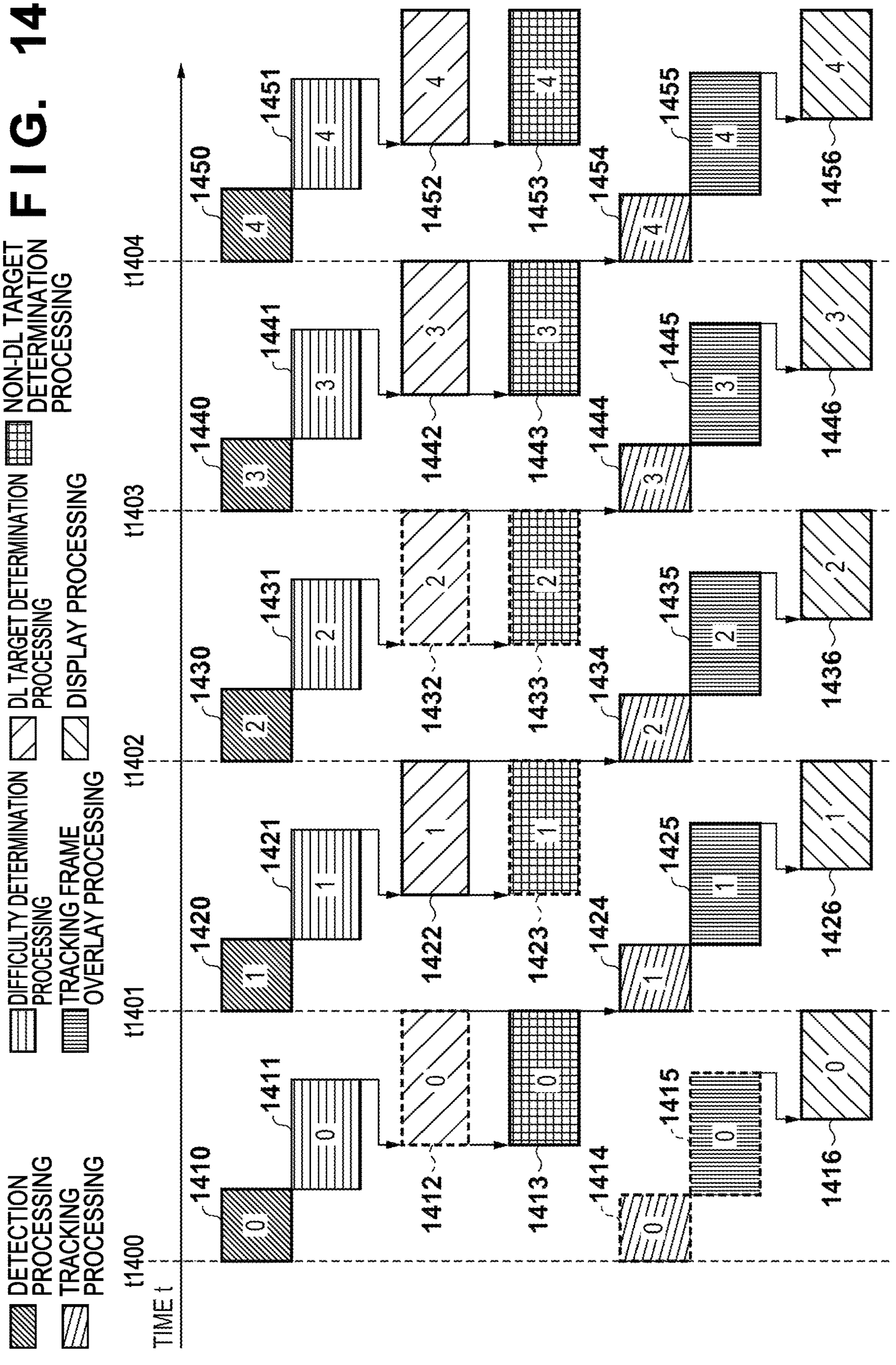
FIG. 14 is an example timing chart pertaining to processing by the image capturing apparatus according to the second embodiment.

FIG. 14 is a timing chart illustrating an example of the operational timing of each of the above-described units when implementing the subject tracking function, which includes target determination processing, in the image capturing apparatus 100'. t1400, t1401, t1402, t1403, and t1404 are times when the detection unit 110 starts detection processing in each frame. At t1400, the detection unit 110 starts detection processing 1410 for the first frame (a 0th frame).

Through the detection processing 1410, the detection unit 110 detects at least one candidate region and the object class thereof in the image data of the 0th frame. Based on the information on the candidate regions detected in the image data of the 0th frame, the difficulty determination unit 112 executes difficulty determination processing 1411 as described with reference to FIGS. 11A and 11B, and computes the difficulty score.

Based on the difficulty score computed by the difficulty determination processing 1411, the target determination control unit 135 determines whether to activate or deactivate the DL target determination unit 131 and the non-DL target determination unit 132 for the image data of the 0th frame.

In FIG. 14, the target determination processing indicated by the broken line (e.g., DL target determination processing 1412) indicates that the target determination unit which executes that target determination processing (the DL target determination unit 131) has been deactivated by the target determination control unit 135. On the other hand, the target determination processing indicated by the solid line (e.g., non-DL target determination processing 1413) indicates that the target determination unit which executes that target determination processing (the non-DL target determination unit 132) has been activated by the target determination control unit 135.

The tracking unit 134 executes tracking processing 1414 for the subject region to be tracked which is output from the target determination unit 130. The tracking unit 134 estimates the position of the subject region to be tracked in the image data to be processed. The tracking unit 134 then outputs the estimated information (position, size, and the like) of the subject region to be tracked in the image data of the 0th frame to the information overlay unit 120 as a tracking result. The tracking processing 1414 is indicated by a broken line because in the 0th frame, the subject region to be tracked has not yet been determined, and the tracking processing will not actually be performed.

Through tracking frame overlay processing 1415, the information overlay unit 120 generates composite image data in which a tracking frame based on the result of the tracking processing 1414 is overlaid on the display image data of the 0th frame. Note that the information overlay unit 120 is indicated by a broken line because in the 0th frame, the subject region to be tracked has not yet been determined, and the tracking frame will not actually be overlaid.

Through display processing 1416, the display unit 121 displays the composite image data of the 0th frame. As described above, the tracking frame overlay processing 1415 has not yet actually been performed, and thus the display unit 121 displays the display image data without a tracking frame overlaid thereon.

Through detection processing 1420, the detection unit 110 detects at least one candidate region and the object class thereof in the image data of the first frame. Based on the information on the candidate regions detected in the image data of the first frame, the difficulty determination unit 112 executes difficulty determination processing 1421 and computes the difficulty score.

Based on the difficulty score computed by the difficulty determination processing 1421, the target determination control unit 135 determines whether to activate or deactivate the DL target determination unit 131 and the non-DL target determination unit 132 for the image data of the first frame. Here, it is assumed that the target determination control unit 135 determines to activate the DL target determination unit 131 and deactivate the non-DL target determination unit 132.

Non-DL target determination processing 1423 is not actually performed and is therefore indicated by a broken line. On the other hand, DL target determination processing 1422 is executed by the DL target determination unit 131. The target determination unit 130 outputs information on the subject region to be tracked determined by the DL target determination unit 131.

Through tracking processing 1424, the tracking unit 134 estimates the position, in the image data of the first frame, where the subject region to be tracked determined through the non-DL target determination processing 1413 for the image of the 0th frame is present. The tracking unit 134 then outputs the estimated information (position, size, and the like) of the subject region to be tracked in the image data of the first frame to the information overlay unit 120 as a tracking result.

Through tracking frame overlay processing 1425, the information overlay unit 120 generates composite image data in which a tracking frame based on the result of the tracking processing 1424 is overlaid on the display image data of the first frame.

Through display processing 1426, the display unit 121 displays the composite image data of the first frame.

Through detection processing 1430, the detection unit 110 detects at least one candidate region and the object class thereof in the image data of the second frame. Based on the information on the candidate regions detected in the image data of the second frame, the difficulty determination unit 112 executes difficulty determination processing 1431 and computes the difficulty score.

Based on the difficulty score computed by the difficulty determination processing 1431, the target determination control unit 135 determines whether to activate or deactivate the DL target determination unit 131 and the non-DL target determination unit 132 for the image data of the second frame. Here, it is assumed that only one candidate region is detected in the detection processing 1430, and the target determination control unit 135 determines to deactivate both the DL target determination unit 131 and the non-DL target determination unit 132.

Accordingly, neither DL target determination processing 1432 nor non-DL target determination processing 1433 are performed, and are indicated by a broken line. In this case, the target determination unit 130 determines the sole detected candidate region as the subject region to be tracked.

Through tracking processing 1434, the tracking unit 134 estimates the position, in the image data of the second frame, where the subject region to be tracked determined through the non-DL target determination processing 1422 for the image of the first frame is present. The tracking unit 134 then outputs the estimated information (position, size, and the like) of the subject region to be tracked in the image data of the second frame to the information overlay unit 120 as a tracking result.

Through tracking frame overlay processing 1435, the information overlay unit 120 generates composite image data in which a tracking frame based on the result of the tracking processing 1434 is overlaid on the display image data of the second frame.

Through display processing 1436, the display unit 121 displays the composite image data of the second frame.

Through detection processing 1440, the detection unit 110 detects at least one candidate region and the object class thereof in the image data of the third frame. Based on the information on the candidate regions detected in the image data of the third frame, the difficulty determination unit 112 executes difficulty determination processing 1441 and computes the difficulty score.

Based on the difficulty score computed by the difficulty determination processing 1441, the target determination control unit 135 determines whether to activate or deactivate the DL target determination unit 131 and the non-DL target determination unit 132 for the image data of the third frame. Here, it is assumed that the target determination control unit 135 determines to activate both the DL target determination unit 131 and the non-DL target determination unit 132.

Accordingly, the DL target determination unit 131 executes DL target determination processing 1442, and the non-DL target determination unit 132 executes non-DL target determination processing 1443. Then, one of the results from the DL target determination processing 1442 and the non-DL target determination processing 1443 is selected by the selection unit 133 and output as information on the subject region to be tracked determined for the third frame. For example, if the two subject regions determined by the respective instances of target determination processing are the same, the selection unit 133 selects a predetermined one thereof. On the other hand, if the two subject regions determined by the respective instances of target determination processing are different, the selection unit 133 selects one determination result according to a predetermined condition. For example, the selection unit 133 can select the determination result indicating the larger of the subject regions, the subject region having a center of gravity that is closer to the center of the image, or the subject region having a center of gravity that is closer to the focus detection region.

Through tracking processing 1444, the tracking unit 134 estimates the position, in the image data of the third frame, where the subject region to be tracked determined for the image of the second frame is present. The tracking unit 134 then outputs the estimated information (position, size, and the like) of the subject region to be tracked in the image data of the third frame to the information overlay unit 120 as a tracking result.

Through tracking frame overlay processing 1445, the information overlay unit 120 generates composite image data in which a tracking frame based on the result of the tracking processing 1444 is overlaid on the display image data of the third frame.

Through display processing 1446, the display unit 121 displays the composite image data of the third frame.

Through detection processing 1450, the detection unit 110 detects at least one candidate region and the object class thereof in the image data of the fourth frame. Based on the information on the candidate regions detected in the image data of the fourth frame, the difficulty determination unit 112 executes difficulty determination processing 1451 and computes the difficulty score.

Based on the difficulty score computed by the difficulty determination processing 1451, the target determination control unit 135 determines whether to activate or deactivate the DL target determination unit 131 and the non-DL target determination unit 132 for the image data of the fourth frame. Here, it is assumed that the target determination control unit 135 determines to activate both the DL target determination unit 131 and the non-DL target determination unit 132.

Accordingly, the DL target determination unit 131 executes DL target determination processing 1452, and the non-DL target determination unit 132 executes non-DL target determination processing 1453. The selection unit 133 selects and outputs one determination result as described with respect to the processing for the third frame.

Through tracking processing 1454, the tracking unit 134 estimates the position, in the image data of the fourth frame, where the subject region to be tracked determined for the image of the third frame is present. The tracking unit 134 then outputs the estimated information (position, size, and the like) of the subject region to be tracked in the image data of the fourth frame to the information overlay unit 120 as a tracking result.

Through tracking frame overlay processing 1455, the information overlay unit 120 generates composite image data in which a tracking frame based on the result of the tracking processing 1454 is overlaid on the display image data of the fourth frame.

Through display processing 1456, the display unit 121 displays the composite image data of the fourth frame.

The timing chart in FIG. 14 is merely an example, and can be changed in various ways. For example, although the detection processing and the difficulty determination processing are executed for each frame in FIG. 14, the frequency of execution may be reduced. The power consumption can be reduced by executing the processing once every several frames. In this case, the subject region to be tracked may be updated using the results of the target determination processing for the frames on which the detection processing and the difficulty determination processing are executed, and the results of the target determination processing for the frames on which the detection processing and the difficulty determination processing are executed need not be used for updating.

Live-view display operation in the present embodiment are the same as those described in the first embodiment with reference to FIG. 7 and will therefore not be described here.

Figure 15A:
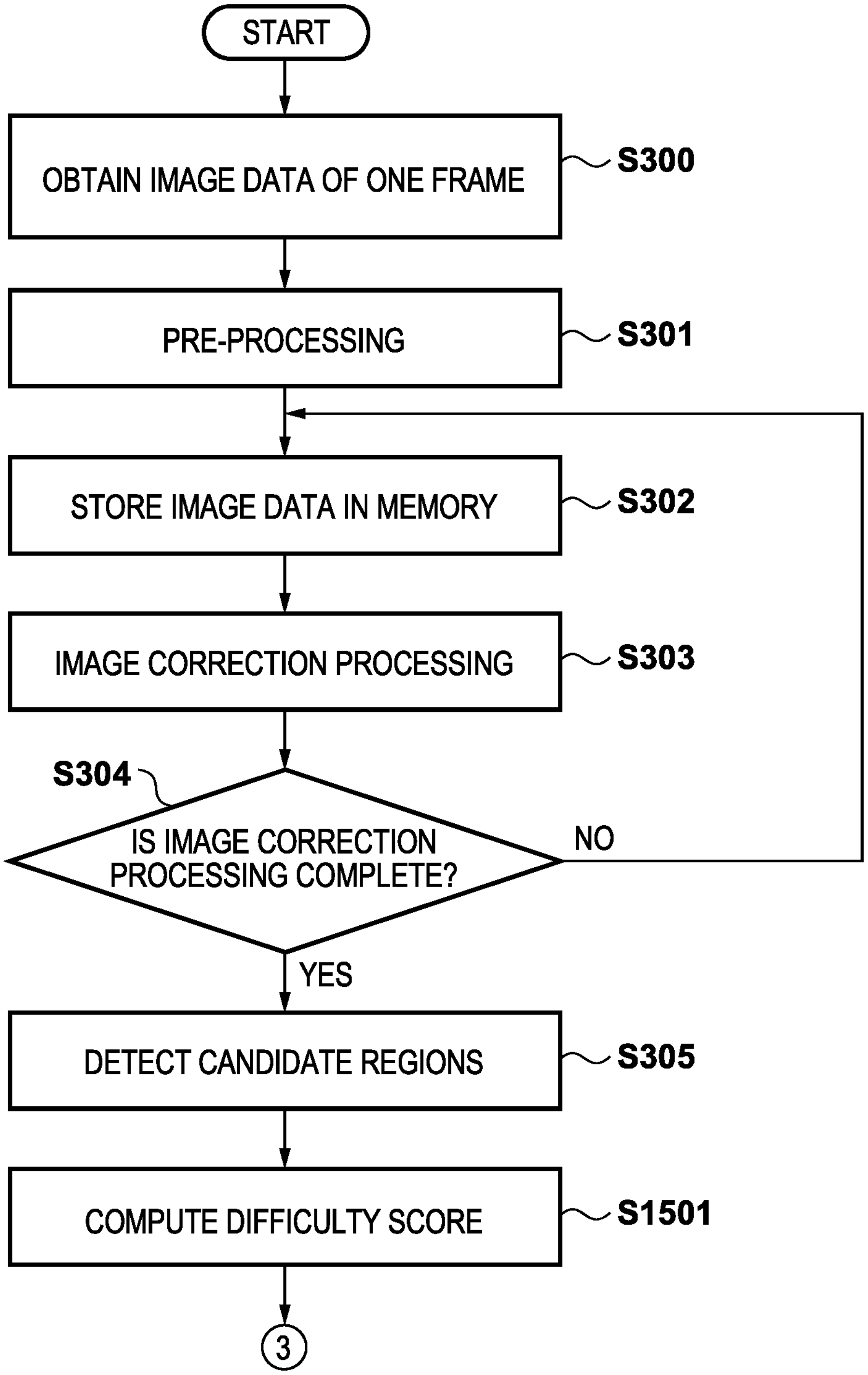
FIG. 15A is a flowchart pertaining to a method for determining a subject region to be tracked in the second embodiment.
Figure 15B:
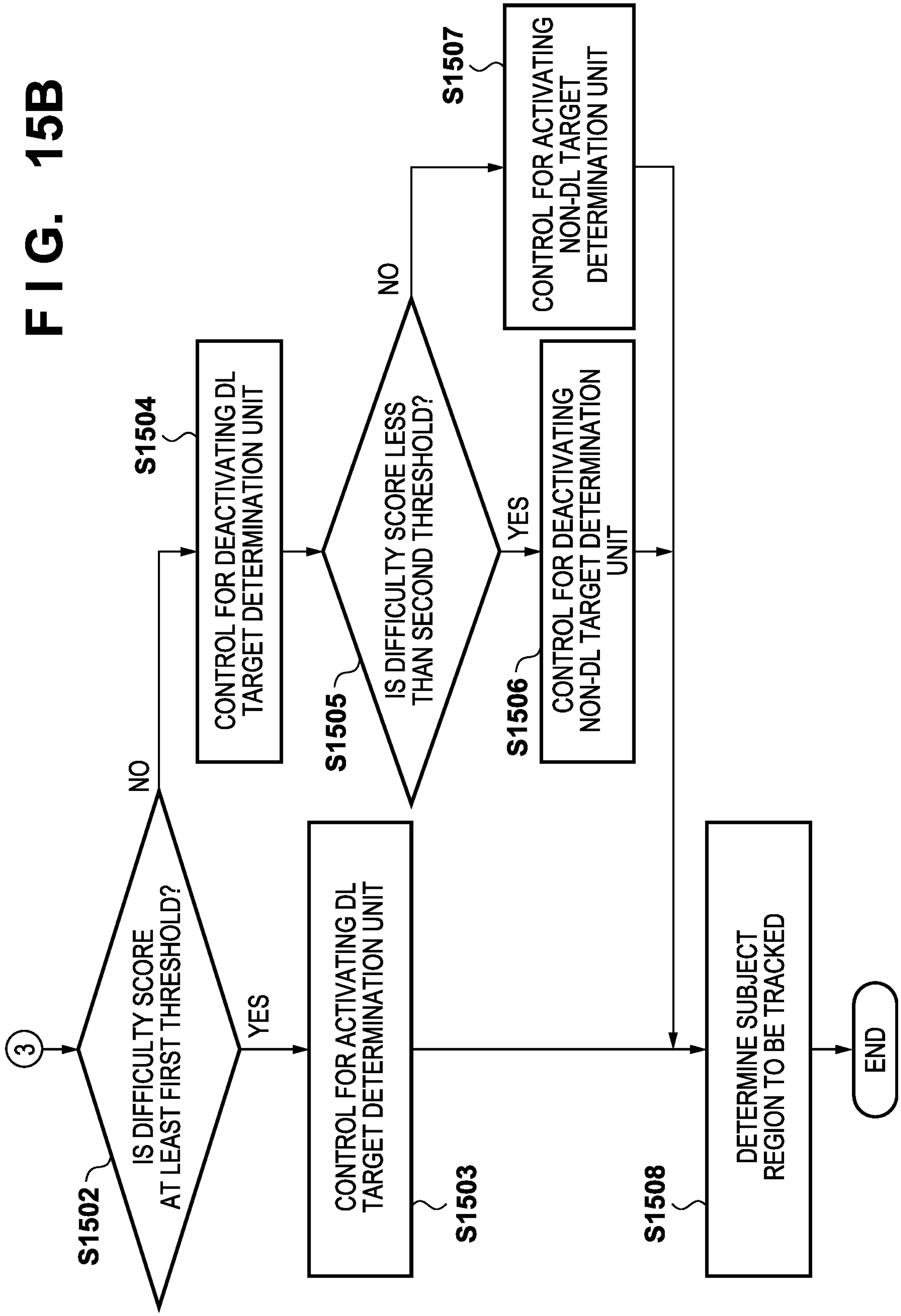
FIG. 15B is a flowchart pertaining to a method for determining a subject region to be tracked in the second embodiment.

FIGS. 15A and 15B are flowcharts pertaining to control of the operation of the target determination unit used to determine the subject region to be tracked.

The processing from S300 to S305 is the same as the processing described in the first embodiment with reference to FIG. 8A and will therefore not be described here. Note that the image correction processing is correction processing for tracking and for detection.

In S1501, the difficulty determination unit 112 computes the difficulty score, which indicates the difficulty of determining the target, as described with reference to FIGS. 11A and 11B, for example, based on the candidate region detection result from S305. The difficulty determination unit 112 outputs the computed difficulty score to a target determination control unit 135.

In S1502, the target determination control unit 135 determines whether the difficulty score is at least a pre-set first threshold. The target determination control unit 135 executes S1503 if the difficulty score is determined to be at least the first threshold, and executes S1504 of the difficulty score is not determined to be at least the first threshold.

In S1503, the target determination control unit 135 determines to activate the DL target determination unit 131, and executes control for activating the DL target determination unit 131.

In S1504, the target determination control unit 135 determines to deactivate the DL target determination unit 131, and executes control for deactivating the DL target determination unit 131. Furthermore, the target determination control unit 135 executes S1505.

In S1505, the target determination control unit 135 determines whether the difficulty score is less than a pre-set second threshold. Here, the second threshold is lower than the first threshold (the difficulty is lower). The target determination control unit 135 executes S1506 if the difficulty score is determined to be less than the second threshold, and executes S1507 if the difficulty score is not determined to be less than the second threshold.

In S1506, the target determination control unit 135 determines to deactivate the non-DL target determination unit 132, and executes control for deactivating the non-DL target determination unit 132.

In S1507, the target determination control unit 135 determines to activate the non-DL target determination unit 132, and executes control for activating the non-DL target determination unit 132.

In S1508, if only one of the DL target determination unit 131 and the non-DL target determination unit 132 is active, the target determination unit 130 selects the determination result from the active target determination unit using the selection unit 133.

If both the DL target determination unit 131 and the non-DL target determination unit 132 are active, and the respective determination results indicate the same subject region, the target determination unit 130 selects either of the determination results using the selection unit 133. If the determination results are different, the target determination unit 130 selects one of the determination results based on a predetermined condition using the selection unit 133, as described above. For example, the target determination unit 130 selects the determination result indicating the subject region having a center position closer to the center of the screen, using the selection unit 133. The target determination unit 130 stores the determination result selected by the selection unit 133 as information on the subject region to be tracked in the tracking memory 108.

If both the DL target determination unit 131 and the non-DL target determination unit 132 are inactive, the target determination unit 130 confirms the number of candidate regions detected in S305. If the number of detected candidate regions is 1, the target determination unit 130 determines the detected candidate region as the subject region to be tracked, and stores the information thereon in the tracking memory 108. If the number of candidate regions is 0, no subject to be tracked is present. In this case, the target determination unit 130 may store the information on the subject region to be tracked output immediately before in the tracking memory 108, or may deactivate tracking processing for the next frame.

This completes the operation for determining the subject region to be tracked for one frame. Similar processing is repeated thereafter for each frame or every predetermined number of frames.

FIG. 16 is a flowchart pertaining to operation of the subject tracking function in the image capturing apparatus 100, and processing that is the same as in FIGS. 15A and 15B will be given the same reference numerals. The processing of S300 to S304 will not be described.

In S1601, the tracking unit 134 determines whether the subject region to be tracked has been determined in the processing of S1508 for the frame one previous to the target frame. The tracking unit 134 executes S1602 if it is determined that the subject region to be tracked has been determined in the previous frame, and executes S1603 if it is not determined that the subject region to be tracked has been determined.

In S1602, the tracking unit 134 updates the information on the subject region to be tracked with the information determined for the previous frame. If the tracking processing is deactivated in the previous frame, the tracking unit 134 executes control for starting the tracking processing. This is because, as described above, if not even one candidate region has been detected, the tracking processing can be deactivated for the next frame.

In S1603, the tracking unit 134 determines whether a tracking continuation state is in effect. The "tracking continuation state" is a state in which the tracking processing is active and the subject region to be tracked has been determined in the previous frame. The tracking unit 134 executes S1604 if the state is determined to be a tracking continuation state, and executes S314 if the state is not determined to be a tracking continuation state.

In S1604, the tracking unit 134 executes the tracking processing for the determined subject region. The tracking unit 134 outputs the estimated size of the subject region and position within the image to the information overlay unit 120 as the tracking result.

The processing from S313 to S315 is the same as the processing described in the first embodiment with reference to FIG. 8B and will therefore not be described here. However, if the state is determined not to be a tracking continuation state in S1603 and S314 is executed, this means that there is no tracking result, and thus the tracking frame is not overlaid.

In the present embodiment, in an image processing apparatus which uses a first target determination unit that determines the subject region to be tracked and a second target determination unit having a higher accuracy but a greater operational load than the first target determination unit, whether to activate or deactivate the first and/or second tracking unit is controlled based on the difficulty of determining the target. Accordingly, power consumption can be suppressed while suppressing a drop in target determination accuracy by deactivating a target determination unit unlikely to be capable of making an accurate determination, deactivating the other target determination unit when only one of the target determination units is likely to be capable of making an accurate determination, and the like.

Because target determination processing is typically executed each time on consecutive frames, the effect of suppressing power consumption is particularly great when using a target determination unit that uses machine learning having a high operational load, such as deep learning, as the second target determination unit.

Third Embodiment

Figure 17:
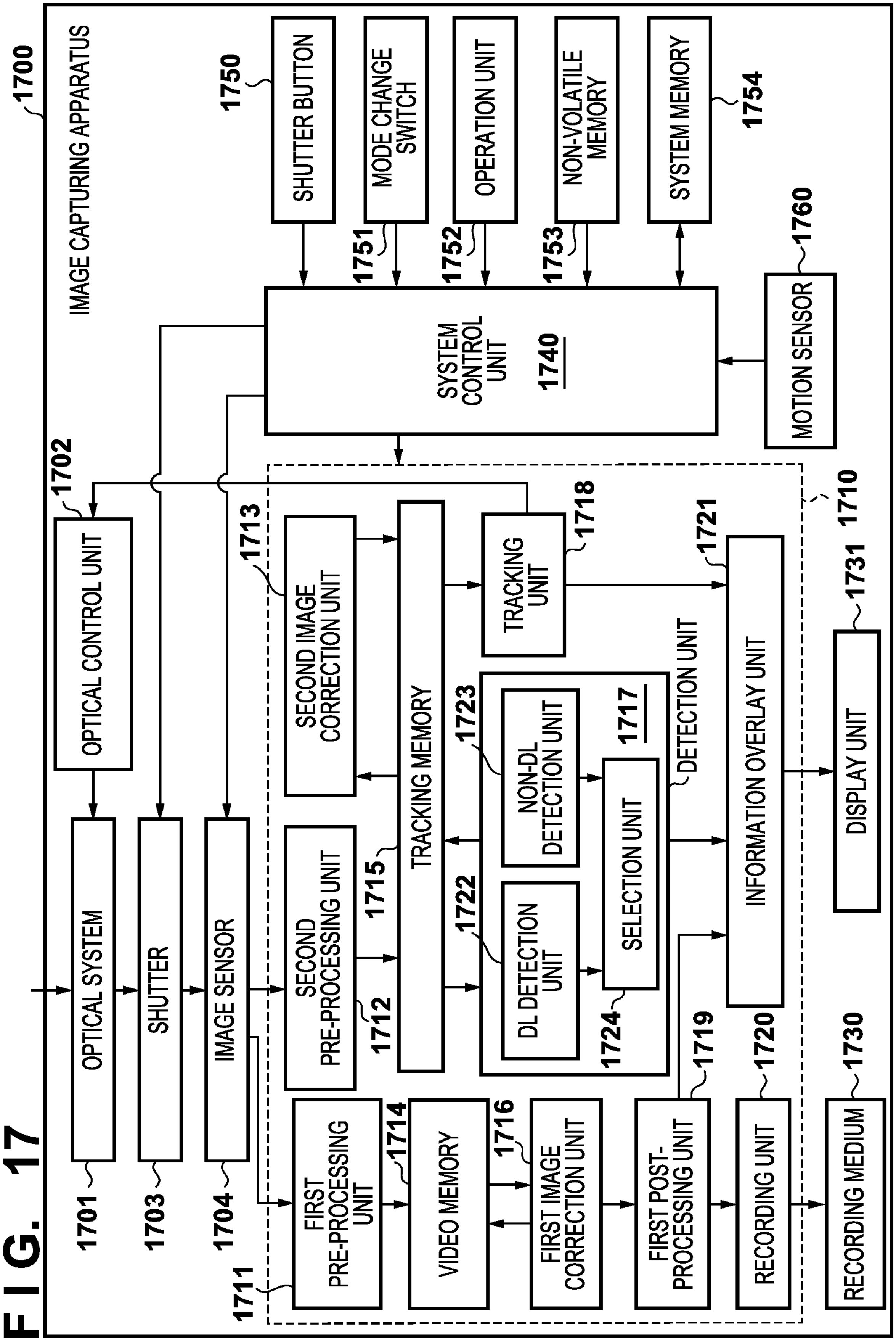
FIG. 17 is a block diagram illustrating an example of the functional configuration of an image capturing apparatus according to third to eighth embodiments.

A third embodiment of the present invention will be described next. FIG. 17 is a block diagram illustrating an example of the functional configuration of an image capturing apparatus 1700 serving as an example of an image processing apparatus according to the third embodiment.

An optical system 1701 and an image sensor 1704 may have similar configurations as those of the optical system 101 and the image sensor 103 in the image capturing apparatus 100, and will therefore not be described. In the present embodiment, a mechanical shutter 1703 (called simply a "shutter" hereinafter) is provided between the optical system 1701 and the image sensor 1704, but the shutter 1703 is not required. Operation of the shutter 1703 are controlled by a system control unit 1740. A shutter speed corresponds to the exposure time of the image sensor 1704.

An optical control unit 1702 computes a defocus amount for each of a plurality of focus detection regions by capturing an optical image, formed by the optical system 1701, using, for example, a phase difference AF sensor. The focus detection region may be, for example, a predetermined rectangular region within the image capturing plane. The optical control unit 1702 determines the focus detection region on which the optical system 1701 is to be focused based on the computed defocus amount and a tracking result from a tracking unit 1718. The optical control unit 1702 then drives the focus lens of the optical system 1701 based on the defocus amount computed for the determined focus detection region. This brings the optical system 1701 into focus on a subject within the determined focus detection region.

The image sensor 1704 outputs image data obtained by image capturing to a first pre-processing unit 1711 and a second pre-processing unit 1712 of an image processing unit 1710.

The first pre-processing unit 1711 performs processing similar to that of the first pre-processing unit 104 on the image data and stores the result in a video memory 1714.

A first image correction unit 1716 applies processing similar to that of the first image correction unit 109 to the image data, and outputs the image data to which the processing has been applied to a first post-processing unit 1719.

The first post-processing unit 1719 generates recording image data, display image data, and the like in a manner similar to the post-processing unit 114. The first post-processing unit 1719 supplies the recording image data to a recording unit 1720. The first post-processing unit 1719 supplies the display image data to an information overlay unit 1721.

The recording unit 1720 records the recording image data generated by the first post-processing unit 1719 into a recording medium 1730. The recording medium 1730 may be, for example, a semiconductor memory card, built-in non-volatile memory, or the like.

Similar to the second pre-processing unit 105, the second pre-processing unit 1712 applies color interpolation processing to the image data and stores the result in tracking memory 1715. In the present embodiment too, the tracking memory 1715 and the video memory 107 may be implemented as separate address spaces within the same memory space. The second pre-processing unit 1712 may also apply reduction processing for reducing the number of pixels as necessary, in order to lighten the processing load. Although the first pre-processing unit 1711 and the second pre-processing unit 1712 are described as separate function blocks here, these units may be configured using a common pre-processing unit.

A second image correction unit 1713 applies similar processing as that of the second image correction unit 106 to the image data stored in the tracking memory 1715. The second image correction unit 1713 stores the image data to which the processing has been applied in tracking memory 1715.

In the present embodiment too, the function blocks pertaining to the subject tracking function, such as the second pre-processing unit 1712, the second image correction unit 1713, and the like, need not operate when the subject tracking function is not used. Additionally, the image data to which the subject tracking function is applied is moving image data shot for the purpose of live-view display or recording. The moving image data has a predetermined framerate of 30 fps, 60 fps, 120 fps, or the like, for example.

A detection unit 1717 detects at least one region of a predetermined candidate subject (a candidate region) from one frame's worth of image data. Additionally, for each detected region, the detection unit 1717 associates an object class, which indicates the position within the frame, the size, and the type of the candidate subject (automobile, aircraft, bird, insect, human body, head, pupil, cat, dog, or the like), with a confidence level thereof. The number of detected candidate regions is also obtained for each object class.

In the present embodiment, the detection unit 1717 includes a plurality of detection units having different operational loads and target determination accuracies. Specifically, the detection unit 1717 includes a DL detection unit 1722 that performs target determination processing using deep learning (DL), and a non-DL detection unit 1723 that performs target determination processing without using DL. The DL detection unit 1722 is assumed to have a higher processing accuracy than the non-DL detection unit 1723, but also a greater operational load than the non-DL detection unit 1723.

The DL detection unit 1722 and the non-DL detection unit 1723 each detect candidate regions, associate object classes and confidence levels thereof with types of the candidate regions, and count the number of candidate regions in each object class. The DL detection unit 1722 and the non-DL detection unit 1723 also obtain information on the sizes and positions of the detected candidate regions.

The DL detection unit 1722 can be implemented by a multiclass discriminator using machine learning. The DL detection unit 1722 can be implemented using multiclassed logistic regression, support vector machines, random forests, neural networks, and the like.

The non-DL detection unit 1723 detects the candidate regions through a publicly-known method that does not use machine learning. The non-DL detection unit 1723 can, for example, detect the candidate regions through pattern matching using templates prepared in advance for each object class, feature detection using feature information prepared in advance for each object class, detection based on distance information, or the like.

Similar to the information overlay unit 120, the information overlay unit 1721 generates an image of a tracking frame based on the center position and the size of the subject region to be tracked output by the detection unit 1717 or the tracking unit 1718. The information overlay unit 1721 then generates composite image data in which the image of the tracking frame is overlaid on the display image data output from the first post-processing unit 1719. The information overlay unit 1721 outputs the composite image data to a display unit 1731.

Non-volatile memory 1753 is, for example, rewritable non-volatile memory such as EEPROM, and stores programs which can be executed by a CPU of the system control unit 1740, setting values, GUI data, and the like.

System memory 1754 is RAM, for example, and is used to load programs executed by the CPU of the system control unit 1740, store values required while programs are being executed, and so on.

The system control unit 1740 includes a CPU, and loads programs stored in the non-volatile memory 1753 into the system memory 1754 and executes the programs, for example. The system control unit 1740 implements the functions of the image capturing apparatus 1700 by controlling the operation of the respective function blocks.

A release button 1750, a mode change switch 1751, and an operation unit 1752 are input devices for inputting instructions to the system control unit 1740.

The release button 1750 includes a switch SW1 that turns on when pressed halfway, and a switch SW2 that turns on when pressed fully. The system control unit 1740 recognizes SW1 turning on as a still image shooting preparation instruction and SW2 turning on as a still image shooting start instruction, and executes operation according to the respective instructions.

In response to the shooting preparation instruction, the system control unit 1740 executes autofocus (AF) processing, automatic exposure (AE) processing, auto white balance (AWB) processing, flash pre-emission (EF) processing, and the like.

Additionally, in response to a shooting instruction, the system control unit 1740 executes still image shooting processing using the results of the AF processing, the AE processing, and the like executed in response to the shooting preparation instruction. The still image shooting processing includes control for opening/closing the shutter 1703, controlling the operation of the image sensor 1704, operation for generating the recording image data in the image processing unit 1710 and recording the recording image data into the recording medium 1730, and the like. The system control unit 1740 controls the respective function blocks pertaining to this series of still image shooting processing.

A motion sensor 1760 outputs a signal according to motion of the image capturing apparatus 1700, and outputs the signal to the system control unit 1740. The motion sensor 1760 may be an accelerometer, an angular velocity sensor, or the like, for example. When the optical system 101 includes a motion sensor for image stabilization, motion of the image capturing apparatus 1700 may be detected using the motion sensor for image stabilization, without providing the motion sensor 1760.

The mode change switch 1751 switches the operating mode of the system control unit 1740 among a still image shooting mode, a moving image shooting mode, a playback mode, and the like. The still image shooting mode includes an auto shooting mode, an auto scene determination mode, a manual mode, an aperture priority mode (Av mode), and a shutter speed priority mode (Tv mode) as modes. There are also various types of scene modes, a program AE mode, custom modes, and the like as shooting settings for different shooting scenes. The mode change switch 1751 can be used to switch directly to any one of these modes included in a menu button. Alternatively, the mode switch may be carried out by first switching to the menu button using the mode change switch 1751 and then using another operation member to switch to one of the modes included in the menu button. Likewise, the moving image shooting mode may include a plurality of modes.

"Operation unit 1752" is a collective name for input devices aside from the release button 1750 and the mode change switch 1751. Functions are assigned to the input devices included in the operation unit 1752 according to the operating state of the image capturing apparatus 1700 through, for example, operation of selecting function icons displayed in the display unit 1731. The input devices are named according to the functions assigned thereto.

For example, a direction button, a set button, an end button, a back button, a next image button, a jump button, a sort button, an attribute change button, a menu button, and the like are included in the operation unit 1752. For example, a menu screen in which various types of settings can be made is displayed in the display unit 1731 when the menu button is pressed. A user can make various types of settings by operating a menu screen displayed in the display unit 1731 using the direction button, the set button, and the like.

In the present embodiment, a line-of-sight information obtainment unit (line-of-sight detecting means) is provided as an input device included in the operation unit 1752. The line-of-sight information obtainment unit detects the user's line of sight or a user's gaze position within the display unit 1731. FIG. 18 is a diagram illustrating an example of the configuration of a line-of-sight information obtainment unit 1800. Here, it is assumed that the display unit 1731 is provided in a look through-type viewfinder, and the position in the display unit 1731 that the user is gazing at is detected by detecting the direction of the line of sight from the rotation angle of the user's eyeball 1802 looking into the viewfinder.

In FIG. 18, the line-of-sight information obtainment unit 1800 includes an image sensor 1801*a*, a light-receiving lens 1801*b*, a dichroic mirror 1801*c*, and an illumination light source 1801*e*. An ocular lens 1801*d* is a viewfinder optical system, and is not directly related to the obtainment of line-of-sight information.

The user can observe the display in the display unit 1731 through the ocular lens 1801*d* and the dichroic mirror 1801*c*. The illumination light source 1801*e* projects infrared light toward the outside of the viewfinder. When the user is looking into the viewfinder, the infrared light is reflected by the eyeball 1802, and the reflected light enters into the viewfinder. The reflected light is reflected upward by the dichroic mirror 1801*c*, and an eyeball image formed by the light-receiving lens 1801*b* is captured by the image sensor 1801*a*. Image data of the eyeball image is transmitted from the image sensor 1801*a* to the system control unit 1740.

The system control unit 1740 extracts, for example, a pupil region from the eyeball image and detects the rotation angle of the eyeball from the position of the pupil region. The system control unit 1740 then obtains the user's line-of-sight direction from the rotation angle of the eyeball. The line-of-sight direction may be obtained through computations, or may be obtained by referring to a table storing relationships between rotation angles and line-of-sight directions. The system control unit 1740 detects a position (coordinates), within the display unit 1731, at which the user is gazing based on the line-of-sight direction. Note that the gaze position may be obtained from the rotation angle of the eyeball.

It is assumed here that the viewfinder is viewed with a single eye, and that the line-of-sight information, which is the line-of-sight direction and gaze position of both eyes, is obtained for a single eye. However, if the environment is such that eyeball images can be obtained for both eyes, the line-of-sight information may be obtained for the respective eyes. When the line-of-sight information is obtained for both eyes, the accuracy of the line-of-sight information can be improved by, for example, using one instance of line-of-sight information considered to have a higher detection accuracy.

Note that any other configuration can be used as long as the line-of-sight information obtainment unit 1800 is capable of identifying the position in the display unit 1731 at which the user is gazing. Note also that the display unit 1731 does not absolutely have to be provided within the image capturing apparatus 1700. For example, the display unit 1731, the illumination light source 1801*e*, and the light-receiving lens 1801*b* may be provided on the rear face of the image capturing apparatus 1700.

Operation by the system control unit 1740 for controlling the activation and deactivation of the DL detection unit 1722 and the non-DL detection unit 1723 based on the line of sight or the gaze position detected by the line-of-sight information obtainment unit 1800 will be described next.

Figure 19:
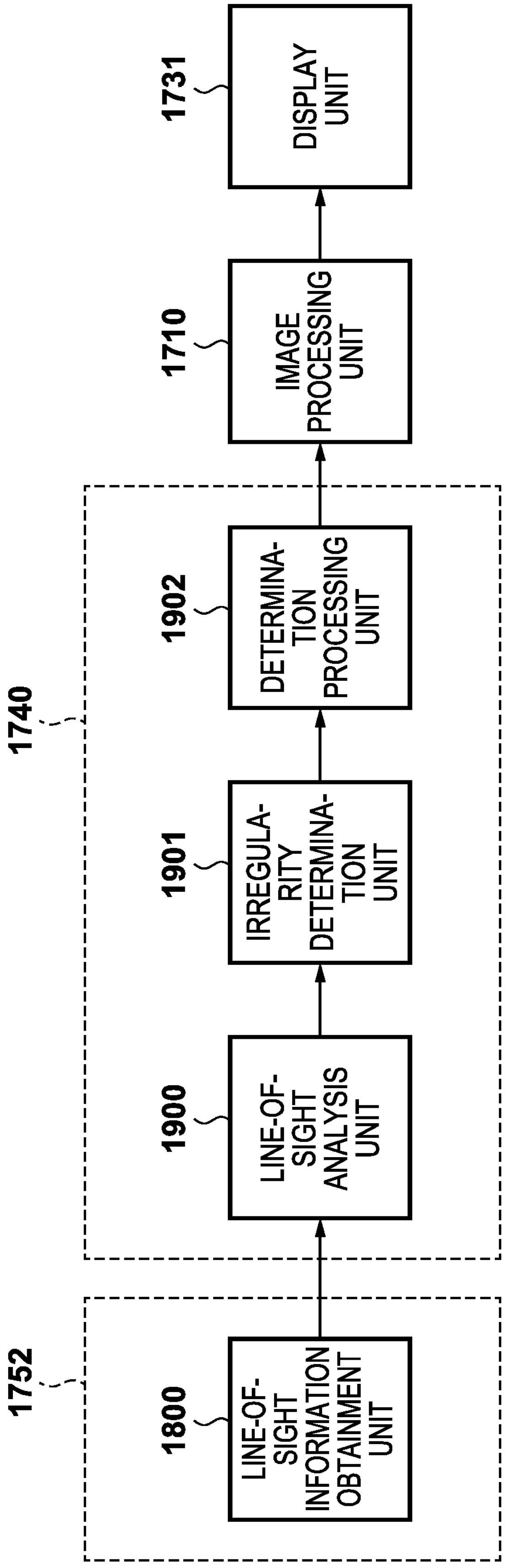
FIG. 19 is a diagram illustrating function blocks pertaining to activation/deactivation control of a subject detection unit in a third embodiment.

FIG. 19 is a diagram illustrating function blocks related to the operation for controlling the activation/deactivation of the subject detection unit based on the line of sight or the gaze position. Although FIG. 19 illustrates the system control unit 1740 as three function blocks for the sake of simplicity, in actuality, the CPU of the system control unit 1740 realizes the functions of these function blocks by executing programs.

Figure 20:
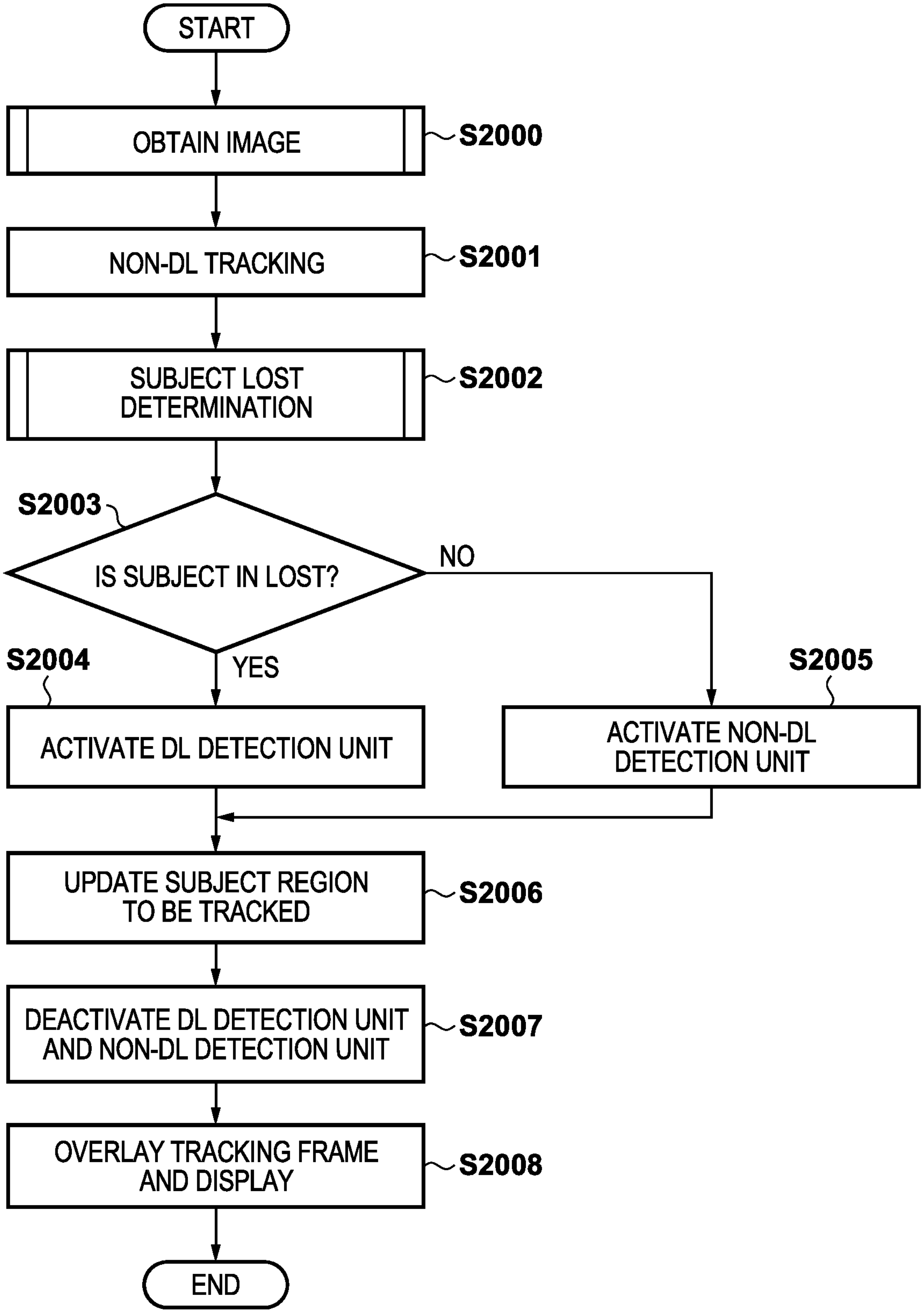
FIG. 20 is a flowchart pertaining to operation by a system control unit according to the third embodiment.

Operation by which the system control unit 1740 controls the activation/deactivation of the subject detection unit based on the line of sight or the gaze position will be described hereinafter with reference to the flowchart in FIG. 20 as well as FIGS. 17 and 19.

S2000 indicates image obtainment processing. The image obtainment processing will be described in detail with reference to the flowchart in FIG. 21.

In S2100, the system control unit 1740 controls the image sensor 1704 and executes one frame's worth of image capturing operation. As a result, a subject optical image formed by the optical system 1701 is converted into RAW image data constituted by a plurality of instances of pixel data.

In S2102, the first pre-processing unit 1711 of the image processing unit 1710 applies demosaicing to the RAW image data and generates image data in which each pixel has RGB components. The first pre-processing unit 1711 stores the generated image data in the video memory 1714. Note that the first pre-processing unit 1711 may convert the image data from RGB format to YUV format before storing the image data in the video memory 1714.

In S2103, the first image correction unit 1716 applies predetermined image correction processing to the image data stored in the video memory 1714. Note that the image correction processing also includes evaluation value computation processing. The first image correction unit 1716 may vary the readout range of the image data according to the processing to be applied.

For example, for image processing applied to image data of one line (pixel line), only the image data of one line to which the processing is to be applied may be read out, or the image data of a plurality of lines including the one line to which the processing is to be applied may be read out. Additionally, the image processing may be applied to image data in a rectangular region of a predetermined size. The first image correction unit 1716 executes the image correction processing while storing the image processing results in the video memory 1714 as appropriate.

In S2104, the first image correction unit 1716 determines whether or not all the image correction processing to be applied to the one frame's worth of image data is complete. If all the image correction processing to be applied is determined to be complete, the first image correction unit 1716 outputs the post-image correction processing image data to the first post-processing unit 1719, and outputs the evaluation values to the system control unit 1740. This completes one frame's worth of image obtainment processing. On the other hand, if it is determined that image correction processing to be applied still remains, the first image correction unit 1716 repeats the execution of S2103.

Note that similar processing is performed by the second pre-processing unit 1712, the tracking memory 1715, and the second image correction unit 1713, except that the image data is stored in the tracking memory 1715 and the second image correction unit 1713 applies the image processing for tracking.

Returning to FIG. 20, in S2001, the tracking unit 1718 applies tracking processing to the image data obtained in S2000 and stored in the tracking memory 1715. Note that the tracking unit 1718 is assumed to apply the non-DL tracking processing applied by the non-DL tracking unit 117 in the first embodiment. The tracking unit 1718 outputs the position and size of the subject region to be tracked as the tracking result.

In S2002, the system control unit 1740 executes subject lost determination processing. The subject lost determination processing will be described in detail with reference to the flowchart in FIG. 22.

In S2200, the system control unit 1740 obtains the line-of-sight information of the user through the line-of-sight information obtainment unit 1800. The line-of-sight information obtained here may be the line-of-sight direction, or may be the gaze position.

In S2201, a line-of-sight analysis unit 1900 computes an irregularity level of the line-of-sight information. The irregularity level of the line-of-sight information is an evaluation value for the stability of the user's gaze position. The irregularity level being high corresponds to a state where the user's gaze position is unstable and is moving irregularly within the screen of the display unit 1731. Accordingly, when the irregularity level of the line-of-sight information is high, the user is considered to have lost sight of the main subject and is searching on the screen.

Based on the irregularity level computed in S2201, in S2003, an irregularity determination unit 1901 determines whether the user has lost sight of the subject.

The irregularity level of the line-of-sight information in S2201 may be computed through any method. Additionally, the determination in S2003 can be made using a threshold based on the irregularity level. The following are examples of methods for computing and determining the irregularity level.

Using frequency information, in the time axis direction, of the gaze position or the trajectory of the line of sight A frequency spectrum is computed, and the magnitude of the spectrum at least a given frequency is obtained as the irregularity level. The subject is determined to have been lost sight of when the irregularity level exceeds a threshold.

Computing the absolute value of autocorrelation of the gaze position or the trajectory of the line of sight as the irregularity level If the movement of the line of sight is regular, the autocorrelation approaches 1 at adjacent time spans, whereas if the movement of the line of sight is random, the autocorrelation approaches 0. The subject is determined to have been lost when the irregularity level is less than a threshold.

The absolute value of a cross-correlation between an average value of the magnitudes of velocity vectors or acceleration vectors of the gaze position or the line of sight, and an average value of the magnitude of velocity vectors or acceleration vectors of the trajectories of individual subject regions, at a given time span T, is computed as the irregularity level.

The subject is determined to have been lost when the irregularity level is less than a threshold for all the subject regions.

If in S2003 the irregularity determination unit 1901 determines that the subject has been lost, a processing determination unit 1902 executes S2004. If in S2003 the irregularity determination unit 1901 does not determine that the subject has been lost, the processing determination unit 1902 executes S2005.

In S2004, the processing determination unit 1902 determines to activate the DL detection unit 1722. The non-DL detection unit 1723 may be deactivated or activated. The DL detection unit 1722 in the image processing unit 1710 executes candidate region detection processing using machine learning ("DL", here) as described above. If the DL detection unit 1722 has detected only one candidate region, the system control unit 1740 determines the detected candidate region as the subject region to be tracked.

On the other hand, if the DL detection unit 1722 has detected a plurality of candidate regions, the system control unit 1740 determines the subject region to be tracked from among the plurality of candidate regions. The system control unit 1740 can determine the subject region to be tracked based on the size, position, and the like of the candidate region, as described in the previous embodiments, or through another method. The other method is not particularly limited, but for example, the user may be allowed to select the subject region to be tracked from the detected candidate regions. For example, an indicator similar to the tracking frame may be displayed overlaid on each of the detected candidate regions, and the user may be allowed to select the subject region to be tracked through the operation unit 1752. The user can select the subject region to be tracked by operating the direction button and the set button, or by detecting the gaze position using the line-of-sight information obtainment unit 1800, for example.

In S2005, the processing determination unit 1902 determines to deactivate the DL detection unit 1722 and activate the non-DL detection unit 1723. The non-DL detection unit 1723 in the image processing unit 1710 detects the candidate region through a method that does not use machine learning, as described above. In this case, the user is determined not to have lost sight of the subject, and thus the system control unit 1740 can determine the subject region to be tracked from among the candidate regions based on the line-of-sight information.

Note that the image processing unit 1710 may be provided with a target determination unit, and the target determination unit may determine the subject region to be tracked from among the candidate regions, as in the first embodiment.

In S2006, the system control unit 1740 outputs the information on the subject region to be tracked to the tracking unit 1718 and the information overlay unit 1721. The information on the subject region to be tracked is updated as a result.

In S2007, the system control unit 1740 deactivates both the DL detection unit 1722 and the non-DL detection unit 1723 to suppress power consumption.

In S2008, the information overlay unit 1721 generates a composite image data, in which a tracking frame indicating the subject region to be tracked updated in S2006 is overlaid on the display image data from the first post-processing unit 1719, and outputs the composite image data to the display unit 1731.

In the present embodiment, whether to use a first subject detection unit which detects the candidate region of the subject region to be tracked, or a second subject detection unit having a higher accuracy but a greater operational load than the first subject detection unit, is determined according to whether the user has lost sight of the subject. Specifically, the second subject detection unit is used when the user has lost sight of the subject, and is not used when the user has not lost sight of the subject. When the user has not lost sight of the subject, the candidate regions can be detected with sufficient accuracy by the first subject detection unit, and thus deactivating the second subject detection unit makes it possible to suppress power consumption while suppressing a drop in the detection accuracy.

Fourth Embodiment

A fourth embodiment of the present invention will be described next. In the present embodiment, the DL detection unit and the non-DL detection unit are controlled to be activated or deactivated according to the autofocus (AF) mode of the image capturing apparatus. The present embodiment can be implemented using an image capturing apparatus 1700 similar to that in the third embodiment, and will therefore be described using the constituent elements illustrated in FIG. 17.

Here, the image capturing apparatus 1700 is assumed to have a single AF mode which holds a focus detection result, and a continuous AF mode which performs focus detection operation continuously, as AF modes. The single AF mode is likely to be used to shoot subjects which are still or move little, such as landscapes or portraits. On the other hand, the continuous AF mode is likely to be used to shoot moving subjects such as vehicles or sports scenes.

Accordingly, motion of the main subject which the user is attempting to shoot can be estimated from the AF mode which is set. The AF mode may be specified explicitly by the user, or may be set automatically according to the shooting mode of the image capturing apparatus 1700, such as a sports mode or a landscape mode. The system control unit 1740 may set the mode based on other conditions as well.

Note that the AF mode is a setting related to focus detection operation when shooting still images. However, subject tracking in the still image shooting mode is applied to the moving image shot for live-view display when in a shooting standby state.

In the present embodiment, when using the single AF mode, the subject is likely to be still or moving little, which makes detecting the subject relatively easy, and thus the DL detection unit 1722 is deactivated and the non-DL detection unit 1723 is activated. On the other hand, when using the continuous AF mode, the subject is likely to be in motion or moving significantly, which makes detecting the subject relatively difficult, and thus the DL detection unit 1722 is activated and the non-DL detection unit 1723 is deactivated. Such control makes it possible to suppress power consumption while suppressing a drop in the subject detection accuracy.

Operation of the system control unit 1740 in the present embodiment will be described hereinafter with reference to the flowchart in FIG. 23. In FIG. 23, steps that perform processing identical to that in the third embodiment are given the same reference numerals as in FIG. 20, and will not be described. The processing of S2000 and S2001 is the same as that described in the third embodiment.

In S2302, the system control unit 1740 determines whether the current AF mode of the image capturing apparatus 1700 is the continuous AF mode. If the current AF mode of the image capturing apparatus 1700 is determined to be the continuous AF mode, in S2004, the system control unit 1740 activates the DL detection unit 1722. The non-DL detection unit 1723 can be deactivated to suppress power consumption, but may be activated as well. On the other hand, if the current AF mode of the image capturing apparatus 1700 is not determined to be the continuous AF mode, in S2005, the system control unit 1740 activates the non-DL detection unit 1723 and deactivates the DL detection unit 1722.

The subsequent processing is the same as in the third embodiment, and will therefore not be described here.

In the present embodiment, whether to use a first subject detection unit which detects the candidate region of the subject region to be tracked, or a second subject detection unit having a higher accuracy but a greater operational load than the first subject detection unit, is determined according to the autofocus mode of the image capturing apparatus. Specifically, the second subject detection unit is used when an autofocus mode likely to be used to shoot a moving subject is set, and is not used when an autofocus mode likely to be used to shoot a still subject is set. When the subject moves little, the candidate regions can be detected accurately by the first subject detection unit, and thus deactivating the second subject detection unit makes it possible to suppress power consumption while suppressing a drop in the detection accuracy.

Fifth Embodiment

A fifth embodiment of the present invention will be described next. In the present embodiment, the DL detection unit 1722 and the non-DL detection unit 1723 are controlled to be activated and deactivated according to the framerate of the moving image to which tracking processing is applied. The present embodiment can be implemented using an image capturing apparatus 1700 similar to that in the third embodiment, and will therefore be described using the constituent elements illustrated in FIG. 17.

The amount of movement of a subject region between frames drops as the framerate increases. As such, the amount of movement of the subject region to be tracked is low when the framerate is high, making subject blur unlikely to occur. It is therefore likely that sufficient accuracy can be achieved with the non-DL detection unit 1723. Accordingly, it is less necessary to perform detection using the DL detection unit 1722 for each frame.

Therefore, the frequency with which the DL detection unit 1722 is activated is reduced when the framerate of the moving image to which the tracking processing is applied is higher than a predetermined first threshold (fps), compared to when the framerate is no greater than the first threshold. This makes it possible to reduce power consumption while suppressing a drop in detection accuracy. Note that the first threshold can be determined experimentally, for example. Additionally, a plurality of thresholds may be provided, and the frequency with which the DL detection unit 1722 is activated may be controlled over three or more steps.

Operation of the system control unit 1740 in the present embodiment will be described hereinafter with reference to the flowchart in FIG. 24. It is assumed here that the framerate of the moving image to which the tracking processing is applied has already been determined to be higher than the predetermined first threshold (fps). Additionally, in FIG. 24, steps that perform processing identical to that in the third embodiment are given the same reference numerals as in FIG. 20, and will not be described. The processing of S2000 and S2001 is the same as that described in the third embodiment.

In S2402, the system control unit 1740 determines whether the value of a variable COUNT, which is used as a counter for a number of frames, is a predetermined N (an integer of at least 2). Assuming the DL detection unit 1722 is activated every M frames when the framerate of the moving image to which the tracking processing is applied is no greater than the first threshold (fps), the value of N can be determined so as to satisfy the relationship N>M. Here, assume that M=1 and N=10. The system control unit 1740 executes S2403 if the value of the variable COUNT is determined to be N, and executes S2404 if not.

N=10, and thus S2403 is executed once every 10 frames. In S2403, the system control unit 1740 resets the value of the variable COUNT to 1. Then, in S2004, the system control unit 1740 activates the DL detection unit 1722. The non-DL detection unit 1723 can be deactivated to suppress power consumption, but may be activated as well.

On the other hand, in S2404, the system control unit 1740 adds 1 to the value of the variable COUNT. Then, in S2005, the system control unit 1740 activates the non-DL detection unit 1723 and deactivates the DL detection unit 1722. The subsequent processing is the same as in the third embodiment, and will therefore not be described here.

This completes one frame's worth of operation in the live-view display. Through the above-described processing, when the framerate of the moving image to which the tracking processing is applied is high, the DL detection unit 1722 is active for one out of every 10 frames, and is inactive for the remaining nine frames. The non-DL detection unit 1723 is activated in frames for which the DL detection unit 1722 is inactive.

In the present embodiment, of the subject detection units that detect candidate regions for a subject region to be tracked, the frequency of using the second subject detection unit, which has a higher accuracy but a greater operational load than the first subject detection unit, is controlled according to the framerate of the moving image to which tracking processing is applied. Specifically, the frequency with which the second subject detection unit is activated is reduced when the framerate of the moving image to which the tracking processing is applied is high, compared to when the framerate is not high. When the subject moves little, the candidate regions can be detected accurately by the first subject detection unit, and thus reducing the frequency of using the second subject detection unit makes it possible to suppress power consumption while suppressing a drop in the detection accuracy.

Sixth Embodiment

A sixth embodiment of the present invention will be described next. In the present embodiment, the DL detection unit and the non-DL detection unit are controlled to be activated or deactivated according to the shutter speed of the image capturing apparatus. The present embodiment can be implemented using an image capturing apparatus 1700 similar to that in the third embodiment, and will therefore be described using the constituent elements illustrated in FIG. 17.

When the shutter speed is fast, subject blur is less likely to occur. It is therefore likely that sufficient accuracy can be achieved with the non-DL detection unit 1723. Accordingly, the DL detection unit 1722 is deactivated when the shutter speed is fast.

Figure 25:
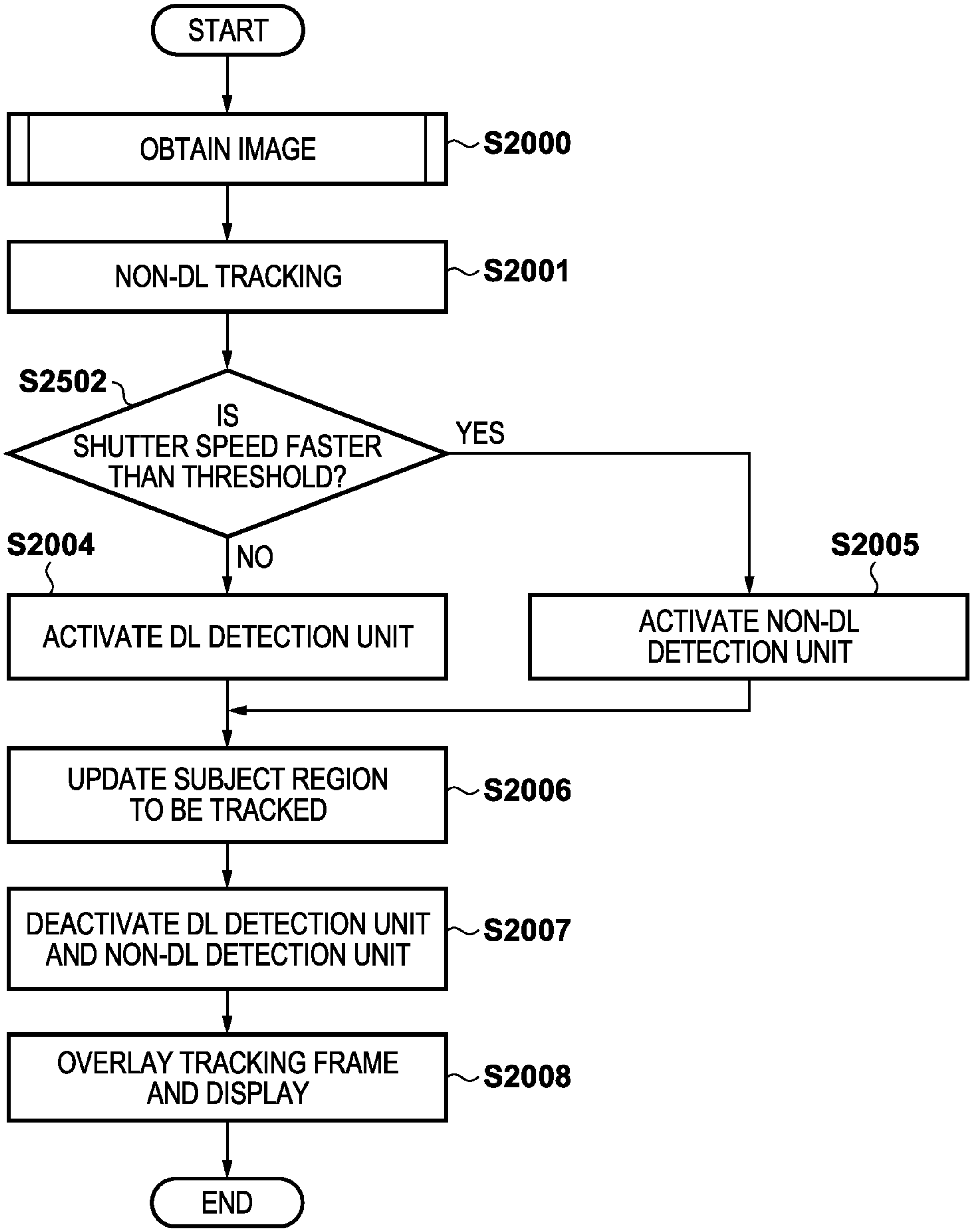
FIG. 25 is a flowchart pertaining to operation by a system control unit according to the sixth embodiment.

Operation of the system control unit 1740 in the present embodiment will be described hereinafter with reference to the flowchart in FIG. 25. In FIG. 25, steps that perform processing identical to that in the third embodiment are given the same reference numerals as in FIG. 20, and will not be described. The processing of S2000 and S2001 is the same as that described in the third embodiment.

In S2502, the system control unit 1740 determines whether the shutter speed currently set is faster than a threshold. The threshold used here can be determined experimentally, for example, according to the performance of the non-DL detection unit 1723 or the like.

If the shutter speed is determined to be faster than the threshold, in S2004, the system control unit 1740 activates the DL detection unit 1722. The non-DL detection unit 1723 can be deactivated to suppress power consumption, but may be activated as well.

On the other hand, if the shutter speed is not determined to be faster than the threshold, in S2005, the system control unit 1740 activates the non-DL detection unit 1723 and deactivates the DL detection unit 1722. The subsequent processing is the same as in the third embodiment, and will therefore not be described here.

In the present embodiment, whether to use a first subject detection unit which detects the candidate region of the subject region to be tracked, or a second subject detection unit having a higher accuracy but a greater operational load than the first subject detection unit, is determined according to the shutter speed of the image capturing apparatus. Specifically, the second subject detection unit is used when the shutter speed is not fast (is slow), and is not used when the shutter speed is fast. When the shutter speed is fast, subject blur is unlikely to occur and the candidate regions can be detected accurately by the first subject detection unit, and thus deactivating the second subject detection unit makes it possible to suppress power consumption while suppressing a drop in the detection accuracy.

Seventh Embodiment

A seventh embodiment of the present invention will be described next. In the present embodiment, the DL detection unit and the non-DL detection unit are controlled to be activated or deactivated in response to a user instruction. The present embodiment can be implemented using an image capturing apparatus 1700 similar to that in the third embodiment, and will therefore be described using the constituent elements illustrated in FIG. 17.

In the present embodiment, the DL detection unit 1722 is activated only when the user activates DL subject detection processing. Any user instruction may be used to activate the DL subject detection processing. It is not necessary for the user to consciously instruct the DL subject detection processing, and any instruction which effectively activates the DL subject detection processing may be used.

Here, as one example, it is assumed that an input device to which is assigned a function for switching the DL subject detection processing between active and inactive (a DL subject detection button) is provided in the operation unit 1752. The system control unit 1740 switches the DL subject detection processing between active and inactive each time the DL subject detection button is pressed. Alternatively, the system control unit 1740 may activate the DL subject detection processing only while the DL subject detection button is being pressed. The DL subject detection button may also be a software key which uses the display unit 1731.

Figure 26:
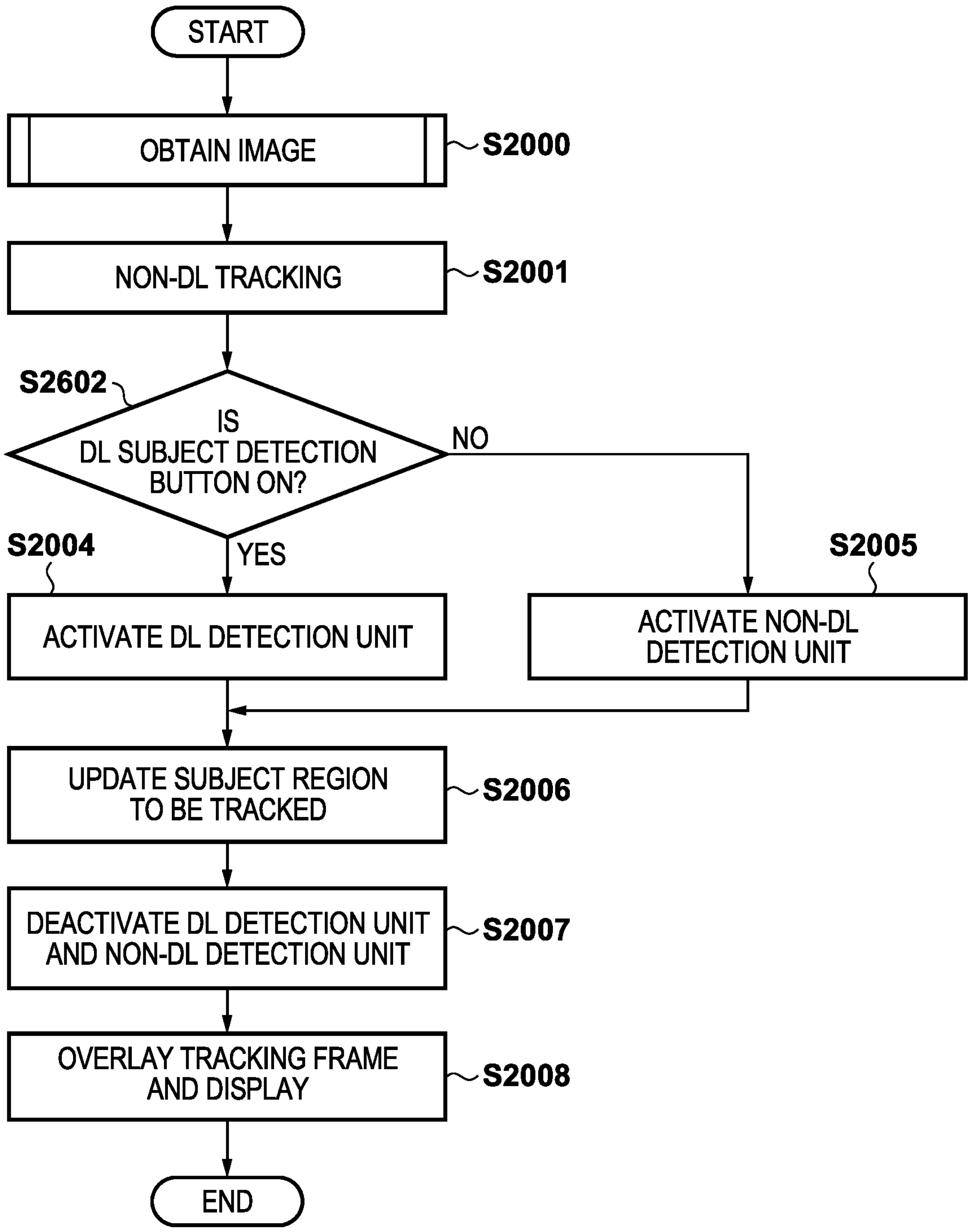
FIG. 26 is a flowchart pertaining to operation by a system control unit according to the seventh embodiment.

Operation of the system control unit 1740 in the present embodiment will be described hereinafter with reference to the flowchart in FIG. 26. In FIG. 26, steps that perform processing identical to that in the third embodiment are given the same reference numerals as in FIG. 20, and will not be described. The processing of S2000 and S2001 is the same as that described in the third embodiment.

In S2602, the system control unit 1740 determines whether the DL subject detection button is on. Here, the DL subject detection button is determined to be on when the button is being pressed. If the DL subject detection button is determined to be on, in S2004, the system control unit 1740 activates the DL detection unit 1722. The non-DL detection unit 1723 can be deactivated to suppress power consumption, but may be activated as well. On the other hand, if the DL subject detection button is not determined to be on, in S2005, the system control unit 1740 activates the non-DL detection unit 1723 and deactivates the DL detection unit 1722. The subsequent processing is the same as in the third embodiment, and will therefore not be described here.

In the present embodiment, of the subject detection units that detect candidate regions for a subject region to be tracked, whether to activate or deactivate the second subject detection unit, which has a higher accuracy but a greater operational load than the first subject detection unit, is controlled in response to a user instruction. Specifically, the second subject detection unit is activated only when a user instruction to activate the second subject detection unit is detected. As a result, the second subject detection unit is deactivated when not needed by the user, which makes it possible to suppress power consumption.

Eighth Embodiment

An eighth embodiment of the present invention will be described next. In the present embodiment, the DL detection unit and the non-DL detection unit are controlled to be activated or deactivated according to an operation situation of the apparatus. The present embodiment can be implemented using an image capturing apparatus 1700 similar to that in the third embodiment, and will therefore be described using the constituent elements illustrated in FIG. 17.

Specifically, the DL detection unit 1722 is deactivated when it is determined that a pan, tilt, or zoom operation, which are operation for changing the image capturing range, is being performed. This is because when these operation is being performed, the user may be making an adjustment to bring the main subject into the image capturing range. As such, even if the DL detection unit 1722 is activated during these operation, it may not be possible to obtain a meaningful detection result. In the present embodiment, the DL detection unit 1722 can be activated only when it is determined that a pan, tilt, or zoom operation is not being performed in the image capturing apparatus 1700.

Figure 27:
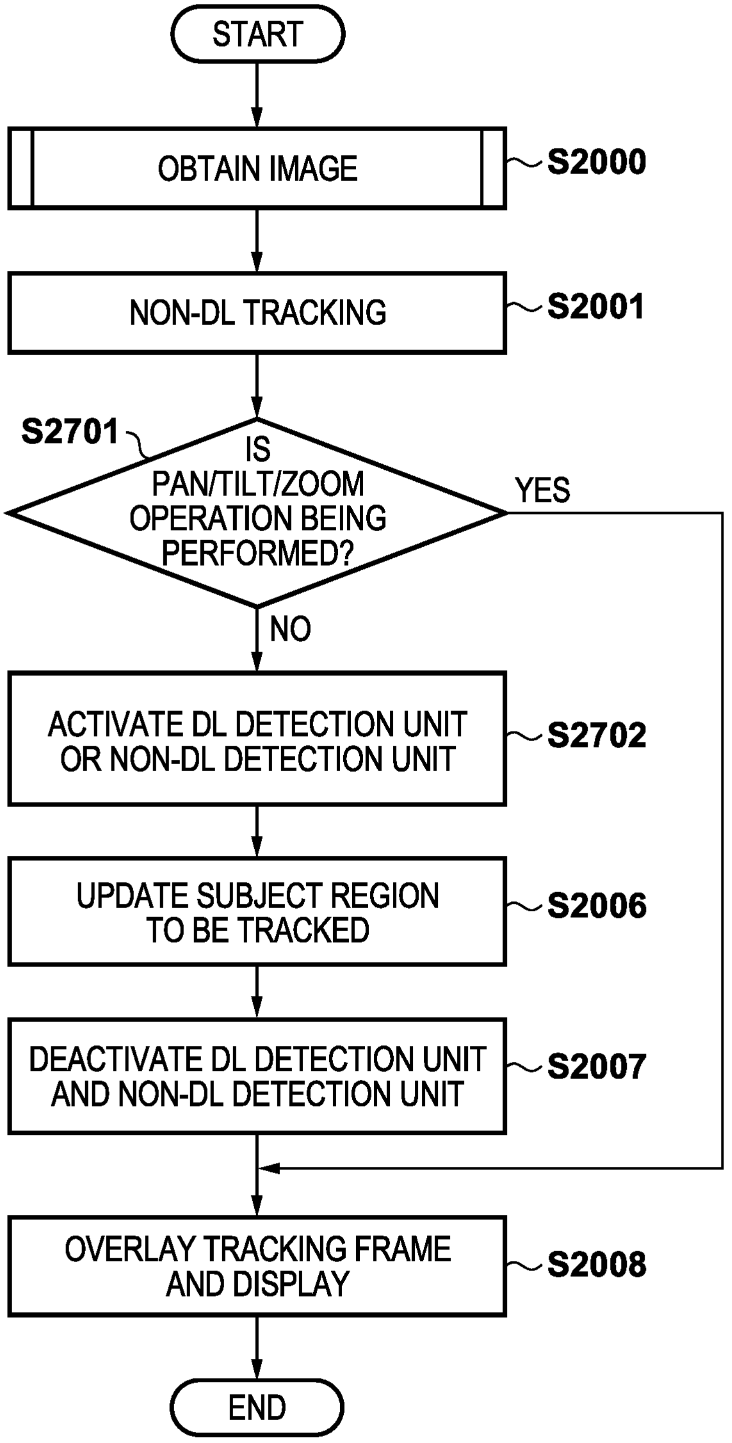
FIG. 27 is a flowchart pertaining to operation by a system control unit according to the eighth embodiment.

Operation of the system control unit 1740 in the present embodiment will be described hereinafter with reference to the flowchart in FIG. 27. In FIG. 27, steps that perform processing identical to that in the third embodiment are given the same reference numerals as in FIG. 20, and will not be described. The processing of S2000 and S2001 is the same as that described in the third embodiment.

In S2702, the system control unit 1740 determines whether a pan, tilt, or zoom operation is being performed in the image capturing apparatus 1700. The system control unit 1740 can detect a pan, tilt, or zoom operation by detecting a change in motion vectors, a change in the sizes of feature regions, or the like between frames of a moving image being shot for live-view display, or from the output of the motion sensor 1760, for example. Zoom operation can also be detected from the zoom button of the operation unit 1752 being operated.

If it is determined that pan, tilt, or zoom operation is being performed, the system control unit 1740 executes S2008. On the other hand, if it is not determined that pan, tilt, or zoom operation is being performed, the system control unit 1740 executes S2702.

In S2702, the system control unit 1740 activates the DL detection unit 1722 or the non-DL detection unit 1723. When the DL detection unit 1722 is active, the non-DL detection unit 1723 can be deactivated to suppress power consumption, but may be activated as well. At least one of the conditions described in the third to seventh embodiments, for example, can be used as the conditions for activating the DL detection unit 1722. If the conditions for activating the DL detection unit 1722 are not satisfied, the system control unit 1740 deactivates the DL detection unit 1722 and activates the non-DL detection unit 1723. The processing from S2006 on is the same as in the third embodiment, and will therefore not be described here.

In the present embodiment, of the subject detection units that detect candidate regions for a subject region to be tracked, the second subject detection unit, which has a higher accuracy but a greater operational load than the first subject detection unit, can be activated only when operation for changing the image capturing range is not being performed. Ensuring that the second subject detection unit is not activated in a state where the image capturing range is not finalized makes it possible to efficiently suppress power consumption. Furthermore, ensuring that the first subject detection unit is also not activated in a state where the image capturing range is not finalized makes it possible to suppress power consumption even more.

Variation

Note that the activation and deactivation of DL subject detection and non-DL subject detection may be controlled based on a condition different from the conditions described in the third to eighth embodiments above. For example, the activation and deactivation of DL subject detection and non-DL subject detection may be controlled according to the shooting mode (still image shooting mode or moving image shooting mode), the pressing state of the release button (not pressed, half-pressed, or fully pressed), the state of a tracking mode, or the type of a tracked object.

Ninth Embodiment

Figure 28:
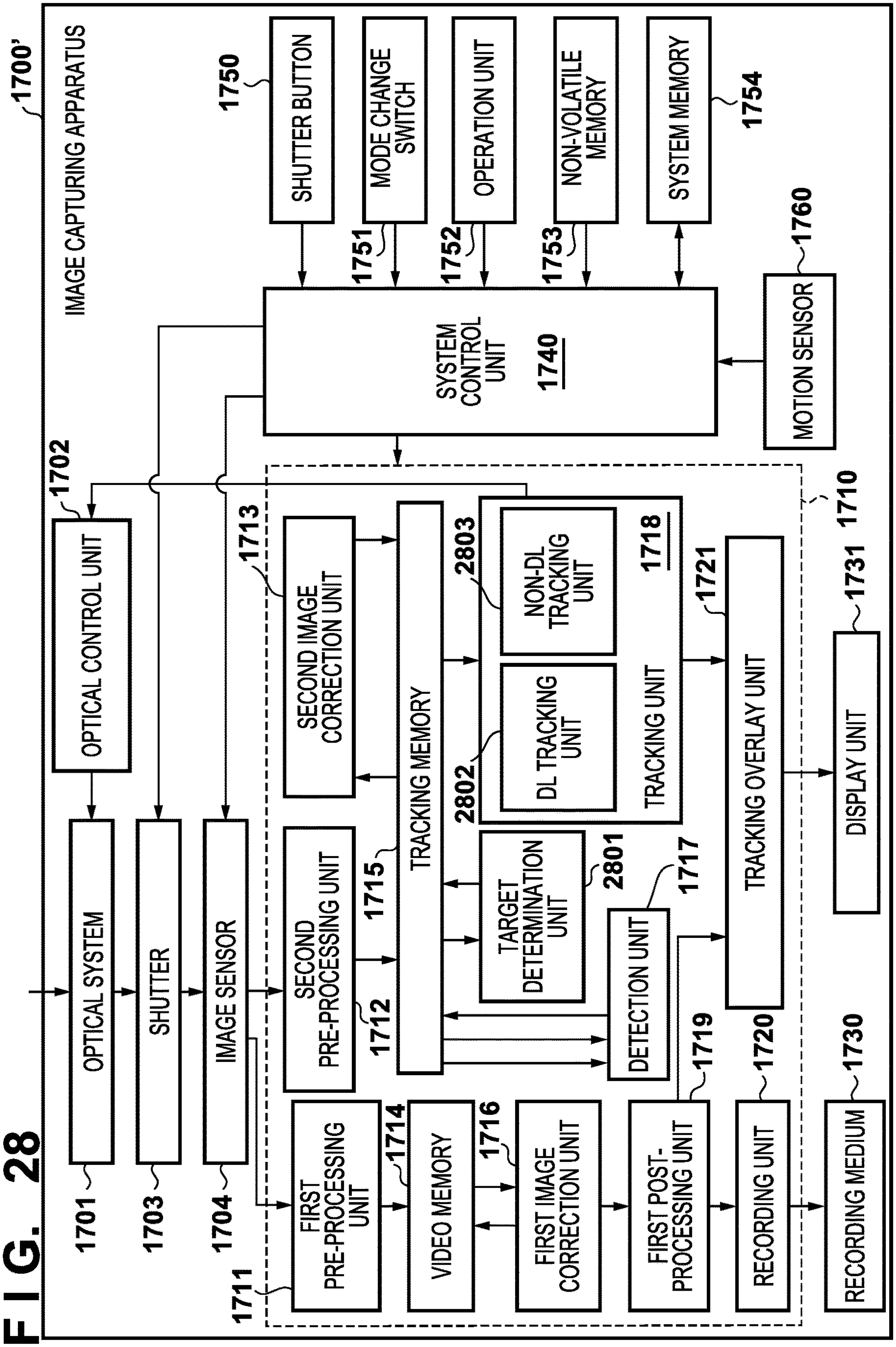
FIG. 28 is a block diagram illustrating an example of the functional configuration of an image capturing apparatus according to ninth to eighteenth embodiments.

A ninth embodiment of the present invention will be described next. FIG. 28 is a block diagram illustrating an example of the functional configuration of an image capturing apparatus 1700' serving as an example of an image processing apparatus according to the ninth embodiment. Configurations that are the same as in the image capturing apparatus 1700 described with reference to FIG. 17 are given the same reference numerals, and redundant descriptions thereof will not be given. Note that the detection unit 1717 of the present embodiment may be either the DL detection unit 1722 or the non-DL detection unit 1723. This is assumed to be the same as the non-DL detection unit 1723 here.

The image capturing apparatus 1700' of the present embodiment includes a target determination unit 2801 having a new configuration, and similar to the first embodiment, the tracking unit 1718 includes a DL tracking unit 2802 and a non-DL tracking unit 2803.

Similar to the target determination unit 111 of the first embodiment, the target determination unit 2801 determines the subject region to be tracked (a main subject region) from the candidate regions detected by the detection unit 1717. If one candidate region is detected, the target determination unit 2801 determines the detected candidate region as the main subject region. If a plurality of candidate regions are detected, the target determination unit 2801 can determine the main subject region based on a predetermined priority order.

The target determination unit 2801 can determine the main subject region based on, for example, a priority order based on the sizes of the candidate regions, a priority order based on distances from the focus detection region, or the like. Specifically, the largest candidate region may be taken as the main subject region, or the candidate region closest to the focus detection region may be taken as the main subject region. Additionally, the main subject region may be determined taking into account a plurality of priority orders, e.g., taking the largest candidate region among the candidate regions having distances from the focus detection region that are less than a threshold as the main subject region. Priority orders aside from those given as examples here may be taken into account as well.

The tracking unit 1718 estimates the subject region to be tracked from the image data of the target frame (the current frame) stored in the tracking memory 1715, and obtains the position and size of the estimated subject region within the frame as a tracking result. For example, the tracking unit 115 can estimate the position and size, in the current frame, of the main subject region determined by the target determination unit 2801 for a past frame shot before the current frame (e.g., one frame previous). The tracking unit 115 outputs the tracking result to the information overlay unit 1721.

The tracking unit 1718 includes the DL tracking unit 2802, which performs subject tracking using deep learning (DL), and the non-DL tracking unit 2803, which performs subject tracking without using DL. The configurations of the DL tracking unit 2802 and the non-DL tracking unit 2803 may be the same as those of the DL tracking unit 116 and the non-DL tracking unit 117, respectively, described in the first embodiment, and will therefore not be described in detail. In the present embodiment, the system control unit 1740 controls whether to activate or deactivate the DL tracking unit 2802 and the non-DL tracking unit 2803, as well as the operational frequencies thereof when active.

In the present embodiment too, the DL tracking unit 2802 outputs the estimated position and size of the main subject region, as well as the confidence level score, as the tracking result. The non-DL tracking unit 2803 outputs the estimated position and size of the main subject region, as well as the similarity score output, as the tracking result.

The tracking unit 1718 adopts the tracking result from the DL tracking unit 2802 or the non-DL tracking unit 2803 based on the confidence level score output by the DL tracking unit 2802 and the similarity score output by the non-DL tracking unit 2803. For example, the tracking unit 1718 adopts the tracking result from the non-DL tracking unit 2803 if the confidence level score is no greater than a predetermined confidence level score threshold and the similarity score is no greater than a predetermined similarity score threshold. The tracking unit 1718 adopts the tracking result from the DL tracking unit 2802 in other cases. The tracking unit 1718 outputs the adopted tracking result to the information overlay unit 1721 and the system control unit 1740.

Here, which of the tracking result from the DL tracking unit 2802 and the tracking result from the non-DL tracking unit 2803 to adopt is determined based on the confidence level score and the similarity score. However, this determination may be made through another method. For example, using the fact that the accuracy of the DL tracking unit 2802 tends to be higher than the accuracy of the non-DL tracking unit 2803, the tracking result from the DL tracking unit 2802 may be adopted preferentially. Specifically, if a tracking result from the DL tracking unit 2802 is obtained, the tracking result from the DL tracking unit 2802 may be adopted, and if not, the tracking result from the non-DL tracking unit 2803 may be adopted.

Control operation of the DL tracking unit 2802 and the non-DL tracking unit 2803, performed by the system control unit 1740 in the present embodiment, will be described next. In the present embodiment, the system control unit 1740 controls whether to activate the DL tracking unit 2802 or the non-DL tracking unit 2803 according to the AF mode set in the image capturing apparatus 1700'.

Here, the image capturing apparatus 1700' is assumed to have a single AF mode and a continuous AF mode, similar to the fourth embodiment. The single AF mode is likely to be used to shoot subjects which are still or move little, such as landscapes or portraits. On the other hand, the continuous AF mode is likely to be used to shoot moving subjects such as vehicles or sports scenes.

In the case of the single AF mode, the subject is likely to be still or moving little. Accordingly, the non-DL tracking unit is activated instead of the DL tracking unit. On the other hand, in the case of the continuous AF mode, the subject is likely to be in motion or is moving significantly. Accordingly, the DL tracking unit is activated instead of the non-DL tracking unit. Such control makes it possible to suppress power consumption while suppressing a drop in the tracking accuracy.

FIG. 29 is a flowchart pertaining to operation by the system control unit 1740 according to the present embodiment.

S2900 is image obtainment processing similar to the processing described in the third embodiment with reference to FIG. 21.

In S2901, the system control unit 1740 instructs the detection unit 1717 to detect candidate regions. The detection unit 1717 applies subject region detection processing to an image of a single frame and stores the detection result in the tracking memory 1715. The detection result includes the total number of detected candidate regions, and the position within the image and the size of each candidate region.

In S2902, the system control unit 1740 instructs the target determination unit 2801 to determine the subject region to be tracked (the main subject region) from among the candidate regions. The target determination unit 2801 reads out the information on the candidate regions stored in the tracking memory 1715, and when a plurality of candidate regions have been detected, determines the main subject region based on a priority order as described above. The target determination unit 2801 stores information identifying the main subject region in the tracking memory 1715.

In S2903, the system control unit 1740 determines whether the AF mode currently set in the image capturing apparatus 1700' is the continuous AF mode. The system control unit 1740 executes S2904 if the AF mode currently set is determined to be the continuous AF mode, and executes S2905 if the AF mode currently set is not determined to be the continuous AF mode.

In S2904, the system control unit 1740 activates the DL tracking unit 2802 and deactivates the non-DL tracking unit 2803. As a result, the DL tracking unit 2802 executes tracking processing on the current frame.

Meanwhile, in S2905, the system control unit 1740 activates the non-DL tracking unit 2803 and deactivates the DL tracking unit 2802. As a result, the non-DL tracking unit 2803 executes tracking processing on the current frame.

Note that the main subject region used in the tracking processing in S2904 and S2905 is the main subject region determined most recently for a frame in the past relative to the current frame.

In S2906, the system control unit 1740 updates the information on the main subject region, stored in the tracking memory 1715, using the result of the tracking processing performed in S2904 or S2905. The result of the tracking processing is also output to the information overlay unit 1721.

In S2907, the system control unit 1740 deactivates the DL tracking unit 2802 and the non-DL tracking unit 2803.

In S2908, the system control unit 1740 instructs the information overlay unit 1721 to overlay and display a tracking frame based on the tracking result onto a display image of the current frame. The information overlay unit 1721 generates an image of a tracking frame having a position and size based on the tracking result, and generates composite image data in which this is composited with the display image data of the current frame. The information overlay unit 1721 outputs the composite image data to a display unit 1731.

This completes one frame's worth of operation in the live-view display. In the present embodiment, in an image capturing apparatus which uses a first tracking unit and a second tracking unit having a higher processing accuracy but a greater operational load than the first tracking unit, whether to activate or deactivate the first and/or second tracking unit is controlled in accordance with the AF mode. Accordingly, power consumption can be suppressed while suppressing a drop in tracking accuracy by deactivating a tracking unit from which a good tracking result is unlikely to be obtained, deactivating the other tracking unit when a good tracking result is likely to be obtained from only one of the processing units, and the like.

Tenth Embodiment

A tenth embodiment of the present invention will be described next. In the present embodiment, the DL tracking unit 2802 and the non-DL tracking unit 2803 are controlled to be activated and deactivated according to the framerate of the moving image to which tracking processing is applied. The present embodiment can be implemented using an image capturing apparatus 1700' similar to that in the ninth embodiment, and will therefore be described using the constituent elements illustrated in FIG. 28.

The amount of variation in the position and size of a subject region between frames drops as the framerate increases. As such, the tracking processing by the non-DL tracking unit 2803 is considered to be sufficiently accurate when the framerate is high. The DL tracking unit 2802 is unlikely to be necessary in this case. However, using the DL tracking unit 2802 at a certain frequency makes it possible to more reliably maintain the accuracy of the tracking processing.

Therefore, the frequency with which the DL tracking unit 2802 is activated is reduced when the framerate of the moving image to which the tracking processing is applied is higher than a predetermined first threshold (fps), compared to when the framerate is no greater than the first threshold. This makes it possible to reduce power consumption while suppressing a drop in detection accuracy. Note that the first threshold can be determined experimentally, for example. Additionally, a plurality of thresholds may be provided, and the frequency with which the DL tracking unit 2802 is activated may be controlled over three or more steps.

Figure 30:
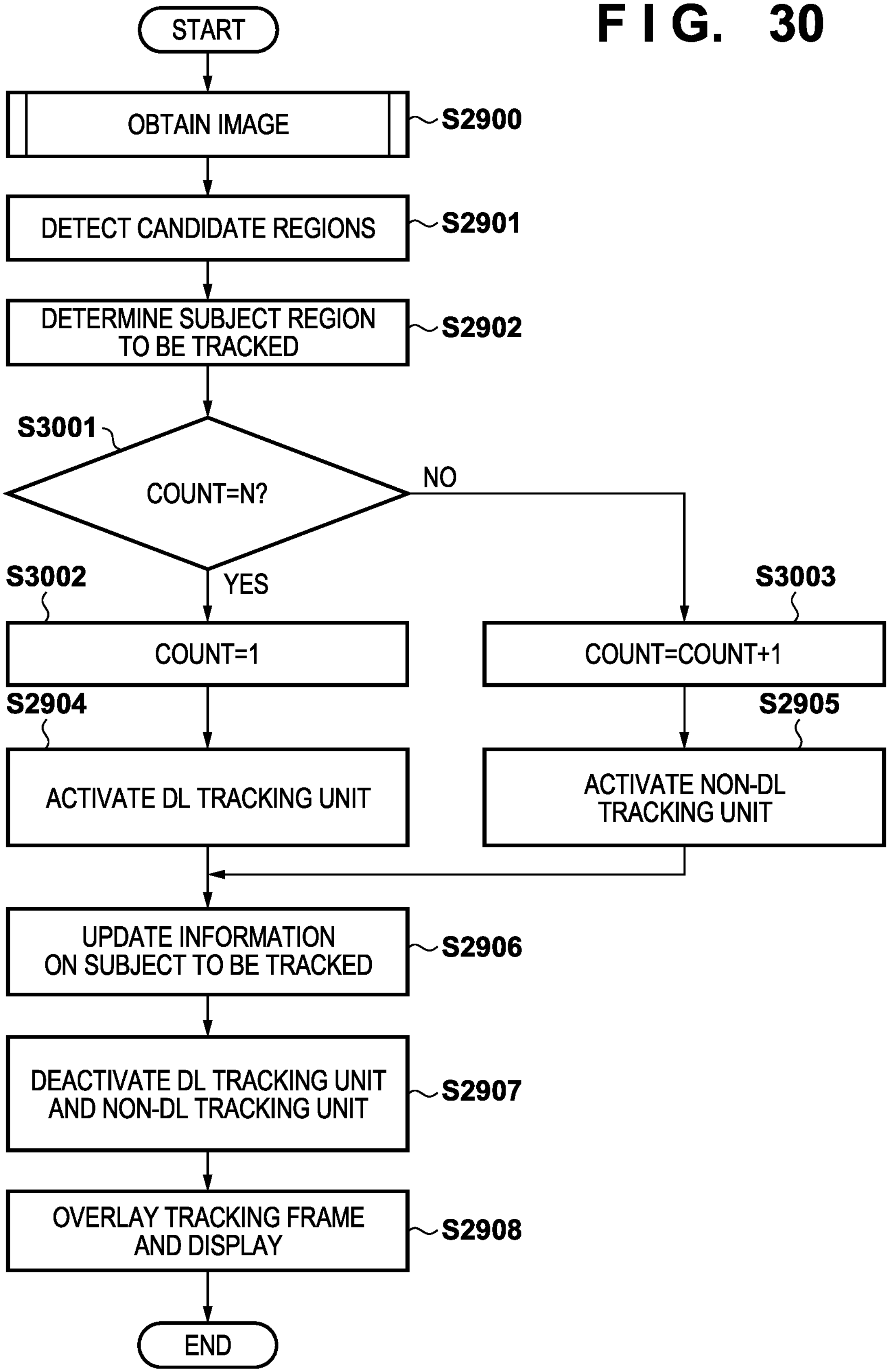
FIG. 30 is a flowchart pertaining to operation by a system control unit according to the tenth embodiment.

Operation of the system control unit 1740 in the present embodiment will be described hereinafter with reference to the flowchart in FIG. 30. It is assumed here that the framerate of the moving image to which the tracking processing is applied has already been determined to be higher than the predetermined first threshold (fps). Additionally, in FIG. 30, steps that perform processing identical to that in the ninth embodiment are given the same reference numerals as in FIG. 29, and will not be described. The processing from S2900 to S2902 is the same as that described in the ninth embodiment.

In S3001, the system control unit 1740 determines whether the value of a variable COUNT, which is used as a counter for a number of frames, is a predetermined N (an integer of at least 2). Assuming the DL tracking unit 2802 is activated every M frames when the framerate of the moving image to which the tracking processing is applied is no greater than the first threshold (fps), the value of N can be determined so as to satisfy the relationship N>M. Here, assume that M=1 and N=10. The system control unit 1740 executes S3002 if the value of the variable COUNT is determined to be N, and executes S3003 if not.

N=10, and thus S3002 is executed once every 10 frames. In S3002, the system control unit 1740 resets the value of the variable COUNT to 1. Then, in S2904, the system control unit 1740 activates the DL tracking unit 2802. The non-DL tracking unit 2803 can be deactivated to suppress power consumption, but may be activated as well.

On the other hand, in S3003, the system control unit 1740 adds 1 to the value of the variable COUNT. Then, in S2905, the system control unit 1740 activates the non-DL tracking unit 2803 and deactivates the DL tracking unit 2802. The subsequent processing is the same as in the ninth embodiment, and will therefore not be described here.

This completes one frame's worth of operation in the live-view display. Through the above-described processing, when the framerate of the moving image to which the tracking processing is applied is high, the DL tracking unit 2802 is active for one out of every 10 frames, and is inactive for the remaining nine frames. The non-DL tracking unit 2803 is activated in frames for which the DL tracking unit 2802 is inactive.

In the present embodiment, the frequency with which the second tracking unit, which has a higher accuracy but a greater operational load than the first tracking unit, is used is controlled in accordance with the framerate of the moving image to which the tracking processing is applied. Specifically, the frequency with which the second tracking unit is activated is reduced when the framerate of the moving image to which the tracking processing is applied is high, compared to when the framerate is not high. When the subject moves little, accurate tracking processing can be performed by the first tracking unit, and thus reducing the frequency of using the second tracking unit makes it possible to suppress power consumption while suppressing a drop in the detection accuracy.

Eleventh Embodiment

An eleventh embodiment of the present invention will be described next. In the present embodiment, the DL tracking unit and the non-DL tracking unit are controlled to be activated or deactivated according to the shutter speed of the image capturing apparatus. The present embodiment can be implemented using an image capturing apparatus 1700' similar to that in the ninth embodiment, and will therefore be described using the constituent elements illustrated in FIG. 28.

Similar to when the framerate is high, the amount of variation in the position and size of a subject region between frames drops as the shutter speed increases when shooting a moving image. It is therefore likely that sufficiently-accurate tracking processing can be achieved with the non-DL tracking unit 2803. Accordingly, the DL tracking unit 2802 is deactivated when the shutter speed is fast.

Figure 31:
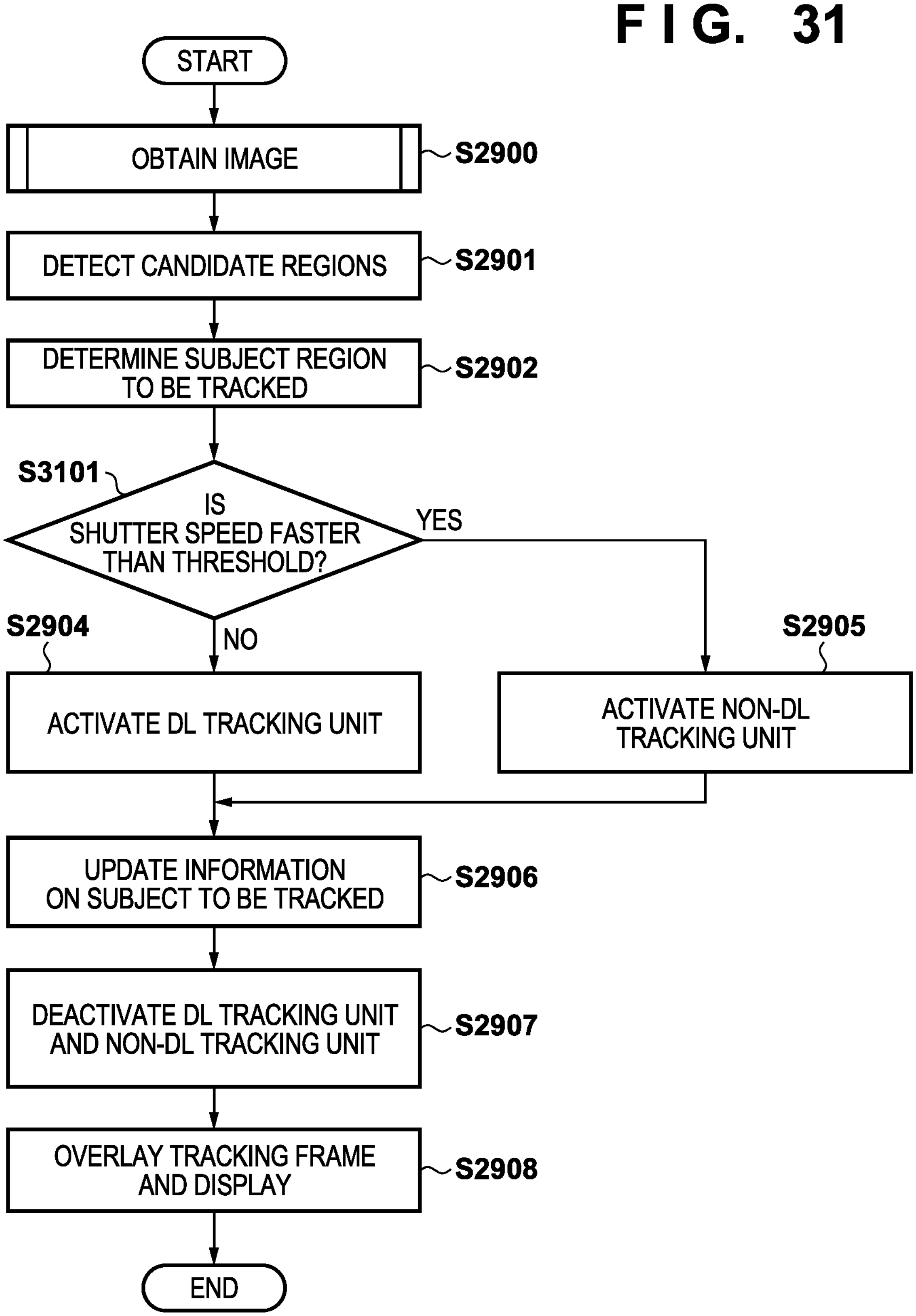
FIG. 31 is a flowchart pertaining to operation by a system control unit according to the eleventh embodiment.

Operation of the system control unit 1740 in the present embodiment will be described hereinafter with reference to the flowchart in FIG. 31. In FIG. 31, steps that perform processing identical to that in the ninth embodiment are given the same reference numerals as in FIG. 19, and will not be described. The processing from S2900 to S2902 is the same as that described in the ninth embodiment.

In S3101, the system control unit 1740 determines whether the shutter speed currently set is faster than a threshold. The threshold used here can be determined experimentally, for example, according to the performance of the non-DL tracking unit 2803 or the like.

If the shutter speed is determined to be faster than the threshold, in S2904, the system control unit 1740 activates the DL tracking unit 2802. The non-DL tracking unit 2803 can be deactivated to suppress power consumption, but may be activated as well.

On the other hand, if the shutter speed is not determined to be faster than the threshold, in S2905, the system control unit 1740 activates the non-DL tracking unit 2803 and deactivates the DL tracking unit 2802. The subsequent processing is the same as in the third embodiment, and will therefore not be described here.

In the present embodiment, whether to use a first tracking unit, or a second tracking unit having a higher processing accuracy but a greater operational load than the first tracking unit, is determined according to the shutter speed of the image capturing apparatus. Specifically, the second tracking unit is used when the shutter speed is not fast (is slow), and is not used when the shutter speed is fast. When the shutter speed is fast, there is little change in the position, size, and so on of the subject region between frames. Accurate tracking processing can therefore be achieved by the first tracking unit, and the second tracking unit is deactivated. This makes it possible to suppress power consumption while suppressing a drop in the tracking accuracy.

Twelfth Embodiment

A twelfth embodiment of the present invention will be described next. In the present embodiment, the DL tracking unit and the non-DL tracking unit are controlled to be activated or deactivated in response to a user instruction. The present embodiment can be implemented using an image capturing apparatus 1700' similar to that in the ninth embodiment, and will therefore be described using the constituent elements illustrated in FIG. 28.

In the present embodiment, the DL tracking unit 2802 is activated only when the user activates DL tracking processing. Any user instruction may be used to activate the DL tracking processing. It is not necessary for the user to consciously instruct the DL tracking processing, and any instruction which effectively activates the DL tracking processing may be used.

Figure 39:
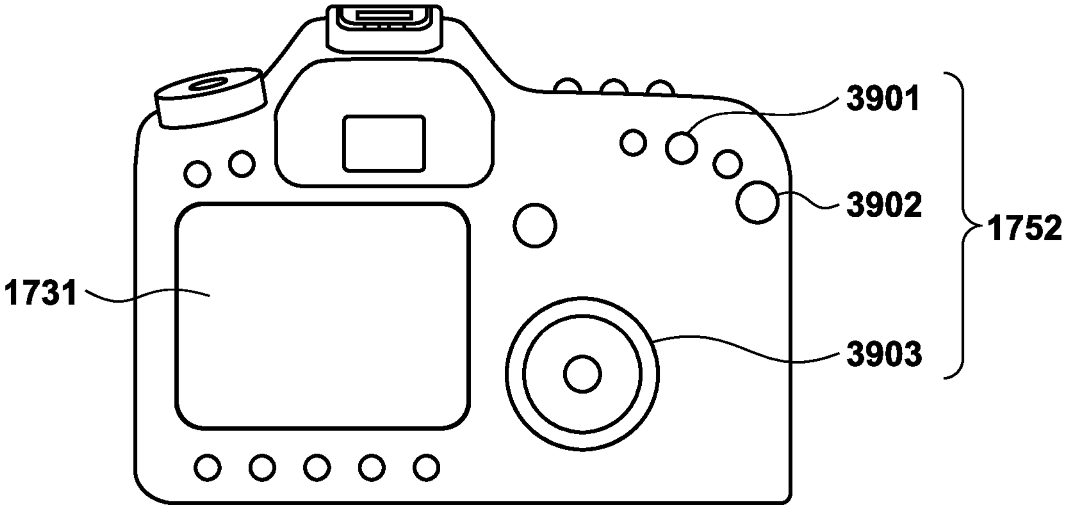
FIG. 39 is a diagram illustrating an example of the appearance of a rear face of the image capturing apparatus in the twelfth embodiment.

Here, as one example, it is assumed that an input device to which is assigned a function for switching the DL tracking processing between active and inactive (a DL tracking button) is provided in the operation unit 1752. FIG. 39 is a diagram illustrating an example of the external appearance of a rear face of the image capturing apparatus 1700'. Here, the display unit 1731 is assumed to be provided on the rear face of the image capturing apparatus 1700'. Some input devices 3901 to 3903 constituting the operation unit 1752 are provided on the rear face of the image capturing apparatus 1700'. The input device 3903, which enables directional inputs and confirmation inputs, functions as a directional key and an OK button. The input device 3901 or 3902 can be used as the DL tracking button.

The system control unit 1740 switches the DL tracking between active and inactive each time the DL tracking button is pressed. Alternatively, the system control unit 1740 may activate the DL tracking only while the DL tracking button is being pressed. The DL tracking button may also be a software key which uses the display unit 1731.

Operation of the system control unit 1740 in the present embodiment will be described hereinafter with reference to the flowchart in FIG. 32. In FIG. 32, steps that perform processing identical to that in the ninth embodiment are given the same reference numerals as in FIG. 29, and will not be described. The processing from S2900 to S2902 is the same as that described in the ninth embodiment.

In S3201, the system control unit 1740 determines whether the DL tracking button is on. Here, the DL tracking button is determined to be on when the button is being pressed. If the DL tracking button is determined to be on, in S2904, the system control unit 1740 activates the DL tracking unit 2802. The non-DL tracking unit 2803 can be deactivated to suppress power consumption, but may be activated as well. On the other hand, if the DL tracking button is not determined to be on, in S2905, the system control unit 1740 activates the non-DL tracking unit 2803 and deactivates the DL tracking unit 2802. The subsequent processing is the same as in the ninth embodiment, and will therefore not be described here.

In the present embodiment, of the tracking units that track the subject region to be tracked, whether to activate or deactivate the second subject tracking unit, which has a higher accuracy but a greater operational load than the first tracking unit, is controlled in response to a user instruction. Specifically, the second tracking unit is activated only when a user instruction to activate the second tracking unit is detected. As a result, the second tracking unit is deactivated when not needed by the user, which makes it possible to suppress power consumption.

Thirteenth Embodiment

A thirteenth embodiment of the present invention will be described next. In the present embodiment, the DL tracking unit and the non-DL tracking unit are controlled to be activated or deactivated according to an operation situation of the apparatus. The present embodiment can be implemented using an image capturing apparatus 1700' similar to that in the ninth embodiment, and will therefore be described using the constituent elements illustrated in FIG. 28.

Specifically, the DL tracking unit 2802 is deactivated when it is determined that a pan, tilt, or zoom operation, which are operation for changing the image capturing range, is being performed. This is because when such operation is being performed, the user may be making an adjustment to bring the main subject into the image capturing range. As such, even if the DL tracking unit 2802 is activated during these operation, it may not be possible to obtain a meaningful detection result. In the present embodiment, the DL tracking unit 2802 can be activated only when it is determined that a pan, tilt, or zoom operation is not being performed in the image capturing apparatus 1700.

Operation of the system control unit 1740 in the present embodiment will be described hereinafter with reference to the flowchart in FIG. 33. In FIG. 33, steps that perform processing identical to that in the ninth embodiment are given the same reference numerals as in FIG. 29, and will not be described. The processing from S2900 to S2902 is the same as that described in the ninth embodiment.

In S3301, the system control unit 1740 determines whether a pan, tilt, or zoom operation is being performed in the image capturing apparatus 1700. The system control unit 1740 can detect a pan, tilt, or zoom operation by detecting a change in motion vectors, a change in the sizes of feature regions, or the like between frames of a moving image being shot for live-view display, or from the output of the motion sensor 1760, for example. Zoom operation can also be detected from the zoom button of the operation unit 1752 being operated.

If it is determined that pan, tilt, or zoom operation is being performed, the system control unit 1740 executes S2908. On the other hand, if it is not determined that pan, tilt, or zoom operation is being performed, the system control unit 1740 executes S3302.

In S3302, the system control unit 1740 activates the DL tracking unit 2802 or the non-DL tracking unit 2803. When the DL tracking unit 2802 is active, the non-DL detection unit 1723 can be deactivated to suppress power consumption, but may be activated as well. At least one of the conditions described in the ninth to twelfth embodiments, for example, can be used as the conditions for activating the DL tracking unit 2802. If the condition for activating the DL tracking unit 2802 is not satisfied, the system control unit 1740 deactivates the DL tracking unit 2802 and activates the non-DL tracking unit 2803. The processing from S2906 on is the same as in the ninth embodiment, and will therefore not be described here.

In the present embodiment, of the tracking units that track the subject region to be tracked, the second tracking unit, which has a higher accuracy but a greater operational load than the first tracking unit, can be activated only when operation for changing the image capturing range is not being performed. Ensuring that the second tracking unit is not activated in a state where the image capturing range is not finalized makes it possible to efficiently suppress power consumption.

Fourteenth Embodiment

A fourteenth embodiment of the present invention will be described next. In the present embodiment, the DL tracking unit and the non-DL tracking unit are controlled to be activated or deactivated according to the shooting mode of the image capturing apparatus 1700'. The present embodiment can be implemented using an image capturing apparatus 1700' similar to that in the ninth embodiment, and will therefore be described using the constituent elements illustrated in FIG. 28.

The image capturing apparatus 1700' has a plurality of shooting modes, including the still image shooting mode and the moving image shooting mode. Note that shooting modes may be provided for shooting scenes, special effects to be applied, and so on, such as a night scene mode, a sports mode, a filter mode, and the like. Here, a shooting mode that will ultimately shoot a still image will be treated as a still image shooting mode, and a shooting mode that shoots a moving image will be treated as a moving image shooting mode.

Figure 34:
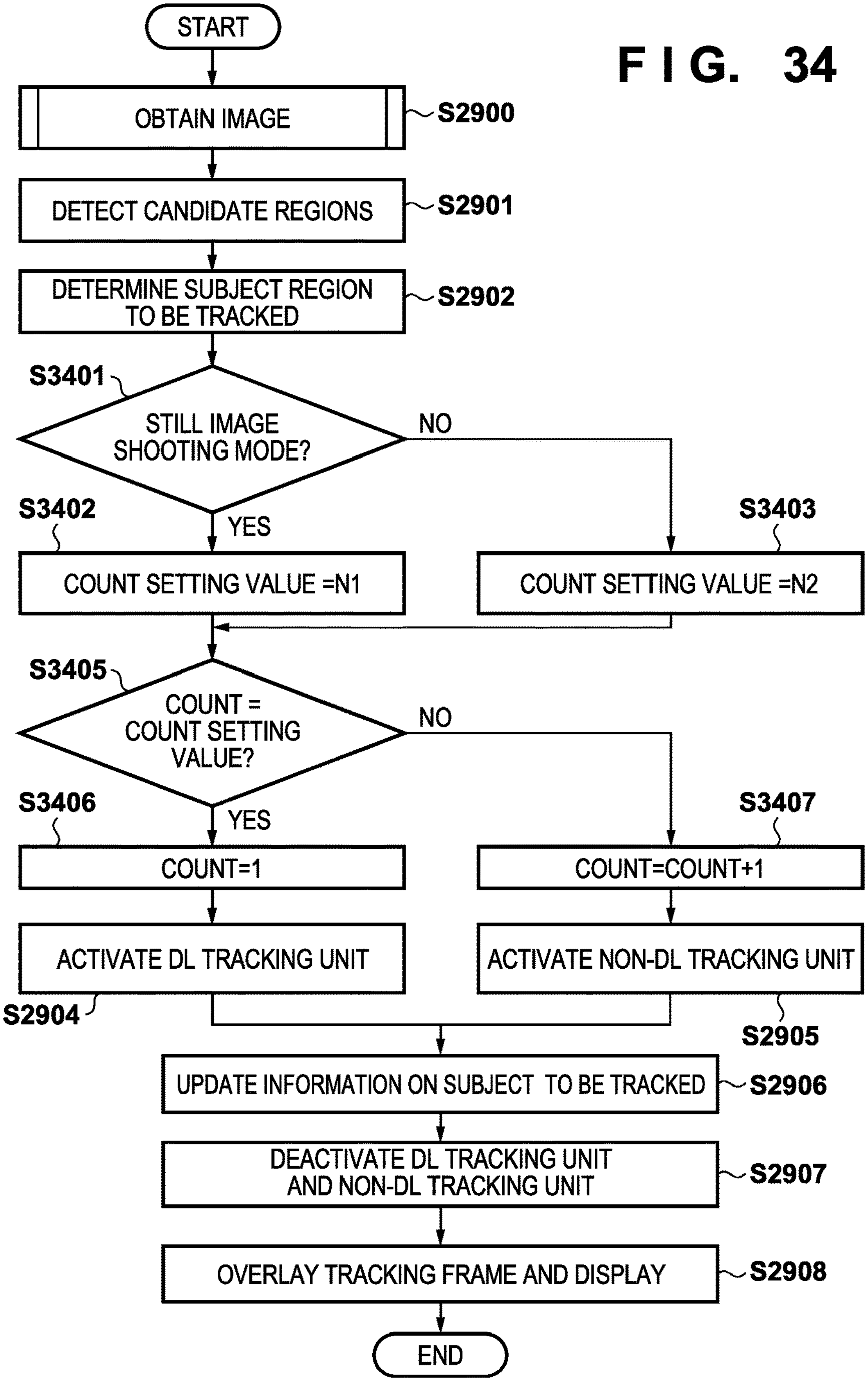
FIG. 34 is a flowchart pertaining to operation by a system control unit according to the fourteenth embodiment.

Operation of the system control unit 1740 in the present embodiment will be described hereinafter with reference to the flowchart in FIG. 34. In FIG. 34, steps that perform processing identical to that in the ninth embodiment are given the same reference numerals as in FIG. 29, and will not be described. The processing from S2900 to S2902 is the same as that described in the ninth embodiment.

In S3401, the system control unit 1740 determines whether the shooting mode of the image capturing apparatus 1700' is the still image shooting mode based on the state of the mode change switch 1751, for example. The system control unit 1740 executes S3402 if the shooting mode of the image capturing apparatus 1700' is determined to be the still image shooting mode. On the other hand, the system control unit 1740 executes S3403 if the shooting mode of the image capturing apparatus 1700' is not determined to be the still image shooting mode.

In S3402, the system control unit 1740 executes S3405, taking a count setting value as a first value (N1). N1 is an integer of 1 or more.

In S3403, the system control unit 1740 executes S3405, taking the count setting value as a second value (N2). N2 is an integer of 1 or more.

In S3405, the system control unit 1740 determines whether the value of the variable COUNT, which is used as a counter for the number of frames, is a count setting value (N1 or N2). The system control unit 1740 executes S3406 if the value of the variable COUNT is determined to be a count setting value, and executes S3407 if not.

In S3406, the system control unit 1740 resets the value of the variable COUNT to 1. Then, in S2904, the system control unit 1740 activates the DL tracking unit 2802. The non-DL tracking unit 2803 can be deactivated to suppress power consumption, but may be activated as well.

On the other hand, in S3407, the system control unit 1740 adds 1 to the value of the variable COUNT. Then, in S2905, the system control unit 1740 activates the non-DL tracking unit 2803 and deactivates the DL tracking unit 2802.

S2904 is executed each time the variable COUNT becomes N1 or N2. In other words, the DL tracking unit 2802 is activated once every N1 frames in the still image shooting mode and once every N2 frames in the moving image shooting mode, and the DL tracking unit 2802 is deactivated for the remaining frames.

The first value and the second value control the frequency with which the DL tracking unit 2802 is activated, according to the shooting mode. The first value and the second value are stored in advance in the non-volatile memory 1753, for example. Note that the first value and the second value can be determined taking into account the shutter speed, the framerate, or the like as well.

For example, assume the framerate of the moving image to which the tracking processing is applied is higher in the moving image shooting mode than in the still image shooting mode. In this case, reducing the frequency with which the DL tracking unit 2802 is activated in the moving image shooting mode compared to the still image shooting mode makes it possible to suppress power consumption while suppressing a drop in the tracking accuracy. Note that this is merely an example, and the DL tracking unit 2802 can be activated with a frequency suited to the shooting mode by controlling the frequency with which the DL tracking unit 2802 is activated independently for each shooting mode.

In the present embodiment, of the tracking units that track the subject region to be tracked, the frequency with which the second tracking unit, which has a higher accuracy but a greater operational load than the first tracking unit, is activated is controlled according to the shooting mode. Setting an appropriate count setting value according to the shooting mode makes it possible to reduce the power consumption while suppressing a drop in tracking performance.

Fifteenth Embodiment

A fifteenth embodiment of the present invention will be described next. In the present embodiment, the DL tracking unit and the non-DL tracking unit are controlled to be activated or deactivated according to the state of a pressing state of the release button. The present embodiment can be implemented using an image capturing apparatus 1700' similar to that in the ninth embodiment, and will therefore be described using the constituent elements illustrated in FIG. 28.

The release button 1750 includes the switch SW1, which turns on when half-pressed, and the switch SW2, which turns on when fully pressed, and thus has a state in which both switches are off, a state in which only the switch SW1 is on, and a state in which both the switches SW1 and SW2 are on. The system control unit 1740 recognizes SW1 turning on as a still image shooting preparation instruction, and SW2 turning on as a still image shooting start instruction.

In the present embodiment, if the release button 1750 is not in a half-pressed or fully-pressed state, the state is a shooting standby state, and thus the DL tracking unit 2802 is deactivated to suppress power consumption. In this manner, in the present embodiment, the DL tracking unit 2802 can be activated only when a shooting preparation instruction or a shooting start instruction is being input to the image capturing apparatus 1700'.

Operation of the system control unit 1740 in the present embodiment will be described hereinafter with reference to the flowchart in FIG. 35. In FIG. 35, steps that perform processing identical to that in the ninth embodiment are given the same reference numerals as in FIG. 29, and will not be described. The processing from S2900 to S2902 is the same as that described in the ninth embodiment.

In S3501, the system control unit 1740 determines whether the release button 1750 is in a half-pressed or fully-pressed state. For example, if the switch SW1 is on, the system control unit 1740 can determine that the release button 1750 is in a half-pressed or fully-pressed state. When the switch SW2 is on, the switch SW1 is on as well, and it is therefore not necessary to detect the state of the switch SW2.

The system control unit 1740 executes S3502 if the release button 1750 is determined to be in a half-pressed or fully-pressed state.

On the other hand, the system control unit 1740 executes S2908 if the release button 1750 is not determined to be in a half-pressed or fully-pressed state. In this case, the state is the shooting standby state, and thus the tracking processing is not performed on the target frame (or may be performed by the non-DL tracking unit 2803).

In S3502, the system control unit 1740 activates the DL tracking unit 2802 or the non-DL tracking unit 2803. When the DL tracking unit 2802 is active, the non-DL tracking unit 2803 can be deactivated to suppress power consumption, but may be activated as well. At least one of the conditions described in the ninth to fourteenth embodiments, for example, can be used as the conditions for activating the DL tracking unit 2802. If the condition for activating the DL tracking unit 2802 is not satisfied, the system control unit 1740 deactivates the DL tracking unit 2802 and activates the non-DL tracking unit 2803. The conditions for activating the DL tracking unit 2802 may be different depending on whether the release button is in a half-pressed state or a fully-pressed state. The processing from S2906 on is the same as in the ninth embodiment, and will therefore not be described here.

In the present embodiment, of the tracking units that track the subject region to be tracked, the second tracking unit, which has a higher accuracy but a greater operational load than the first tracking unit, can be activated only when a shooting preparation instruction or a shooting start instruction is being input. As a result, the second tracking unit is not activated in a shooting standby state, in which neither the shooting preparation instruction nor the shooting start instruction is being input, which makes it possible to efficiently suppress power consumption. Furthermore, ensuring that the first tracking unit is also not activated in the shooting standby state makes it possible to suppress power consumption even more.

Sixteenth Embodiment

A sixteenth embodiment of the present invention will be described next. In the present embodiment, the DL tracking unit and the non-DL tracking unit are controlled to be activated or deactivated according to a tracking mode of the image capturing apparatus 1700'. The present embodiment can be implemented using an image capturing apparatus 1700' similar to that in the ninth embodiment, and will therefore be described using the constituent elements illustrated in FIG. 28.

"Tracking mode" is a mode in which focus control is performed continuously such that the main subject is in focus even if the main subject moves from the center of the image capturing range, and is applied when shooting a subject that is continually moving within the image capturing range, a subject whose movement is difficult to predict, such as a small animal, and the like. The tracking mode may be set using the mode change switch 1751, or may be set through operation of one of the input devices included in the operation unit 1752. Note that the subject focused on in the tracking mode may be a subject corresponding to the main subject region determined by the target determination unit 2801. In addition to being explicitly set, the tracking mode may be set indirectly along with a specific function being set.

When the tracking mode is set, the subject being focused on is considered to be likely to move, and thus the DL tracking unit 2802 is activated. On the other hand, when the tracking mode is not set, the subject being focused on is considered to be unlikely to move, and thus the DL tracking unit 2802 is deactivated and the non-DL tracking unit 2803 is activated.

Figure 36:
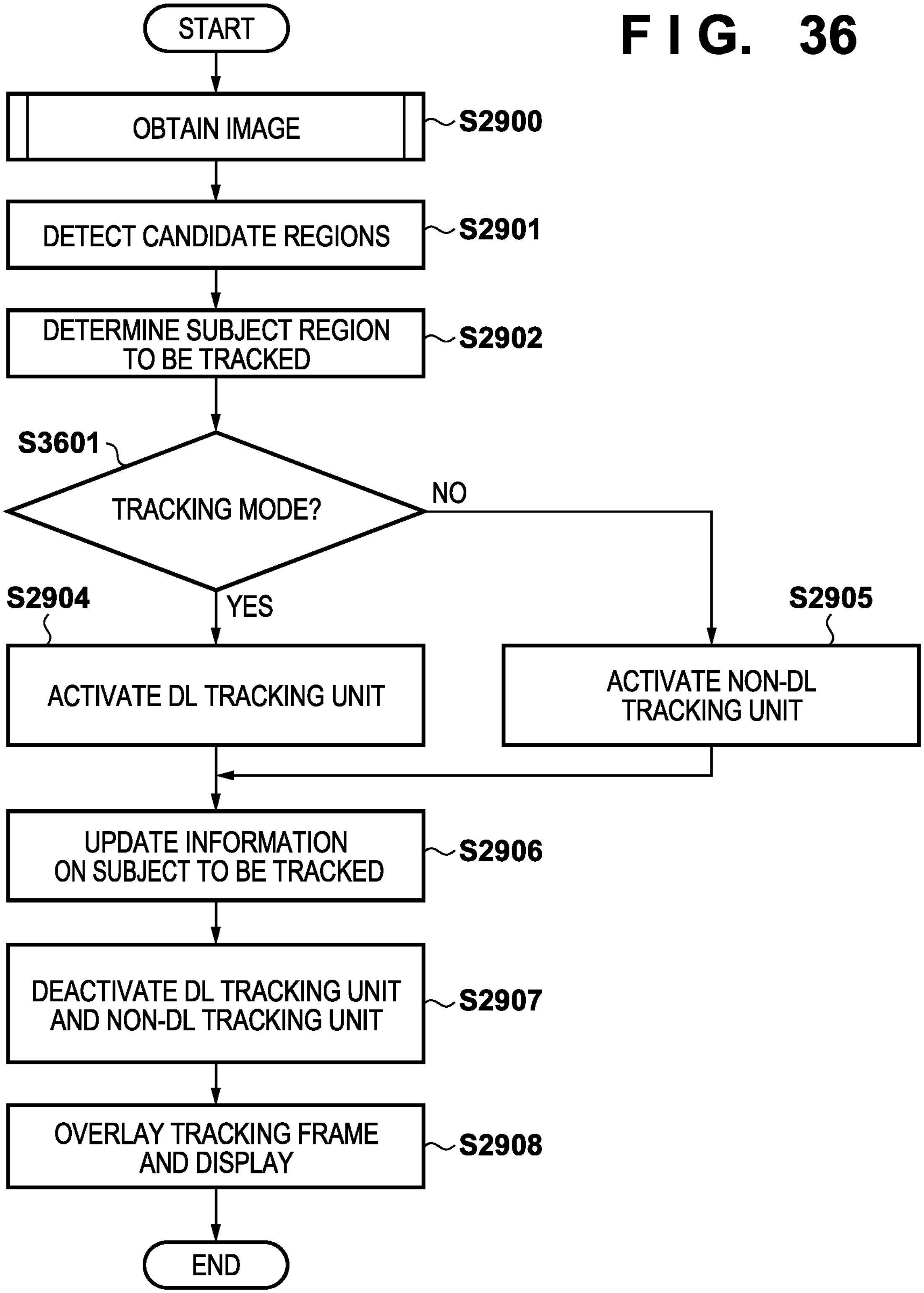
FIG. 36 is a flowchart pertaining to operation by a system control unit according to the sixteenth embodiment.

Operation of the system control unit 1740 in the present embodiment will be described hereinafter with reference to the flowchart in FIG. 36. In FIG. 36, steps that perform processing identical to that in the ninth embodiment are given the same reference numerals as in FIG. 29, and will not be described. The processing from S2900 to S2902 is the same as that described in the ninth embodiment.

In S3601, the system control unit 1740 determines whether the tracking mode is set in the image capturing apparatus 1700'. The system control unit 1740 can determine whether the tracking mode is set from the state of the mode change switch 1751, for example.

The system control unit 1740 executes S2904 if the tracking mode is determined to be set, and executes S2905 if the tracking mode is not determined to be set.

In S2904, the system control unit 1740 activates the DL tracking unit 2802 and deactivates the non-DL tracking unit 2803. As a result, the DL tracking unit 2802 executes tracking processing on the current frame.

Meanwhile, in S2905, the system control unit 1740 activates the non-DL tracking unit 2803 and deactivates the DL tracking unit 2802. As a result, the non-DL tracking unit 2803 executes tracking processing on the current frame.

The processing from S2906 on is the same as in the ninth embodiment, and will therefore not be described here.

In the present embodiment, of the tracking units which track the subject region to be tracked, the second tracking unit, which has a higher accuracy but a greater operational load than the first tracking unit, is activated when the tracking mode is set, and is deactivated when the tracking mode is not set. Deactivating the second tracking unit when the second tracking unit is considered to be of low necessity makes it possible to suppress power consumption while suppressing a drop in the tracking accuracy.

Seventeenth Embodiment

A seventeenth embodiment of the present invention will be described next. In the present embodiment, the DL tracking unit and the non-DL tracking unit are controlled to be activated and deactivated according to whether or not the main subject to be tracked is a subject which is easy to track. The present embodiment can be implemented using an image capturing apparatus 1700' similar to that in the ninth embodiment, and will therefore be described using the constituent elements illustrated in FIG. 28.

Similar to the detection unit 110 in the first embodiment, the detection unit 1717 of the present embodiment is assumed to associate an object class indicating the type of the subject, as well as a confidence level thereof, with each detected candidate region. If the main subject region to be tracked is a subject which is easy to track, it is likely that sufficient accuracy can be achieved by the non-DL tracking unit 2803, and thus the DL tracking unit 2802 is deactivated.

Figure 37:
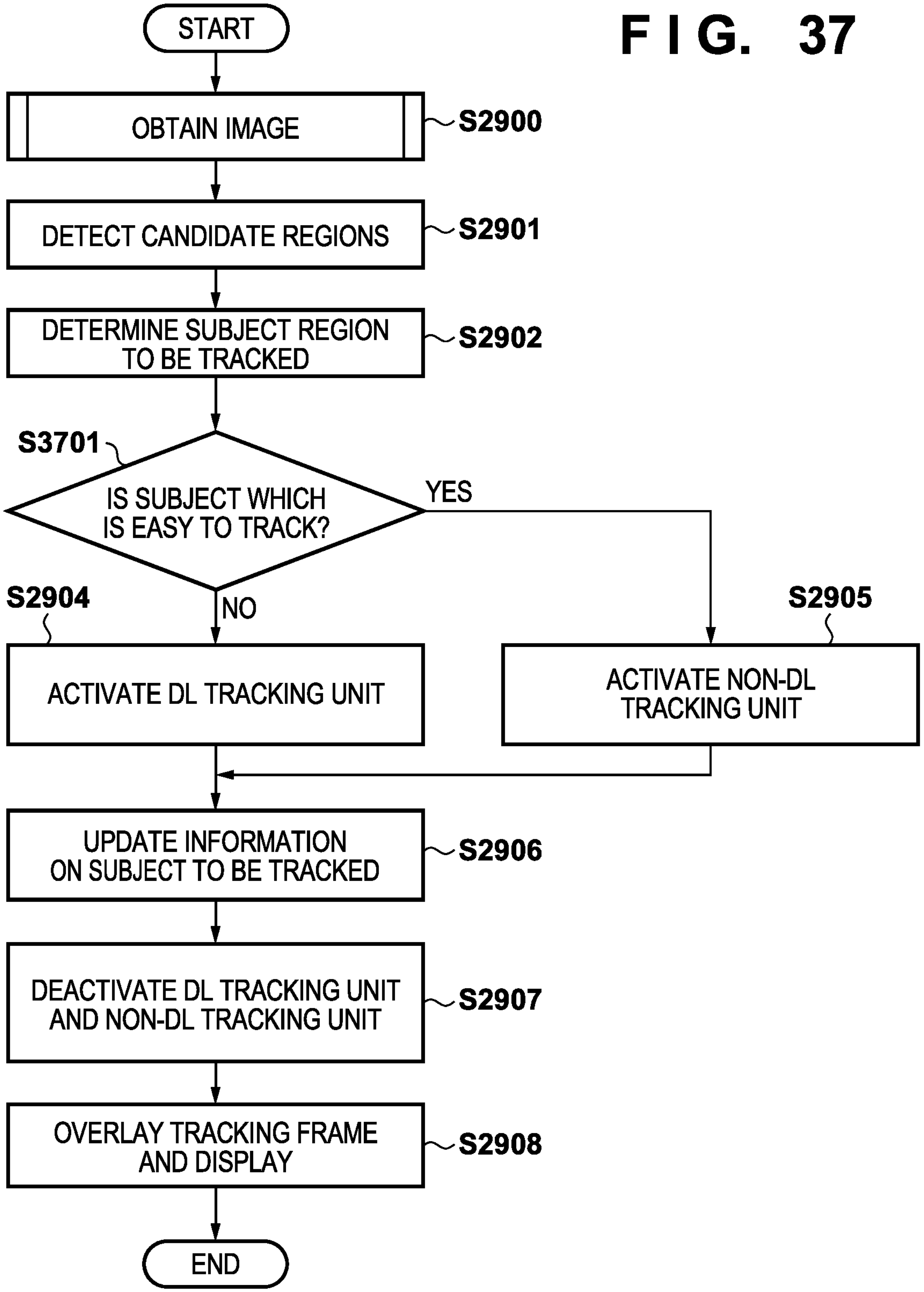
FIG. 37 is a flowchart pertaining to operation by a system control unit according to the seventeenth embodiment.

Operation of the system control unit 1740 in the present embodiment will be described hereinafter with reference to the flowchart in FIG. 37. In FIG. 37, steps that perform processing identical to that in the ninth embodiment are given the same reference numerals as in FIG. 29, and will not be described. The processing from S2900 to S2902 is the same as that described in the ninth embodiment.

In S3701, the system control unit 1740 determines whether the type of the subject belonging to the main subject region is a subject which is easy to track, from the object class associated with the main subject region determined by the target determination unit 2801. The system control unit 1740 can determine whether the type of the subject belonging to the main subject region is a subject which is easy to track by referring to the object class and the difficulty of tracking stored in, for example, the non-volatile memory 1753. Here, the difficulty of tracking is assumed to be the difficulty of non-DL tracking.

Non-DL tracking is difficult for subjects having shapes and/or colors which vary greatly depending on the angle or state (e.g., whether flying or not), such as birds, insects, and the like. Note that the subjects for which non-DL tracking is difficult also depend on the algorithm of the non-DL tracking, and are therefore not limited to subjects having shapes and/or colors which vary greatly. Note also that the associations between object classes and degrees of tracking difficulty can be made in advance according to the object classes that can be detected by the detection unit 1717, the performance of the non-DL tracking unit, and the like.

The system control unit 1740 executes S2905 if the type of the subject belonging to the main subject region is a subject which is easy to track, and executes S2904 if not.

In S2904, the system control unit 1740 activates the DL tracking unit 2802 and deactivates the non-DL tracking unit 2803. As a result, the DL tracking unit 2802 executes tracking processing on the current frame.

Meanwhile, in S2905, the system control unit 1740 activates the non-DL tracking unit 2803 and deactivates the DL tracking unit 2802. As a result, the non-DL tracking unit 2803 executes tracking processing on the current frame.

The processing from S2906 on is the same as in the ninth embodiment, and will therefore not be described here.

In the present embodiment, of the tracking units which track the subject region to be tracked, the second tracking unit, which has a higher accuracy but a greater operational load than the first tracking unit, is deactivated when the subject belonging to the subject region to be tracked is a subject which can be tracked easily by the first tracking unit. Deactivating the second tracking unit when the second tracking unit is considered to be of low necessity makes it possible to suppress power consumption while suppressing a drop in the tracking accuracy.

Eighteenth Embodiment

An eighteenth embodiment of the present invention will be described next. In the present embodiment, the DL tracking unit and the non-DL tracking unit are controlled to be activated or deactivated depending on whether the user has lost sight of the subject. The present embodiment can be implemented using an image capturing apparatus 1700' similar to that in the ninth embodiment, and will therefore be described using the constituent elements illustrated in FIG. 28. However, like the image capturing apparatus 1700 according to the third embodiment, the image capturing apparatus 1700' is assumed to be provided with the line-of-sight information obtainment unit 1800 illustrated in FIG. 18 as an input device included in the operation unit 1752. The system control unit 1740 is also assumed to have the function blocks illustrated in FIG. 19.

Figure 38:
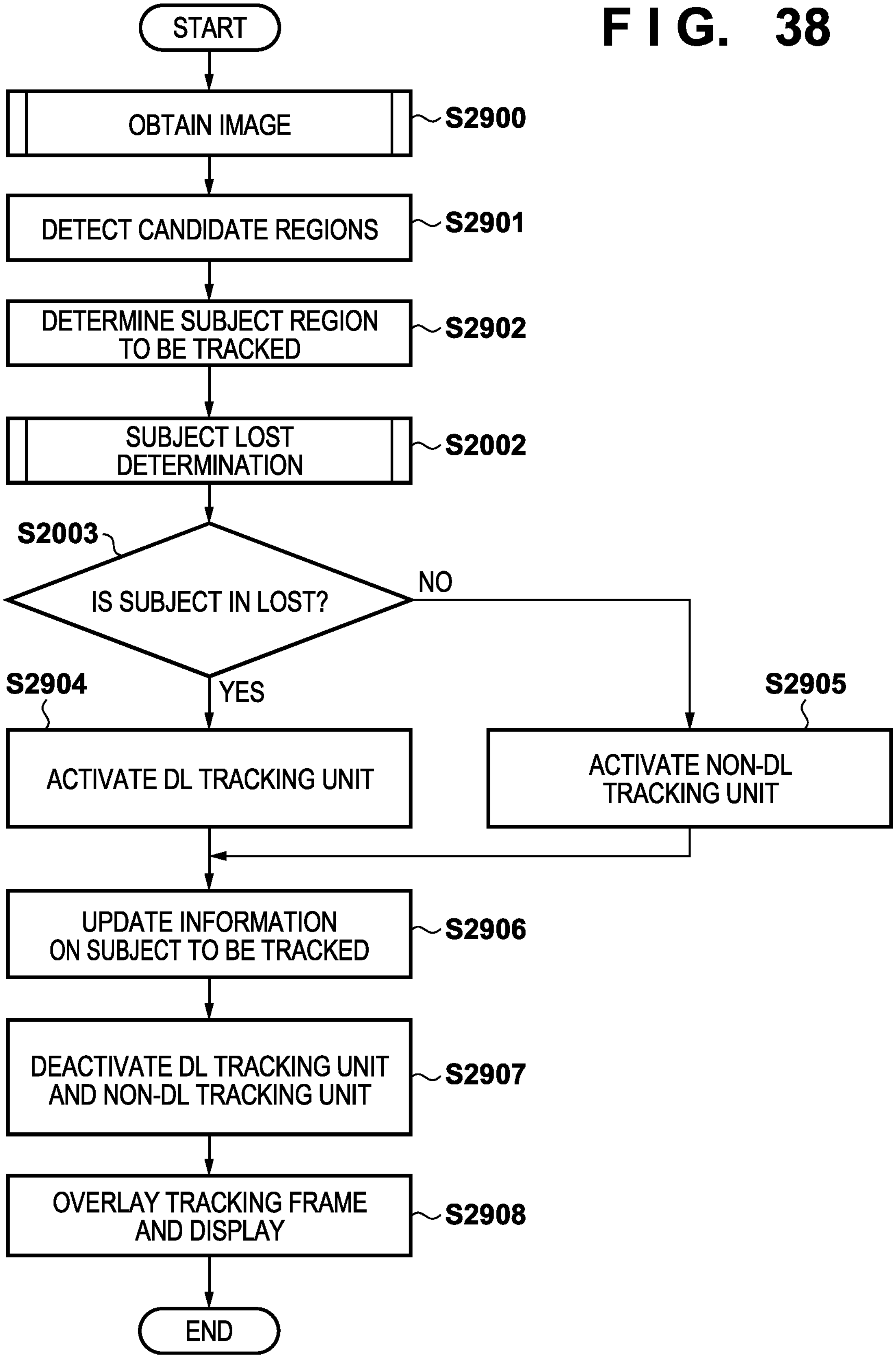
FIG. 38 is a flowchart pertaining to operation by a system control unit according to the eighteenth embodiment.

Operation of the system control unit 1740 in the present embodiment will be described hereinafter with reference to the flowchart in FIG. 38. In FIG. 38, steps that perform processing identical to that in the ninth embodiment are given the same reference numerals as in FIG. 29, steps that perform processing identical to that in the third embodiment are given the same reference numerals as in FIG. 20, and these steps will not be described. The processing from S2900 to S2902 is the same as that described in the ninth embodiment.

In S2002, the system control unit 1740 executes the subject lost determination processing described with reference to FIGS. 19 and 22.

In S2003, the system control unit 1740 (the irregularity determination unit 1901) determines whether the user has lost sight of the subject based on the irregularity level computed in the lost determination processing.

If in S2003 the irregularity determination unit 1901 determines that the subject has been lost, a processing determination unit 1902 executes S2904. If in S2003 the irregularity determination unit 1901 does not determine that the subject has been lost, the processing determination unit 1902 executes S2905.

In S2904, the system control unit 1740 (the processing determination unit 1902) activates the DL tracking unit 2802 and deactivates the non-DL tracking unit 2803. As a result, the DL tracking unit 2802 executes tracking processing on the current frame.

Additionally, in S2905, the system control unit 1740 (the processing determination unit 1902) activates the non-DL tracking unit 2803 and deactivates the DL tracking unit 2802. As a result, the non-DL tracking unit 2803 executes tracking processing on the current frame.

The processing from S2906 on is the same as in the ninth embodiment, and will therefore not be described here.

In the present embodiment, of the tracking units that track the subject region to be tracked, whether to use the first tracking unit, or the second tracking unit having a higher processing accuracy but a greater operational load than the first tracking unit, is determined according to whether the user has lost sight of the subject. Specifically, the second tracking unit is used when the user has lost sight of the subject, and is not used when the user has not lost sight of the subject. When the user has not lost sight of the subject, tracking processing can be performed with sufficient accuracy by the first tracking unit, and thus deactivating the second tracking unit makes it possible to suppress power consumption while suppressing a drop in the tracking accuracy.

Other Embodiments

According to the present invention, an image processing apparatus having a subject tracking function that achieves good performance while suppressing power consumption, and a control method thereof, can be provided.

The above-described embodiments can also be implemented in combination with each other. For example, at least two of the detection unit, the target determination unit, and the tracking unit can have two constituent elements that implement the same function but have different operational loads and accuracies, and whether to activate or deactivate those constituent elements can be controlled dynamically according to the embodiments.

In the above-described embodiments, the frame periods in which the DL tracking and the non-DL tracking are active may be varied, with both DL tracking and non-DL tracking being activated in a period which is the least common multiple of those respective periods.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
- one or more processors that execute a program stored in a memory and thereby function as:
- a detecting unit configured to detect, in a target frame, one or more regions of a predetermined subject as candidate region(s);
- a determining unit configured to determine a subject region to be tracked from the candidate region(s);
- a difficulty computing unit configured to compute an evaluation value indicating a calculated difficulty score pertaining to difficulty of tracking, based on the subject region determined by the determining unit, wherein the difficulty score is incremented when an object class of the subject region includes objects for which shape changes significantly, and also incremented when a number of candidate regions having the same object class as the subject region is greater than a first preset value;
- a tracking unit configured to execute tracking processing for estimating a position, in the target frame, of a region corresponding to the subject region to be tracked in a frame previous to the target frame, the tracking unit including a first tracking unit and a second tracking unit both operating on the same frames; and
- a control unit configured to selectively determine, based on the evaluation value, operation of the first tracking unit and operation of the second tracking unit, on a subsequent frame to the target frame,
- wherein the second tracking unit operates a deep-learning neural network and has a higher processing accuracy and a greater operational load than the first tracking unit that does not operate a deep-learning neural network, and
- based on the evaluation value computed by the difficulty computing unit, the control unit selectively activates both the first tracking unit and the second tracking unit to operate in parallel on the same frames, or deactivates at least one of the first tracking unit and the second tracking unit.

2. The image processing apparatus according to claim 1, wherein the computing unit computes the evaluation value based on at least one of a size of the subject region, a position of the subject region, a type of the subject, and a total number of subject regions pertaining to subjects of a same type.

3. The image processing apparatus according to claim 1, wherein the higher the evaluation value is, the higher the difficulty of the tracking processing is, and the control unit deactivates the first tracking unit and activates the second tracking unit when the evaluation value is at least a first threshold.

4. The image processing apparatus according to claim 1, wherein the higher the evaluation value is, the higher the difficulty of the tracking processing is, and the control unit deactivates the second tracking unit and activates the first tracking unit when the evaluation value is less than a second threshold.

5. The image processing apparatus according to claim 1, wherein when activating both the first tracking unit and the second tracking unit, the control unit lowers an operational frequency of the second tracking unit than an operational frequency of the first tracking unit.

6. The image processing apparatus according to claim 1, wherein when the subject region determined by the determining unit and the subject region for which the position is estimated by the tracking unit relate to the same subject, the control unit does not change the operation of the first tracking unit and the operation of the second tracking unit on the subsequent frame from the operation of the first tracking unit and the operation of the second tracking unit on the target frame.

7. The image processing apparatus according to claim 1, wherein when the subject region determined by the determining unit and the subject region for which the position is estimated by the tracking unit relate to different subjects, the control unit determines, based on the evaluation value, the operation of the first tracking unit and the operation of the second tracking unit on the subsequent frame.

8. The image processing apparatus according to claim 1, wherein the second tracking unit executes the tracking processing using a deep learning neural network and the first tracking unit executes tracking processing using a non-deep learning neural network.

9. The image processing apparatus according to claim 1, wherein the control unit activates both the first tracking unit and the second tracking unit to operate in parallel on the same frames, but with different frequencies.

10. An image processing apparatus comprising:

one or more processors that execute a program stored in a memory and thereby function as:

a detecting unit configured to detect, in a target frame, one or more regions of a predetermined subject as candidate region(s);

a determining unit configured to determine a subject region to be tracked from the candidate region(s);

a tracking unit configured to execute tracking processing for estimating a position, in the target frame, of a region corresponding to the subject region to be tracked in a frame previous to the target frame, the tracking unit including first tracking unit and second tracking unit both operating on the same frames; and a control unit configured to selectively determine, based on a type of the subject detected by the detecting unit, operation of the first tracking unit and operation of the second tracking unit on a subsequent frame to the target frame, wherein the second tracking unit operates a deep-learning neural network and has a higher processing accuracy and a greater operational load than the first tracking unit that does not operate a deep-learning neural network, and based on the type of the subject detected by the detecting unit, the control unit selectively activates both the first tracking unit and the second tracking unit to operate in parallel on the same frames, or deactivates at least one of the first tracking unit and the second tracking unit.

11. The image processing apparatus according to claim 10, wherein the control unit activates both the first tracking unit and the second tracking unit to operate in parallel on the same frames, but with different frequencies.

12. A control method for an image processing apparatus, wherein the image processing apparatus includes a tracking unit for executing tracking processing for estimating a position, in a target frame, of a region corresponding to a subject region to be tracked in a frame previous to the target frame, the tracking unit includes a first tracking unit, and a second tracking unit operating a deep-learning neural network and having a higher processing accuracy and a greater operational load than the first tracking unit that does not operate a deep-learning neural network, wherein the first and second tracking units operate on the same frames, and the control method comprises:

detecting, in a target frame, one or more regions of a predetermined subject as candidate region(s);

determining a subject region to be tracked from the candidate region(s);

computing an evaluation value indicating a calculated difficulty score pertaining to difficulty of tracking, based on the subject region determined in the determining, wherein the difficulty score is incremented when an object class of the subject region includes objects for which shape changes significantly, and also incremented when a number of candidate regions having the same object class as the subject region is greater than a first preset value; and selectively controlling, based on the evaluation value, operation of the first tracking unit and operation of the second tracking unit on a subsequent frame to the target frame, wherein the controlling, based on the evaluation value computed based on the incremented difficulty score, selectively activates both the first tracking unit and the second tracking unit to operate in parallel on the same frames, or deactivates at least one of the first tracking unit and the second tracking unit.

13. A control method for an image processing apparatus, wherein the image processing apparatus includes a tracking unit for executing tracking processing for estimating a position, in a target frame, of a region corresponding to a subject region to be tracked in a frame previous to the target frame, the tracking unit includes a first tracking unit, and a second tracking unit operating a deep-learning neural network and having a higher processing accuracy and a greater operational load than the first tracking unit that does not operate a deep-learning neural network, wherein the first and second tracking units operate on the same frames, and the control method comprises:

detecting, in a target frame, one or more regions of a predetermined subject as candidate region(s);

determining a subject region to be tracked from the candidate region(s); and selectively controlling, based on a type of the subject detected in the detecting, operation of the first tracking unit and operation of the second tracking unit on a subsequent frame to the target frame, wherein the controlling, based on the type of the subject detected in the detecting step, selectively activates both the first tracking unit and the second tracking unit to operate in parallel on the same frames, or deactivates at least one of the first tracking unit and the second tracking unit.

14. A non-transitory machine-readable medium that stores a program for causing, when executed by a computer, the computer to function as an image processing apparatus comprising:

a detecting unit configured to detect, in a target frame, one or more regions of a predetermined subject as candidate region(s);

a determining unit configured to determine a subject region to be tracked from the candidate region(s);

a difficulty computing unit configured to compute an evaluation value indicating a calculated difficulty score pertaining to difficulty of tracking, based on the subject region determined by the determining unit, wherein the difficulty score is incremented when an object class of the subject region includes objects for which shape changes significantly, and also incremented when a number of candidate regions having the same object class as the subject region is greater than a first preset value;

a tracking unit configured to execute tracking processing for estimating a position, in the target frame, of a region corresponding to the subject region to be tracked in a frame previous to the target frame, the tracking unit including a first tracking unit and a second tracking unit both operating on the same frames; and a control unit configured to selectively determine, based on the evaluation value, operation of the first tracking unit and operation of the second tracking unit, on a subsequent frame to the target frame, wherein the second tracking unit operates a deep-learning neural network and has a higher processing accuracy and a greater operational load than the first tracking unit that does not operate a deep-learning neural network, and based on the evaluation value computed by the difficulty computing unit, the control unit selectively activates both the first tracking unit and the second tracking unit to operate in parallel on the same frames, or deactivates at least one of the first tracking unit and the second tracking unit.

15. An image processing apparatus comprising:

one or more processors that execute a program stored in a memory and thereby function as:

a detecting unit configured to detect, in a target frame, one or more regions of a predetermined subject as candidate region(s);

a computing unit configured to, based on a detection result for the candidate region(s), compute an evaluation value pertaining to difficulty of determination processing for determining a region to be subject to tracking processing from the candidate region(s);

a difficulty computing unit configured to, based on a detection result for the candidate region(s), compute an evaluation value indicating a calculated difficulty score pertaining to difficulty of determination processing for determining a region to be subject to tracking processing from the candidate region(s), wherein the difficulty score is incremented when an object class of the subject region includes objects for which shape changes significantly, and also incremented when a number of candidate regions having the same object class as the subject region is greater than a first preset value;

a target determining unit, including a first determining unit and a second determining unit both operating on the same frames, configured to perform the determination processing on the candidate region(s) detected by the detecting unit; and a control unit configured to selectively control, based on the evaluation value, operation of the first determining unit and operation of the second determining unit, wherein the second tracking unit operates a deep-learning neural network and has a higher processing accuracy and a greater operational load than the first tracking unit that does not operate a deep-learning neural network, and based on the evaluation value computed by the difficulty computing unit, the control unit selectively activates both to operate in parallel on the same frames, deactivates one, or deactivates both of the first determining unit and the second determining unit.

16. The image processing apparatus according to claim 15, wherein the computing unit computes the evaluation value based on at least one of a size, a position, and a type of each of the candidate region(s), and a total number of the candidate region(s) related to a subject of the same type.

17. The image processing apparatus according to claim 15, wherein the higher the evaluation value is, the higher the difficulty of the determination processing is, and the control unit activates the second determining unit when the evaluation value is at least a first threshold.

18. The image processing apparatus according to claim 15, wherein the higher the evaluation value is, the higher the difficulty of the determination processing is, and the control unit deactivates the second determining unit and activates the first determining unit when the evaluation value is less than a second threshold.

19. The image processing apparatus according to claim 15, wherein the higher the evaluation value is, the higher the difficulty of the determination processing, and the control unit deactivates both the first determining unit and the second determining unit when the evaluation value is less than a third threshold.

20. The image processing apparatus according to claim 15, wherein the second determining unit executes the determination processing using a pre-trained deep learning neural network and the first determination unit executes determination processing using a non-deep learning neural network.

21. An image processing apparatus comprising:

one or more processors that execute a program stored in a memory and thereby function as:

a detecting unit configured to detect, in a target frame, one or more regions of a predetermined subject as candidate region(s);

a target determining unit configured to perform determination processing for determining a region to be subject to tracking processing from the candidate region(s) detected by the detecting unit, the target determining unit including a first determining unit and a second determining unit operating a deep-learning neural network and having a higher accuracy and a greater operational load than the first determining unit that does not operate a deep-learning neural network, wherein the first and second detecting units operate on the same frames; and a control unit configured to selectively control, based on a detection result for the candidate region(s), operation of the first determining unit and operation of the second determining unit, wherein based on a type and number of the detected candidate region(s), the control unit selectively activates both to operate in parallel on the same frames, deactivates one, or deactivates both of the first determining unit and the second determining unit.

22. The image processing apparatus according to claim 21, wherein the control unit deactivates the second determining unit and activates the first determining unit when, among the detected candidate region(s), a total number of the candidate region(s) of a predetermined type is less than a first threshold.

23. The image processing apparatus according to claim 21, wherein the control unit activates the second determining unit when, among the detected candidate region(s), a total number of the candidate region(s) of a first type is at least a first threshold and a total number of the candidate region(s) of a second type is at least a second threshold.

24. The image processing apparatus according to claim 21, wherein the control unit deactivates both the first determining unit and the second determining unit when, among the detected candidate region(s), a total number of the candidate region(s) of any type is less than a third threshold.

25. The image processing apparatus according to claim 21, further comprising:

line-of-sight detecting unit for detecting a line of sight of a user of the image processing apparatus, wherein the first determining unit executes the determination processing based on the line of sight detected by the line-of-sight detecting unit, and the control unit deactivates the first determining unit when the second determining unit is active.

26. The image processing apparatus according to claim 21, wherein the second determining unit executes the determination processing using a pre-trained deep learning neural network and the first determination unit executes determination processing using a non-deep learning neural network.

27. A control method for an image processing apparatus comprising:

detecting, in a target frame, one or more regions of a predetermined subject as candidate region(s);

computing, based on a detection result for the candidate region(s), an evaluation value indicating a calculated difficulty score pertaining to difficulty of determination processing for determining a region to be subject to tracking processing from the candidate region(s), wherein the difficulty score is incremented when an object class of the subject region includes objects for which shape changes significantly, and also incremented when a number of candidate region(s) having the same object class as the subject region is greater than a first preset value; and selectively controlling, based on the evaluation value, operation of target determining unit, included in the image processing apparatus, that performs the determination processing, wherein the target determining unit includes a first determining unit and a second determining unit operating a deep-learning neural network and having a higher accuracy and a greater operational load than the first determining unit that does not operate a deep-learning neural network, wherein the first and second determination units operate on the same frames, and the controlling, based on the evaluation value computed by the difficulty computing unit, selectively activates both to operate in parallel on the same frames, deactivates one, or deactivates both of the first determining unit and the second determining unit.

28. A control method for an image processing apparatus comprising:

detecting, in a target frame, one or more regions of a predetermined subject as candidate region(s); and selectively controlling, based on a detection result for the candidate region(s), operation of target determining unit, included in the image processing apparatus, that performs determination processing for determining a region to be subject to tracking processing from the candidate region(s), wherein the target determining unit includes a first determining unit and a second determining unit operating a deep-learning neural network and having a higher accuracy and a greater operational load than the first determining unit that does not operate a deep-learning neural network, wherein the first and second determination units operate on the same frames, and the controlling, based on a type and number of the detected candidate region(s), selectively activates both to operate in parallel on the same frames, deactivates one, or deactivates both of the first determining unit and the second determining unit.

29. A non-transitory machine-readable medium storing a program for causing, when executed by a computer, the computer to function as an image processing apparatus comprising:

a detecting unit configured to detect, in a target frame, one or more regions of a predetermined subject as candidate region(s);

a computing unit configured to, based on a detection result for the candidate region(s), compute an evaluation value indicating a calculated difficulty score pertaining to difficulty of determination processing for determining a region to be subject to tracking processing from the candidate region(s), wherein the difficulty score is incremented when an object class of the subject region includes objects for which shape changes significantly, and also incremented when a number of candidate region(s) having the same object class as the subject region is greater than a first preset value;

a target determining unit, including a first determining unit and a second determining unit, configured to perform the determination processing on the candidate region(s) detected by the detecting unit; and a control unit configured to selectively control, based on the evaluation value, operation of the first determining unit and operation of the second determining unit, wherein the second determining unit operates a deep-learning neural network and has a higher processing accuracy and a greater operational load than the first determining unit that does not operate a deep-learning neural network, and based on the evaluation value computed by the difficulty computing unit, the control unit selectively activates both to operate in parallel on the same frames, deactivates one, or deactivates both of the first determining unit and the second determining unit.

30. A non-transitory machine-readable medium storing a program for causing, when executed by a computer, the computer to function as an image processing apparatus comprising:

a detecting unit configured to detect, in a target frame, one or more regions of a predetermined subject as candidate region(s);

a target determining unit configured to perform determination processing for determining a region to be subject to tracking processing from the candidate region(s) detected by the detecting unit, the target determining unit including a first determining unit and a second determining unit operating a deep-learning neural network and having a higher accuracy and a greater operational load than the first determining unit that does not operate a deep-learning neural network; and a control unit configured to selectively control, based on a detection result for the candidate region(s), operation of the first determining unit and operation of the second determining unit operating on the same frames, wherein based on a type and number of the detected candidate region(s), the control unit selectively activates both to track in parallel on the same frames, deactivates one, or deactivates both of the first determining unit and the second determining unit.

* * * * *